(12) United States Patent
Honermann et al.

(10) Patent No.: US 10,179,303 B2
(45) Date of Patent: Jan. 15, 2019

(54) TOP LOAD LIQUID FILTER ASSEMBLY, SYSTEM, AND METHODS

(71) Applicant: Donaldson Company, Inc., Minneapolis, MN (US)

(72) Inventors: Bradley S. Honermann, Prior Lake, MN (US); John R. Hacker, Minneapolis, MN (US); Kathryn A. Legault, Bloomington, MN (US); Mark S. Emery, Minneapolis, MN (US); Kurt B. Joscher, Burnsville, MN (US); Jason Johnson, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 16/017,578

(22) Filed: Jun. 25, 2018

(65) Prior Publication Data
US 2018/0304182 A1    Oct. 25, 2018

Related U.S. Application Data

(63) Continuation of application No. 14/661,921, filed on Mar. 18, 2015, now Pat. No. 10,010,817, which is a (Continued)

(51) Int. Cl.
| | | |
|---|---|---|
| *B01D 35/153* | (2006.01) | |
| *B01D 36/00* | (2006.01) | |
| *B01D 35/16* | (2006.01) | |

(52) U.S. Cl.
CPC .......... *B01D 35/153* (2013.01); *B01D 35/16* (2013.01); *B01D 36/001* (2013.01); *B01D 2201/0415* (2013.01); *B01D 2201/291* (2013.01); *B01D 2201/305* (2013.01); *B01D 2201/4007* (2013.01); *B01D 2201/4053* (2013.01)

(58) Field of Classification Search
CPC .... B01D 35/153; B01D 35/16; B01D 36/001; B01D 2201/0415; B01D 2201/291; B01D 2201/305; B01D 2201/4007; B01D 2201/4053
See application file for complete search history.

(56) References Cited

U.S. PATENT DOCUMENTS

| | | |
|---|---|---|
| 2,748,948 A | 6/1956 | Fricke et al. |
| 5,098,559 A | 3/1992 | Mack et al. |

(Continued)

FOREIGN PATENT DOCUMENTS

| | | |
|---|---|---|
| DE | 42 01 041 A1 | 7/1993 |
| DE | 43 03 695 A1 | 8/1994 |

(Continued)

*Primary Examiner* — Patrick J Orme
(74) *Attorney, Agent, or Firm* — Merchant & Gould P.C.

(57) ABSTRACT

A top load liquid filter assembly includes a filter lockout mechanism to ensure that the filter base and cover are not connectable unless there is a proper filter cartridge installed therein. The filter system can also include an automatic drain mechanism and a cartridge retention mechanism. One example embodiment further includes an air bleed vent. A filter cartridge usable in the topload liquid filter assembly includes first and second protrusions and cover-gripper members. Methods of use, installing, servicing, and retaining can be practiced.

7 Claims, 45 Drawing Sheets

Related U.S. Application Data continuation of application No. 12/989,351, filed as application No. PCT/US2009/041692 on Apr. 24, 2009, now Pat. No. 8,999,163.

(60) Provisional application No. 61/081,593, filed on Jul. 17, 2008, provisional application No. 61/047,984, filed on Apr. 25, 2008.

(56) References Cited

U.S. PATENT DOCUMENTS

| | | | |
|---|---|---|---|
| 5,516,425 | A | 5/1996 | Brieden et al. |
| 5,643,446 | A | 7/1997 | Clausen et al. |
| 5,681,461 | A | 10/1997 | Gullett et al. |
| 5,695,633 | A | 12/1997 | Ernst et al. |
| 5,695,636 | A | 12/1997 | Gullett |
| 5,753,120 | A | 5/1998 | Clausen et al. |
| 5,762,788 | A | 6/1998 | Gullett |
| 5,770,054 | A | 6/1998 | Ardes |
| 5,770,065 | A | 6/1998 | Popoff et al. |
| 5,814,215 | A | 9/1998 | Bruss et al. |
| 5,846,416 | A | 12/1998 | Gullett |
| 5,855,780 | A | 1/1999 | Dye et al. |
| 5,888,384 | A | 3/1999 | Wiederhold et al. |
| 5,902,479 | A | 5/1999 | Fukumori et al. |
| 6,015,492 | A | 1/2000 | Popoff et al. |
| 6,016,923 | A | 1/2000 | Baumann |
| 6,053,334 | A | 4/2000 | Popoff et al. |
| 6,113,781 | A | 9/2000 | Popoff et al. |
| 6,171,491 | B1 | 1/2001 | Popoff et al. |
| 6,177,003 | B1 | 1/2001 | Jainek et al. |
| 6,217,763 | B1 | 4/2001 | Lawrence et al. |
| 6,235,194 | B1 | 5/2001 | Jousset |
| 6,251,273 | B1 | 6/2001 | Jawurek et al. |
| 6,485,637 | B2 | 11/2002 | Jainek et al. |
| 6,488,845 | B1 | 12/2002 | Neufeld et al. |
| 6,495,042 | B1 | 12/2002 | Knight |
| 6,506,303 | B1 | 1/2003 | Gustafsson et al. |
| 6,543,625 | B1 | 4/2003 | Le Roux et al. |
| 6,554,139 | B1 | 4/2003 | Maxwell et al. |
| 6,569,326 | B1 * | 5/2003 | Baumann ............... B01D 29/21 210/232 |
| 6,572,768 | B1 | 6/2003 | Cline et al. |
| 6,607,665 | B2 | 8/2003 | Fick et al. |
| 6,635,175 | B2 | 10/2003 | Stankowski |
| 6,679,990 | B2 | 1/2004 | Reinhart |
| 6,685,829 | B1 | 2/2004 | Baumann et al. |
| 6,709,588 | B2 | 3/2004 | Pavlin et al. |
| 6,770,196 | B2 | 8/2004 | Wall |
| 6,790,356 | B2 | 9/2004 | Wright |
| 6,797,168 | B1 | 9/2004 | Knight |
| 6,814,243 | B2 | 11/2004 | Amstutz et al. |
| 6,837,993 | B2 | 1/2005 | Clausen et al. |
| 6,896,803 | B2 | 5/2005 | Cline et al. |
| 6,921,479 | B2 | 7/2005 | Ardes |
| 6,926,156 | B2 | 8/2005 | Wall |
| 6,926,825 | B2 | 8/2005 | Ardes |
| 6,936,161 | B2 | 8/2005 | Wright et al. |
| 6,949,182 | B2 | 9/2005 | Yano et al. |
| 6,983,851 | B2 | 1/2006 | Maxwell et al. |
| 6,986,426 | B2 | 1/2006 | Clausen et al. |
| 6,994,796 | B2 | 2/2006 | Wall |
| 7,086,537 | B2 | 8/2006 | Maxwell et al. |
| 7,163,623 | B2 | 1/2007 | Knight |
| 7,204,370 | B2 | 4/2007 | Clausen et al. |
| 7,326,342 | B2 | 2/2008 | Richmond et al. |
| 7,360,658 | B2 | 4/2008 | Clausen et al. |
| 7,390,407 | B2 | 6/2008 | Wiendorf et al. |
| 8,999,163 | B2 | 4/2015 | Honermann |
| 2002/0020660 | A1 | 2/2002 | Jainek et al. |
| 2002/0108897 | A1 | 8/2002 | Pavlin et al. |
| 2002/0134726 | A1 | 9/2002 | Ardes |
| 2002/0170279 | A1 | 11/2002 | Gustafson et al. |
| 2004/0159600 | A1 | 8/2004 | Stankowski |
| 2004/0182777 | A1 | 9/2004 | Stankowski et al. |
| 2005/0035053 | A1 | 2/2005 | Engelhard et al. |
| 2006/0006124 | A1 | 1/2006 | Yates et al. |
| 2006/0054547 | A1 | 3/2006 | Richmond et al. |
| 2007/0039864 | A1 | 2/2007 | Dworatzek |
| 2007/0215561 | A1 | 9/2007 | Yates et al. |
| 2007/0267338 | A1 | 11/2007 | Menez et al. |
| 2008/0047891 | A1 | 2/2008 | Roesgen |
| 2008/0169233 | A1 | 7/2008 | Pfitzer et al. |

FOREIGN PATENT DOCUMENTS

| | | |
|---|---|---|
| DE | 198 52 587 A1 | 2/2000 |
| DE | 199 55 864 A1 | 5/2001 |
| EP | 0 681 094 A1 | 11/1995 |
| EP | 0 839 563 A1 | 5/1998 |
| EP | 1 008 375 | 6/2000 |
| EP | 1 031 367 A1 | 8/2000 |
| EP | 1 110 590 | 6/2001 |
| EP | 1 201 289 A1 | 5/2002 |
| EP | 1 674 142 A1 | 6/2006 |
| EP | 1 623 749 B1 | 9/2007 |
| EP | 1 419 809 B1 | 11/2007 |
| EP | 1 714 688 B1 | 1/2008 |
| EP | 1 866 051 B1 | 6/2008 |
| GB | 615250 | 1/1949 |
| JP | 2003-320206 | 11/2003 |
| WO | WO 02/11854 A1 | 2/2002 |
| WO | WO 02/070869 A1 | 9/2002 |
| WO | WO 03/080215 A1 | 10/2003 |
| WO | WO04/069373 A1 | 8/2004 |
| WO | WO05/087346 A1 | 9/2005 |

\* cited by examiner

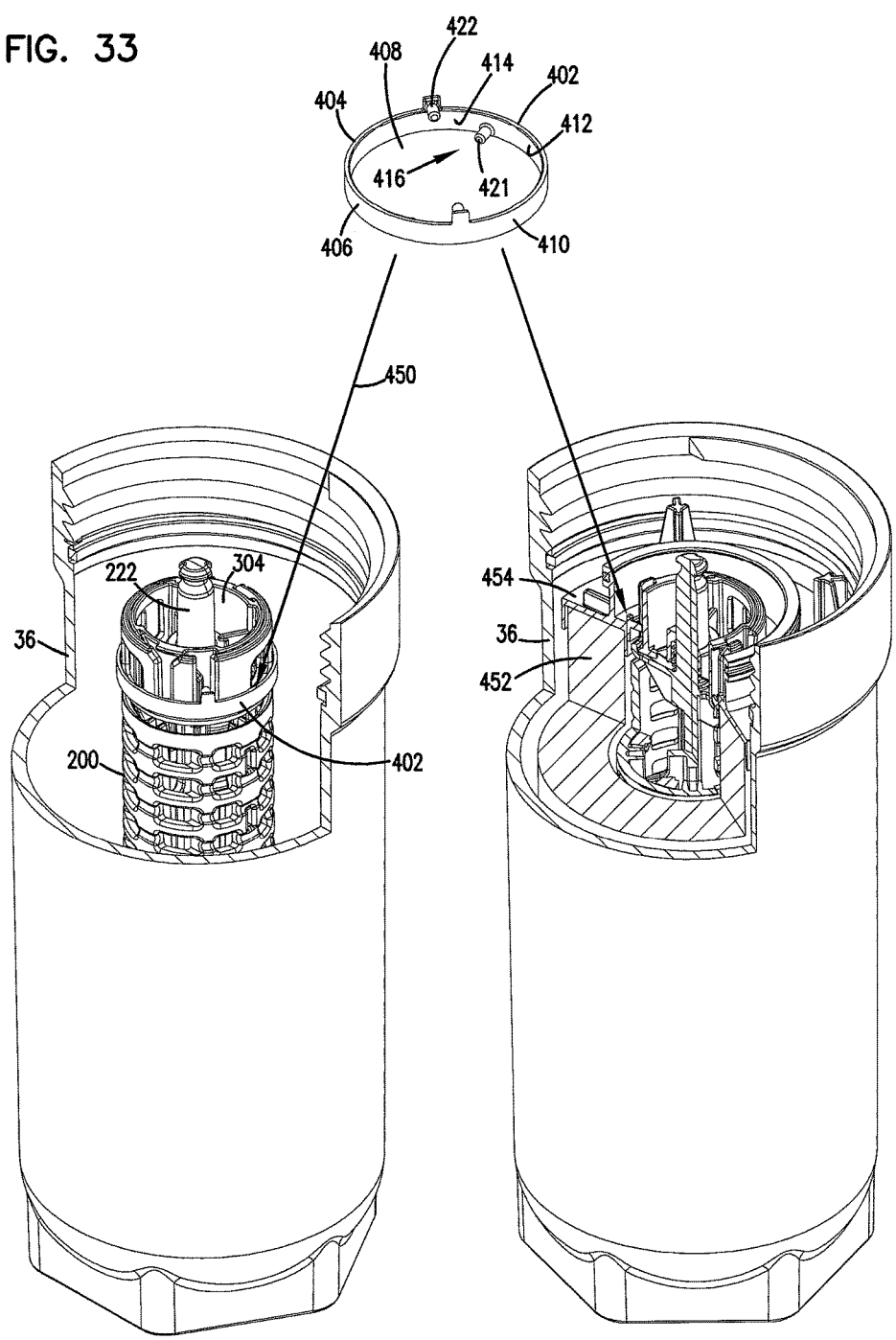

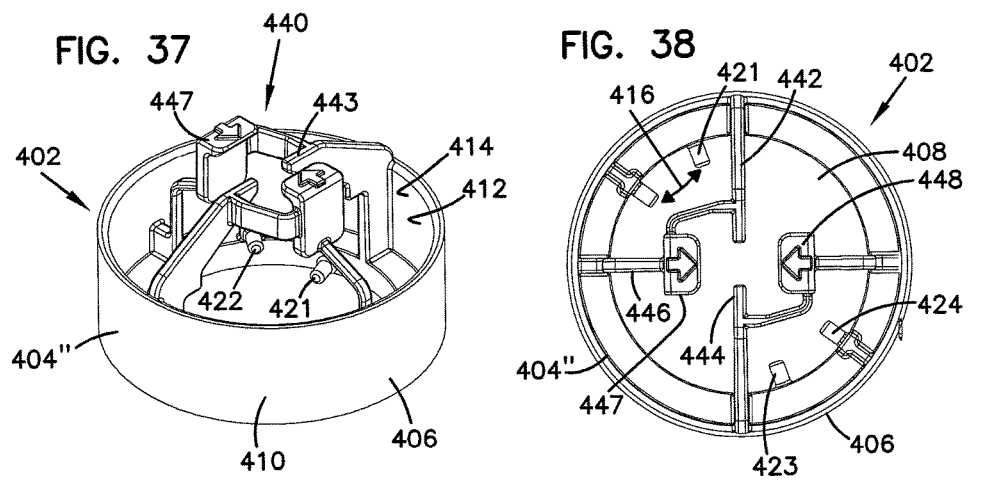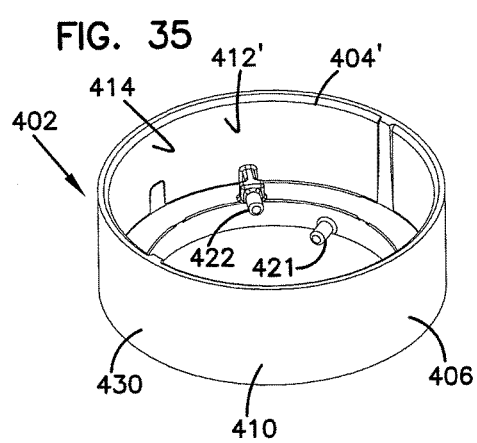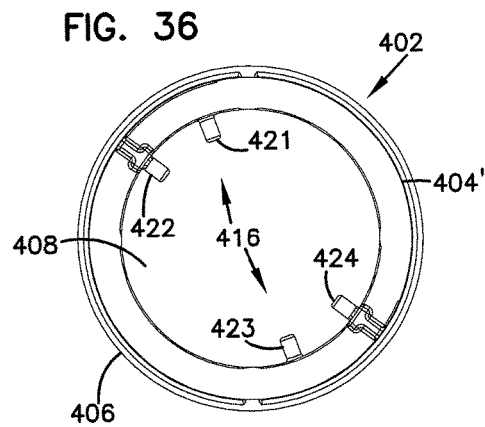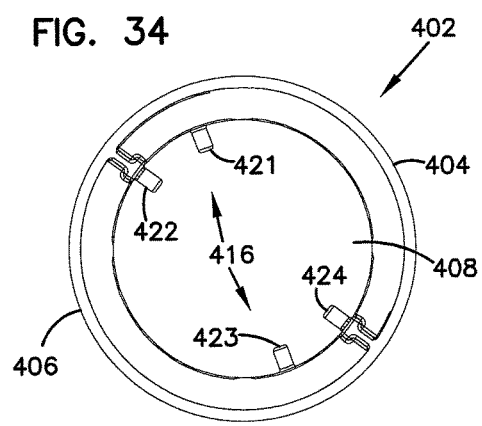

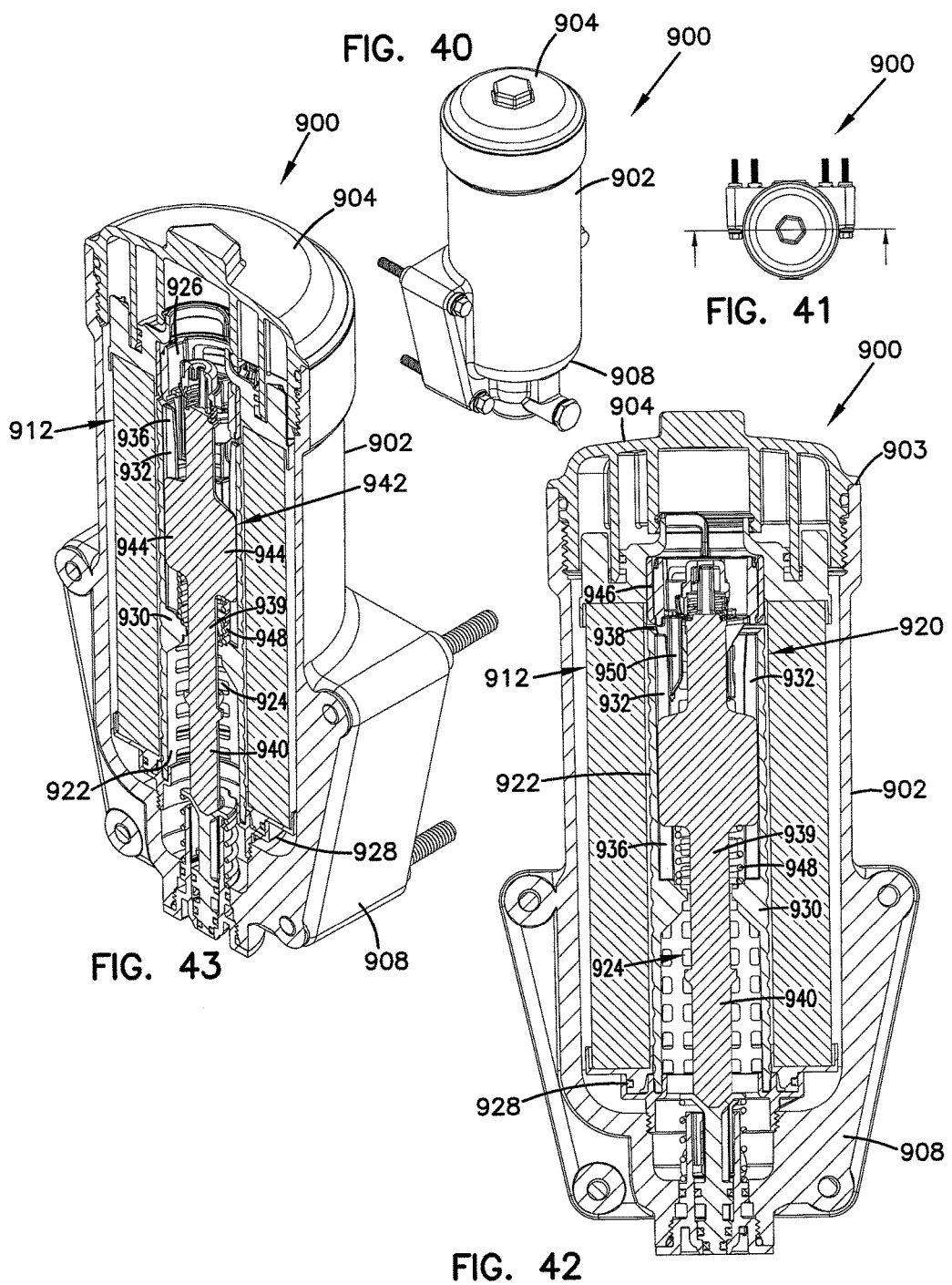

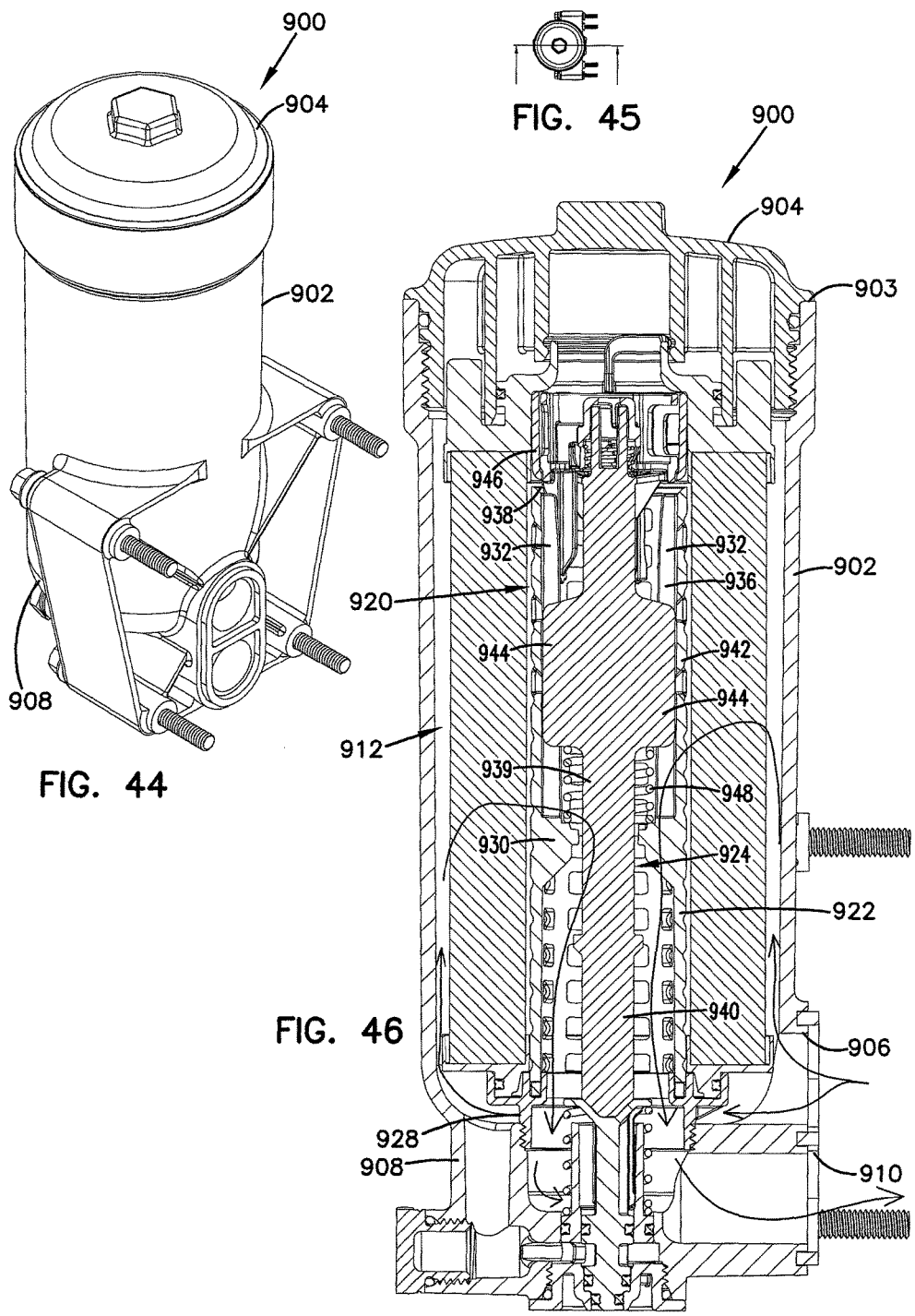

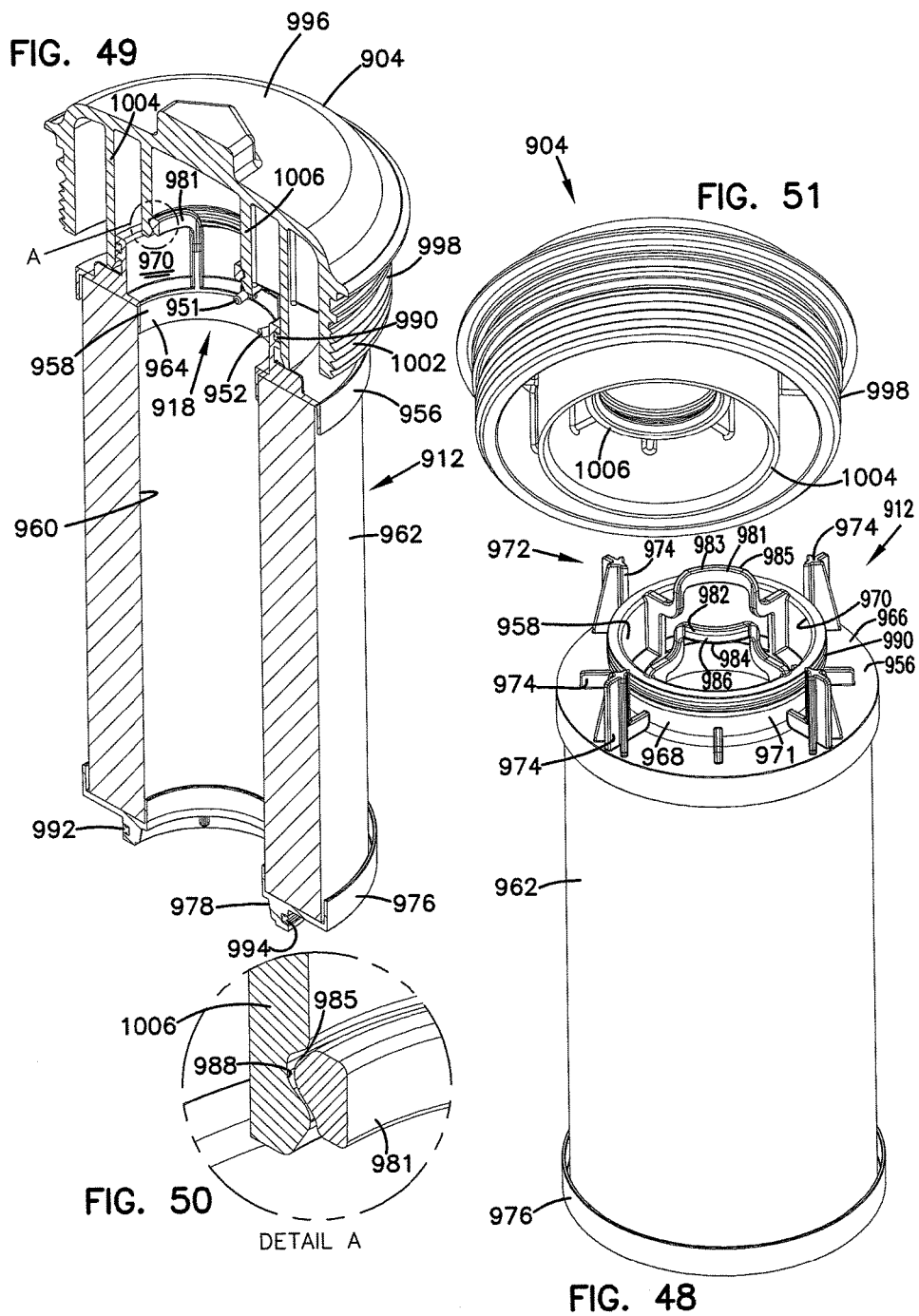

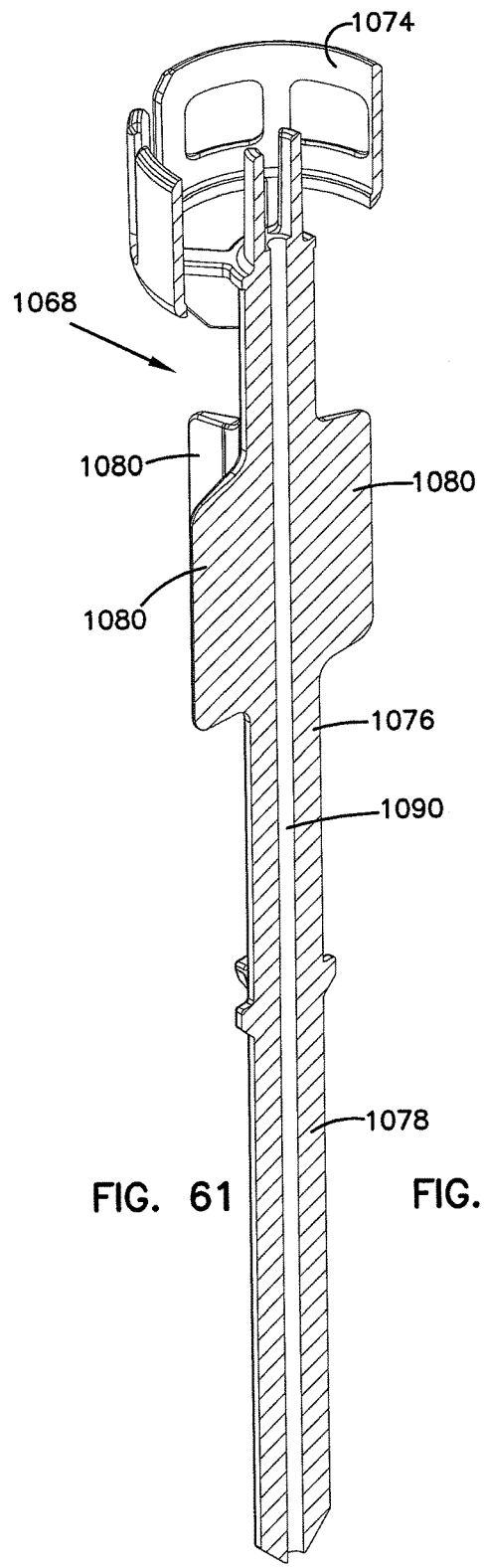
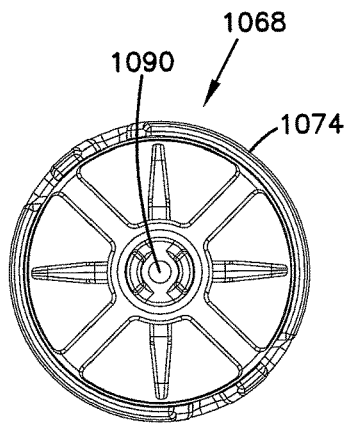
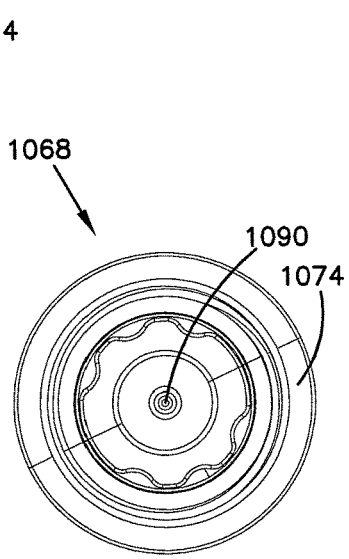
FIG. 61  FIG. 62
FIG. 63
FIG. 64

TOP LOAD LIQUID FILTER ASSEMBLY, SYSTEM, AND METHODS

This application is a continuation of U.S. application Ser. No. 14/661,921 filed Mar. 18, 2015 which is a continuation of U.S. application Ser. No. 12/989,351, filed 9 Mar. 2011, which issued as U.S. Pat. No. 8,999,163, which is a US National Stage of PCT International Patent application No. PCT/US2009/041692, filed 24 Apr. 2009 in the name of Donaldson Company, Inc., a U.S. national corporation, applicant for the designation of all countries except the US, and Bradley S. Honermann, John R. Hacker, Kathryn A. Legault, Mark S. Emery, Kurt Joscher, and Jason Johnson, citizens of the U.S., applicants for the designation of the US only, and claims priority to U.S. Provisional Patent Application Ser. No. 61/047,984, filed Apr. 25, 2008 and U.S. Provisional Patent Application Ser. No. 61/081,593, filed Jul. 17, 2008. To the extent appropriate, a claim of priority is made to each of the above disclosed applications.

TECHNICAL FIELD

This disclosure relates to filtration assemblies and methods. In particular, this disclosure relates to filter assemblies and methods for use in liquid filtration, such as lube filters, hydraulic filters, and fuel filters.

BACKGROUND

Filters are commonly used in connection with lubrication systems and fuel systems for internal combustion engines, and hydraulic systems for heavy-duty equipment. Filters are also used in many other types of liquid systems. In these types of systems, the filter is changed periodically. In the art, there are at least two standard types of filters used. One type is a spin-on canister filter, while the other is a bowl-cartridge filter.

Bowl-cartridge filters typically include a reusable bowl holding a replaceable filter element (filter cartridge). Bowl-cartridge filters are sometimes preferred instead of spin-on canister filters due to disposal or other issues. Bowl-cartridge filters are mounted onto a filter head, and liquid to be cleaned passes through the filter head, into the bowl, through the replaceable filter cartridge, out of the bowl, and back into the filter head. After a period of use, the bowl-cartridge filter is removed from the filter head, and the replaceable filter cartridge is removed from the reusable bowl. The old filter cartridge is discarded and replaced with a new filter cartridge. The new filter cartridge is operably-mounted into the reusable bowl to provide a refurbished bowl-cartridge filter. This refurbished bowl-cartridge filter, containing the new filter cartridge, is then mounted onto the filter head.

Some problems with existing arrangements include the mess that is caused when servicing the bowl-cartridge filter. That is, when the bowl is removed from the filter head, it typically has oil, hydraulic fluid, or whatever fluid is being filtered within it. While removing the bowl from the filter head, the fact that the bowl has this liquid in it can lead to spills, drips, and inconvenience regarding disposal of this liquid. Improvements in filter design are desired to deal with these issues.

Other problems include the possibility of forgetting to replace the filter cartridge after removing the old filter cartridge. That is, after removing the old filter cartridge for servicing, it can be possible to replace the bowl back onto the filter head without operably inserting a new filter cartridge. This can lead to disastrous consequences for the equipment that needs the filtration. Furthermore, when there are multiple filter assemblies within close proximity of each other on one system, sometimes on a common filter head, the person servicing the filters can sometimes get mixed-up regarding which filter assembly goes on where—putting the wrong filter assembly onto the wrong mount on the filter head can lead to catastrophic results. Improvements to address these issues are desirable.

SUMMARY

To address these and other problems, in one aspect, a filter cartridge is provided. One example filter cartridge includes a first endcap defining a tubular wall defining an open volume. A tubular construction of filter media is secured to the first endcap. A second endcap is secured to the filter media at an end opposite of the first endcap. At least a first protrusion and a second protrusion extends from the tubular wall into the open volume. The first protrusion is spaced from the second protrusion in a vertical direction along the wall. The first protrusion is circumferentially-spaced from the second protrusion along the wall. At least first and second cover-gripping members extend from the first endcap. The first and second cover-gripping members are opposed to each other and deflectable radially toward and away from each other. The first and second cover-gripping members are constructed and arranged to mate with a portion of a cover when the filter cartridge is operably connected to a cover.

In another aspect, a filter assembly is provided including a filter base having a fluid inlet arrangement and an outlet channel arrangement. A housing is operably connected to the filter base to extend vertically above the filter base. The housing includes a surrounding wall defining an interior volume, an open mouth, a base end opposite of the mouth connected to the filter base, and a removable cover operably oriented over the mouth. A filter cartridge is removably oriented within the interior volume of the housing. The filter cartridge includes a tubular construction of filter media defining an open filter interior. A porous inner filter support is oriented within the open filter interior. The filter support includes at least one projection extending radially inwardly therefrom. A basket includes at least one cantilevered leg and extends axially in a direction toward the base end of the housing. The basket includes a grooved wall extending axially in a direction toward the open mouth of the housing. The basket is rotationally moveable from a first locked position in which the leg axially abuts the at least one projection on the filter support and an unlocked position in which the leg is free of axial abutment with the projection and permits the basket to move in a direction toward the base end of the housing. The grooved wall is constructed and arranged to rotate the basket from the first locked position to the unlocked position.

Preferably, there is a core piece operably oriented within the interior of the porous inner filter support, the core piece including a post and a basket-holder. In one embodiment, the post defines an air-vent passage extending the length of the post.

In one implementation, an adaptor ring can be used around the basket. The adaptor ring defines first and second protrusions that operably engage the basket.

In another aspect, a method of installing a filter cartridge into a topload filter assembly includes, first, a step of orienting a filter cartridge having a tubular construction of filter media into an open mouth of a filter housing. The filter housing defines a base at an end opposite of the mouth. The base defines an inlet and an outlet arrangement. The filter housing has an inner filter support mounted therein. The filter housing further has a core piece within the inner filter support. The core piece holds a basket. Next, the method includes a step of pushing the filter cartridge against the basket to disengage the core piece and the inner filter support. After disengaging, there is a step of axially moving both the filter cartridge and the core piece relative to the inner filter support. Next, there is a step of operably orienting a service cover over the mouth.

It is noted that not all the specific features described herein need to be incorporated in an arrangement for the arrangement to have some selected advantage according to the present disclosure.

BRIEF DESCRIPTION OF THE DRAWINGS

FIG. 33 is a perspective view illustrating a first embodiment of an adapter arrangement and how it would be utilized in the filter assembly;

FIG. 34 is a top plan view of the adapter of FIG. 33;

FIG. 35 is a perspective view of a second embodiment of an adapter arrangement;

FIG. 36 is a top plan view of the adapter arrangement of FIG. 35;

FIG. 37 is a perspective view of a third embodiment of an adapter arrangement;

FIG. 38 is a top plan view of the adapter arrangement of FIG. 37;

FIG. 40 is a perspective view of a first embodiment of a top load filter assembly having a removable filter cartridge, constructed according to principles of this disclosure;

FIG. 41 is a top plan view of the filter assembly of FIG. 40;

FIG. 42 is a cross-sectional view of the filter assembly of FIGS. 40 and 41, the cross-section being taken along the line 42-42 of FIG. 41;

FIG. 43 is a perspective view of the cross-section of FIG. 42;

FIG. 44 is a rear perspective view of the filter assembly of FIG. 40;

FIG. 45 is a top plan view of the filter assembly of FIG. 44;

FIG. 46 is a cross-sectional view of the filter assembly of FIGS. 40-45, the cross-section being taken along the line 46-46 of FIG. 45;

FIG. 48 is a perspective view of the filter cartridge used in the filter assembly of FIGS. 40-47;

FIG. 49 is a perspective cross-sectional view of the filter cartridge of FIG. 48 connected to the cover;

FIG. 50 is an enlarged perspective view of Section A of FIG. 49;

FIG. 51 is a perspective view of the cover used with the filter assembly of FIGS. 40-47;

FIG. 61 is a perspective, cross-sectional view of a core piece used in the filter assembly of FIGS. 54-60;

FIG. 62 is a perspective view of a tube used in the core piece of FIG. 61;

FIG. 63 is a top plan view of the core piece depicted in FIG. 61;

FIG. 64 is a bottom plan view of the core piece depicted in FIG. 61;

DETAILED DESCRIPTION

I. The Embodiments of FIGS. 1-39 from PCT Application US 08/61539, Filed on Apr. 25, 2008

A. Overview

Figure 1:
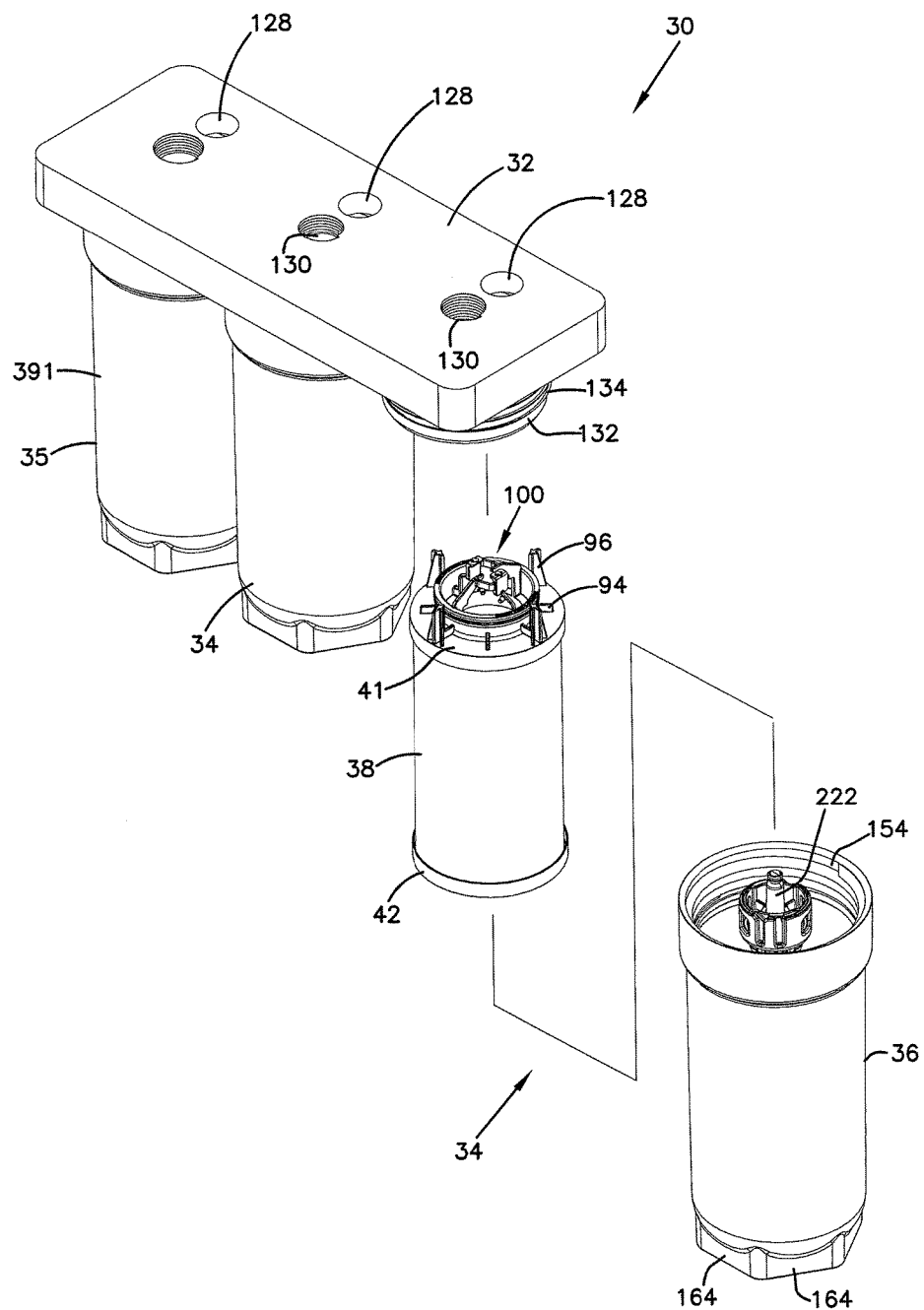
FIG. 1 is a perspective view of a filter system including a plurality of filter assemblies, one of which shows the filter cartridge removed from a filter bowl, constructed according to the disclosure of PCT patent application US 08/61539, filed on Apr. 25, 2008, commonly assigned, and incorporated herein by reference.
Figure 2:
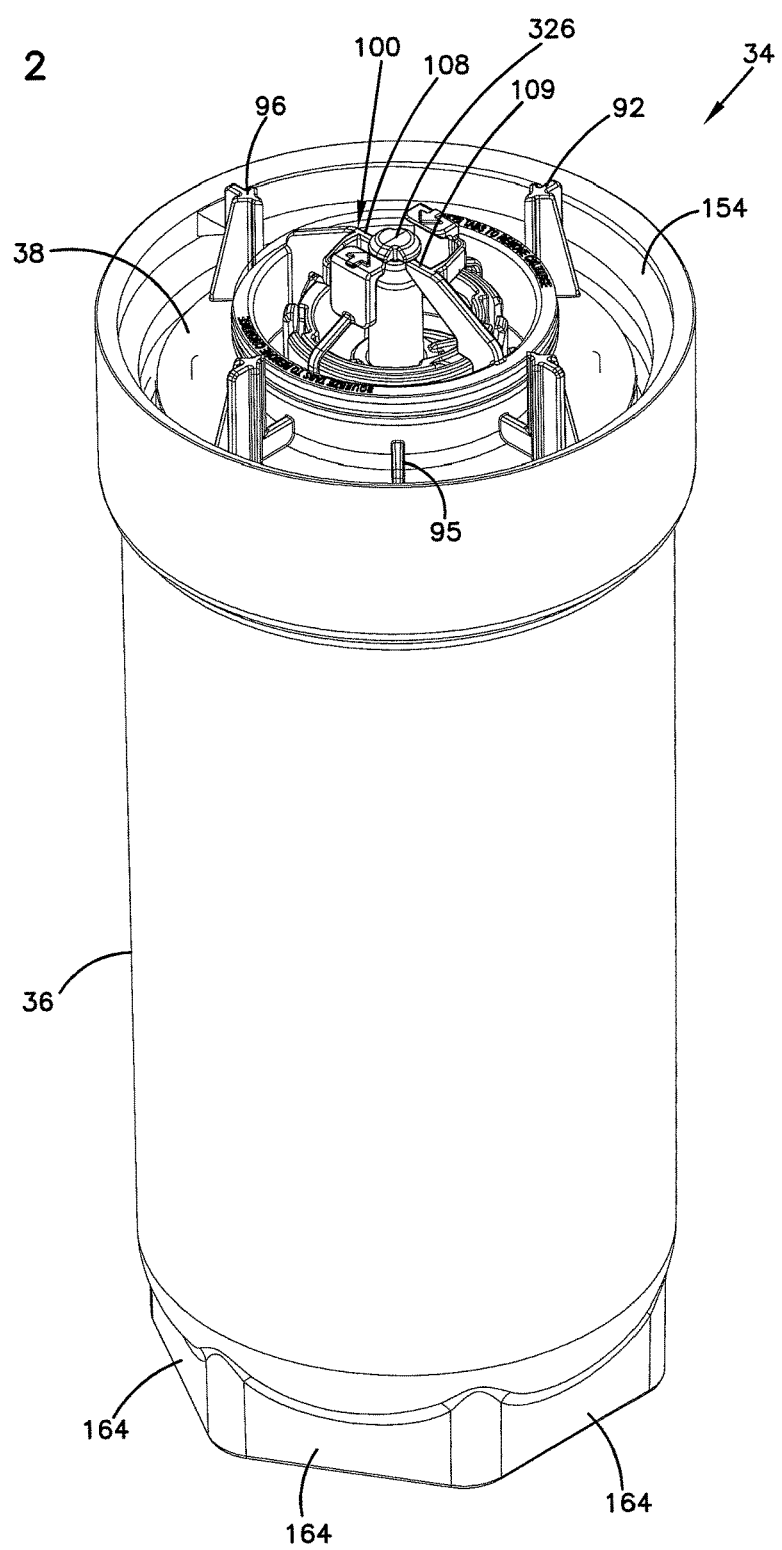
FIG. 2 is a perspective view of a filter assembly of FIG. 1 including a filter cartridge and filter bowl.
Figure 3:
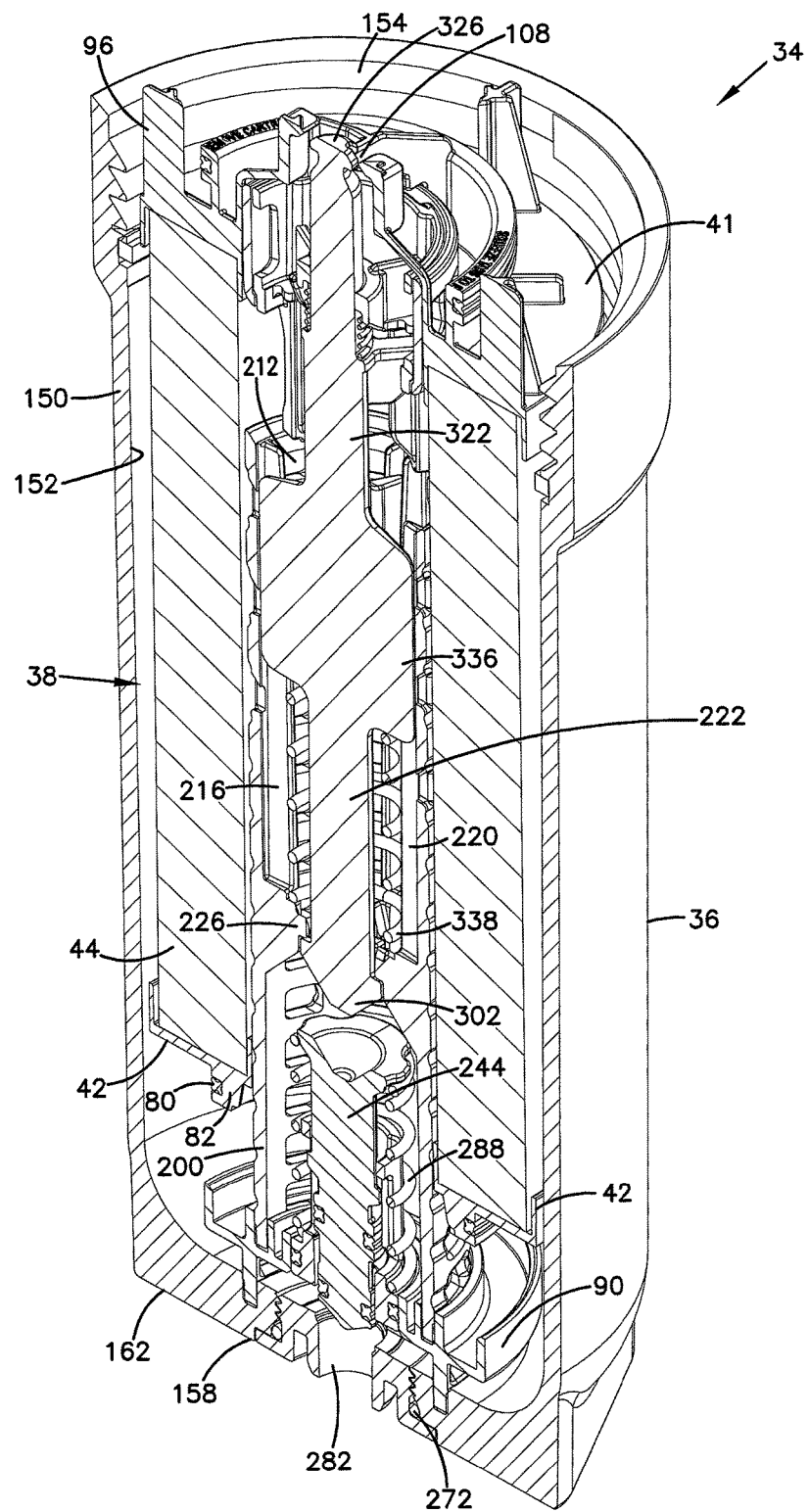
FIG. 3 is a perspective, cross-sectional view of the filter assembly depicted in FIG. 2.
Figure 4:
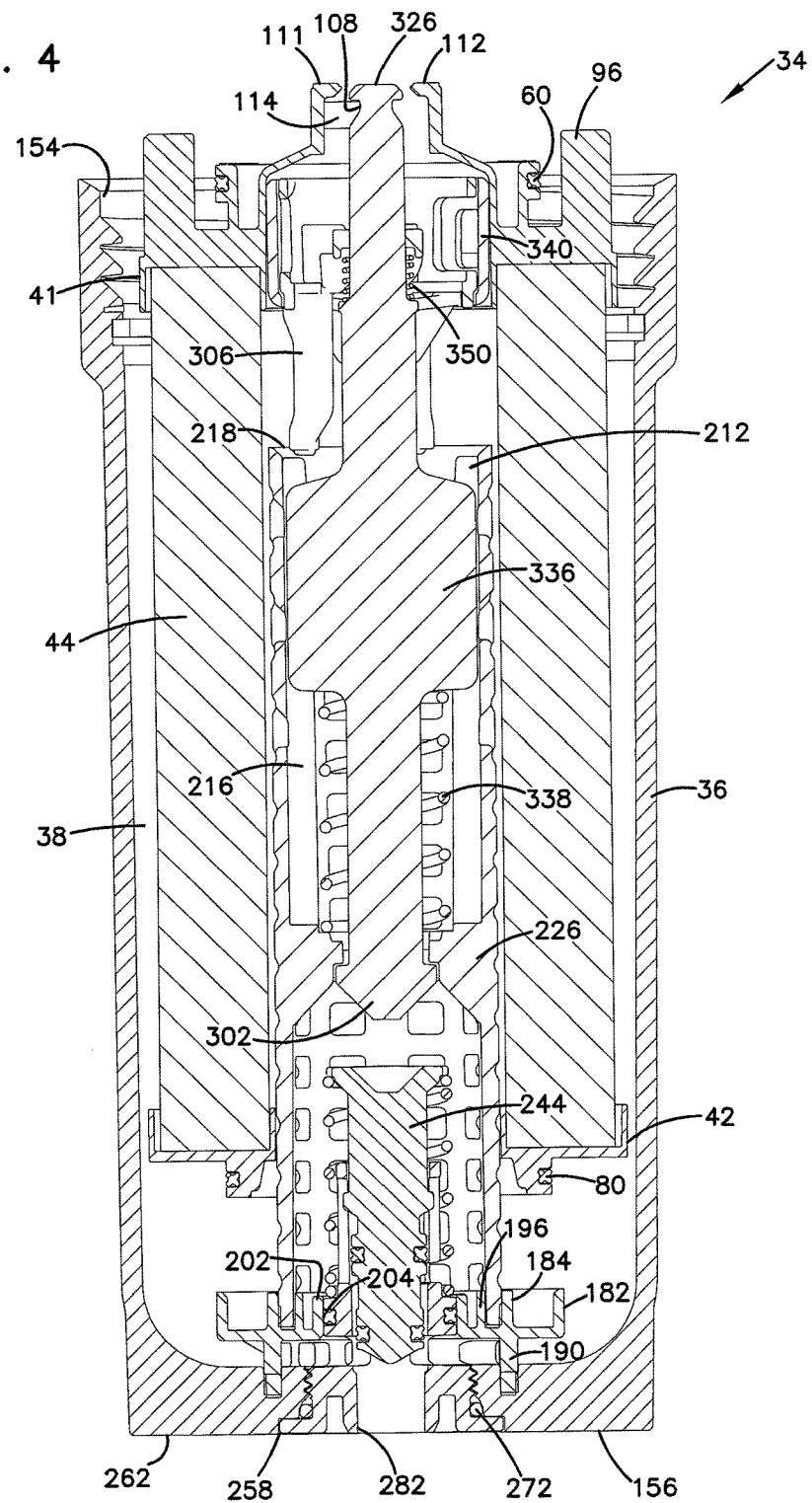
FIG. 4 is a cross-sectional view of the filter assembly depicted in FIG. 2.

An example embodiment of a filtration system including a filter assembly and a filter head is depicted in FIGS. 1-39. It should be realized that many examples are envisioned and not illustrated in the drawings. FIG. 1 shows a filter system 30, including a filter head 32 and a filter assembly 34. In the embodiment of FIG. 1, there is one common filter head 32 accommodating at least first and second filter assemblies 34. Also attached to the filter head 32 is a bypass filter assembly 35. The filter assemblies 34 are full-flow filters, while the filter assembly 35 is a bypass filter assembly.

In FIG. 1, one of the filter assemblies 34 is shown in an exploded, perspective view as including filter bowl 36 and a removable and replaceable filter cartridge 38.

Each of the filter assemblies 34, 35 is selectively connectable and mountable on the filter head 32. The filter head 32 is connected with other equipment, including a lubrication system of an engine, a fuel system for an engine, a hydraulic system for heavy-duty equipment, and generators for industrial use.

In the embodiment illustrated, the filter assembly 34 includes features including a lock-out mechanism, an auto-drain valve mechanism, and a cartridge retention mechanism. Each of these features can be implemented independently of the other features. The particular embodiment illustrated in the drawings shows all three features integrated into the same filter assembly. One skilled in the art will appreciate that each feature can be implemented independently of the others.

Figure 39:
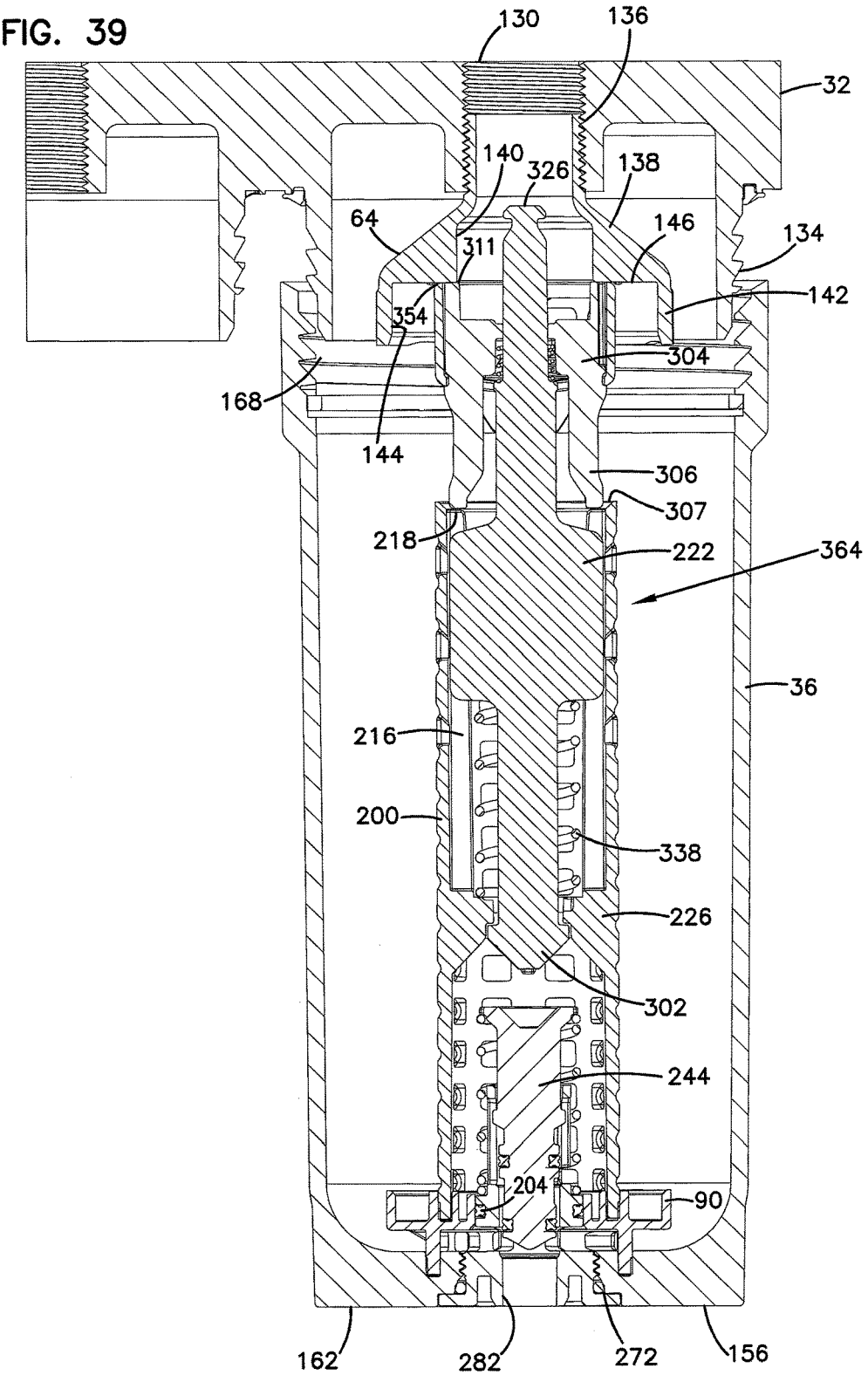
FIG. 39 is a cross-sectional view of the filter bowl not being able to mate with the filter head because of the lock-out arrangement.

In general, the lock-out mechanism ensures that the filter system 30 is not accidentally operated with equipment without the filter cartridge 38 installed therein (see FIG. 39, for example). Furthermore, in the particular system 30, the lock-out mechanism helps to ensure that the filter cartridge that goes within the bypass filter assembly 35 is not mistakenly used with the filter cartridge of the full-flow filter assemblies 34. The equipment upon which the filter system 30 is mounted is protected by ensuring that the filter head 32 and the filter bowl 36 cannot be operably connected unless there is a filter cartridge 38 operably oriented within the filter bowl 36 (FIG. 39). It also protects the equipment by ensuring that the correct filter cartridge 38 is mounted within the filter bowl 36, rather than, for example, the bypass filter cartridge utilized in the bypass filter assembly 35. Details on an example lock-out mechanism are described in Section K of this disclosure.

An auto-drain valve mechanism can be included in the filter system 30 and will allow for draining of the filtered liquid from the filter bowl 36 during servicing of the filter system 30. The auto-drain valve mechanism allows for draining of the filter bowl 36 before the filter cartridge 38 is removed from the bowl 36. An example embodiment is described in Section L of this disclosure.

The filter system 30, in this embodiment, also includes a cartridge retention mechanism. This feature allows for attachment of the filter cartridge 38 to the filter bowl 36 after the filter assembly 34 has been completely removed from the filter head 32. Section M describes an example embodiment of a cartridge retention mechanism.

For purposes of organization, it should be understood that the following description will be of various pieces of the particular, illustrated embodiment. After each of the pieces in this embodiment is described, the way in which the pieces interact to provide the above and other functions are described. Methods of operation, assembly, filtering, and servicing are also described. The following are example embodiments only. A variety of implementations can be made without departing from the scope of the disclosure. Not all of the reference numerals are shown on each FIG., for purposes of clarity.

B. Filter Cartridge 38, FIGS. 6 and 7

Figure 6:
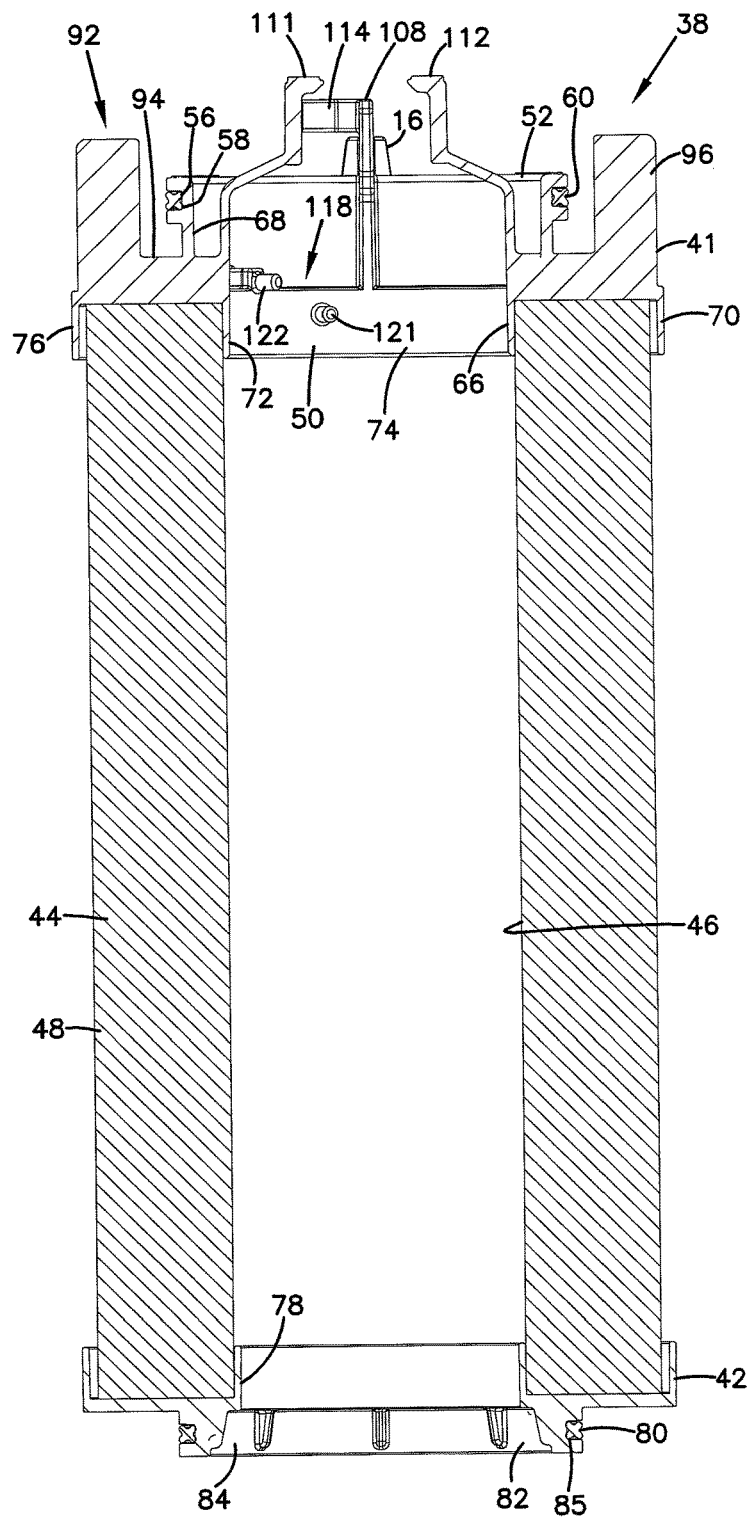
FIG. 6 is a cross-sectional view of the filter cartridge depicted in FIG. 5, the cross-section being taken along the line 6-6 of FIG. 5.
Figure 7:
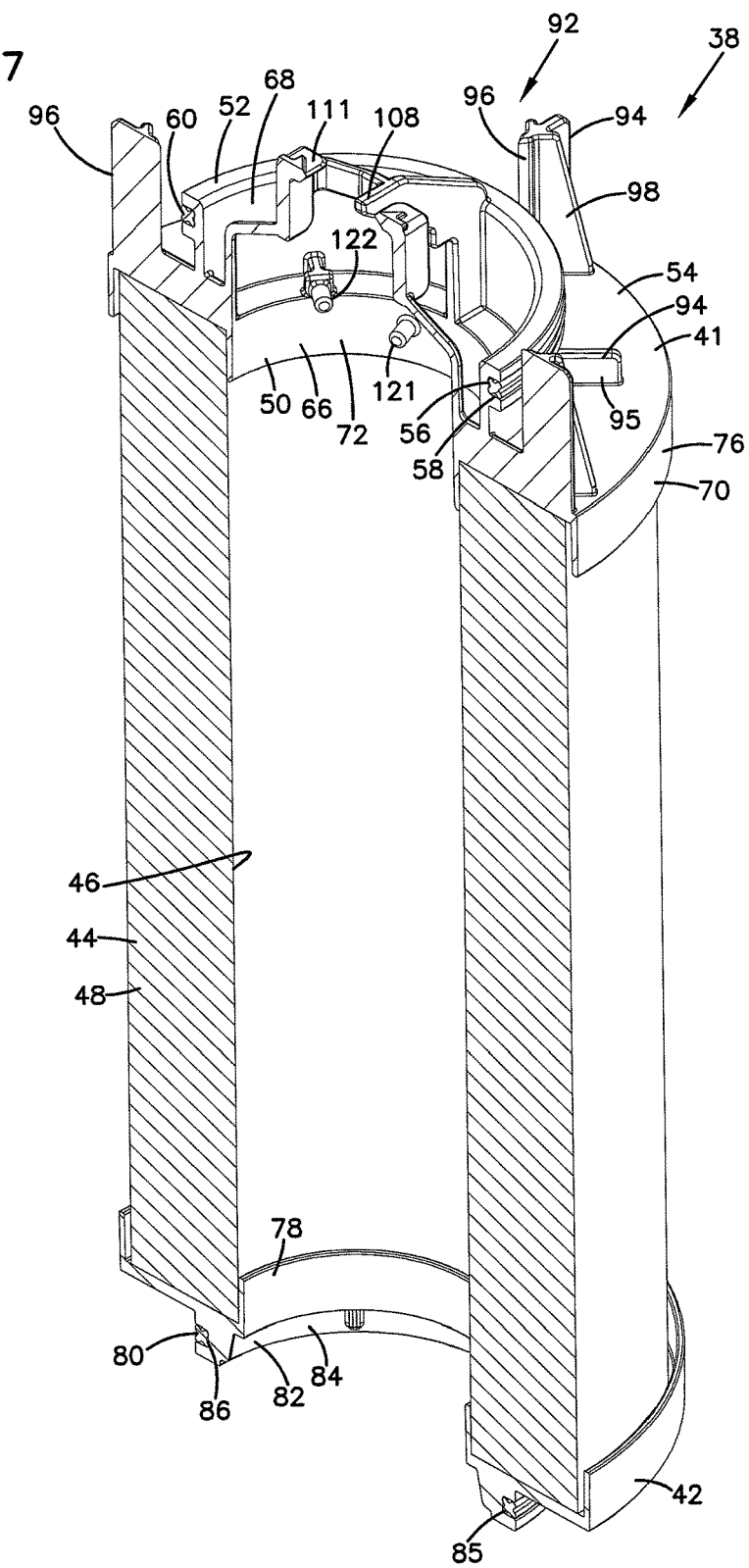
FIG. 7 is a perspective, cross-sectional view of the filter cartridge of FIGS. 5 and 6, the cross-section being taken along the line 7-7 of FIG. 5.

Reference is made to FIGS. 6 and 7, which illustrate one embodiment of filter cartridge 38 usable in this arrangement. In the embodiment shown, the filter cartridge 38 includes first and second opposite endcaps 41, 42 and a tubular construction of filter media 44 extending between the first and second endcaps 41, 42. In the embodiment shown, the media 44 is cylindrical in construction and defines an open filter interior 46. A variety of different types of media 44 can be used and will depend upon the particular fluid that is being filtered. In the embodiment shown, the media 44 is pleated media 48. The pleated media 48 can include cellulose, synthetic, and blends of synthetic and cellulose, for example.

In general, fluid to be filtered flows through the media 44, which functions to remove particulate or other debris from the fluid before flowing into the open filter 46. In some systems, it will be possible to operate the filter system 30 in a reverse-flow manner, in which the liquid to be filtered flows from the open filter interior 46, through the media 44, and to a region outside of the media 44.

The first endcap 41, depicted, defines a first open aperture 50, which is in fluid communication with the open filter interior 46. The first endcap 41 further includes an axially-extending neck 52 protruding from an outward axial surface 54. The neck 52 defines a groove 56 along an outer radial surface 58 of the neck 52. Seated within the groove 56 along the radial surface 58 is a first seal member 60. The first seal member 60 forms a releasable seal 62 (FIG. 11) with an adaptor 64 when the filter cartridge 38 is operably assembled in the filter system 30 with the filter head 32 operably engaged with the filter bowl 36.

The first endcap 41 defines an aperture wall 66 lining the first open aperture 50. The first open aperture 50 in the embodiment shown, is circular and defines an inner diameter. The neck 52 defines an inner radial surface 68 that is on an opposite side as the outer radial surface 58. In the embodiment shown, the first endcap 41 further defines a filter media holding section 70. The filter media holding section 70 is the portion of the first endcap 41 that is secured to the filter media 44 and contains the media 44 on radial sides thereof. In the embodiment shown, the filter media section 70 includes an inner media wall 72 defining an inner radial surface 74, which forms part of the aperture wall 66. The inner wall surface 74 of the inner media wall 72 is spaced radially inwardly relative to the neck inner radial surface 68. The filter media holding section 70 further includes an outer media wall 76 that circumscribes remaining portions of the first endcap 41. The first endcap 41 further includes other features, in the embodiment shown, and those features will be further described below after the second endcap 42 is described.

Second endcap 42 is at an end of the filter cartridge 38 opposite from the first endcap 41. The second endcap 42 is secured to a second end of the filter media 44. It defines a second open aperture 78 in communication with the open filter interior 46. The second endcap 42 holds a second endcap seal member 80.

In the embodiment shown, the second endcap 42 defines a second axially extending neck 82. The neck 82 defines inner and outer radial surfaces 84, 85. The second endcap seal member 80 is held by the second axially extending neck 82 on one of the radial surfaces, and in the embodiment shown, is held by the outer radial surface 85. In the embodiment shown, the neck 82 includes a groove 86 in the radial surface 85, which holds the second seal member 80. The second seal member 80 forms a releasable seal 88 (FIG. 12) with a disk 90. The disk 90 is secured to the bowl 36, and is further described below.

Figure 11:
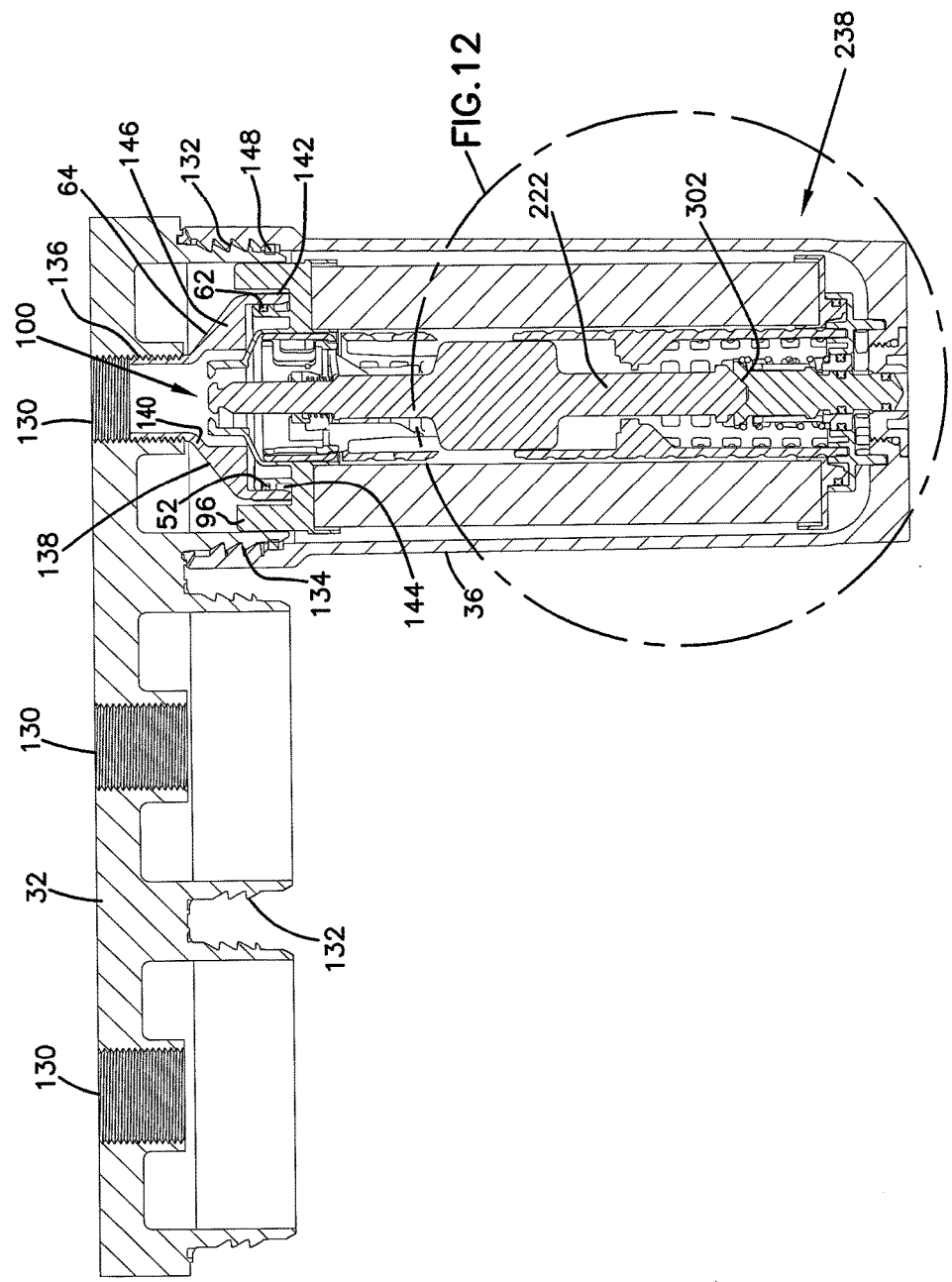
FIG. 11 is a cross-sectional view of a filter system, similar to FIG. 1, but depicting only a single filter assembly connected to a filter head.

The filter cartridge 38 further includes, in the embodiment shown, a centering arrangement 92 (FIG. 5) to assist with positioning and centering the filter cartridge 38 relative to the filter head 32. In the embodiment shown, the centering arrangement 92 includes a plurality of stand-offs or projections 94 extending axially from the outward axial surface 54 of the first endcap 41. In the embodiment shown, the projections 94 include both first projections 95 and second projections 96. The second projections 96 are taller than the first projections 95. The second projections 96, in cross section, have an L-shaped cross section and in preferred embodiments have ribs or flanges 98 to add strength. The second projections 96 assist in holding the filter cartridge 38 in place relative to the adaptor 64 (FIG. 11). As can be seen in FIG. 11, the adaptor 64 is contained between the second projections 96 and the first neck 52.

In the illustrated embodiment, the filter cartridge 58 further includes a retention mechanism 100. In the embodiment shown, the retention mechanism 100 is spaced both axially and radially from the neck 52. The retention mechanism 100 cooperates with other structure to retain the cartridge 38 with the filter bowl 36 during servicing. Details on this operation are discussed later below in Section M of this disclosure.

In the embodiment shown, the retention mechanism 100 is radially centered within the first open aperture 50. While a variety of implementations are contemplated, in the embodiment shown, the retention mechanism 100 includes a flexible semi-tubular arrangement 102 (FIG. 5) secured to a portion of the endcap 41, for example, the neck 52. By the term "semi-tubular", it is meant that when viewing in top plan, such as FIG. 5, overall it may be generally tubular in shape, but not necessarily have a closed perimeter, and the perimeter can form an irregular, non-circular shape, or it may also form a circle, in some embodiments shown.

Figure 5:
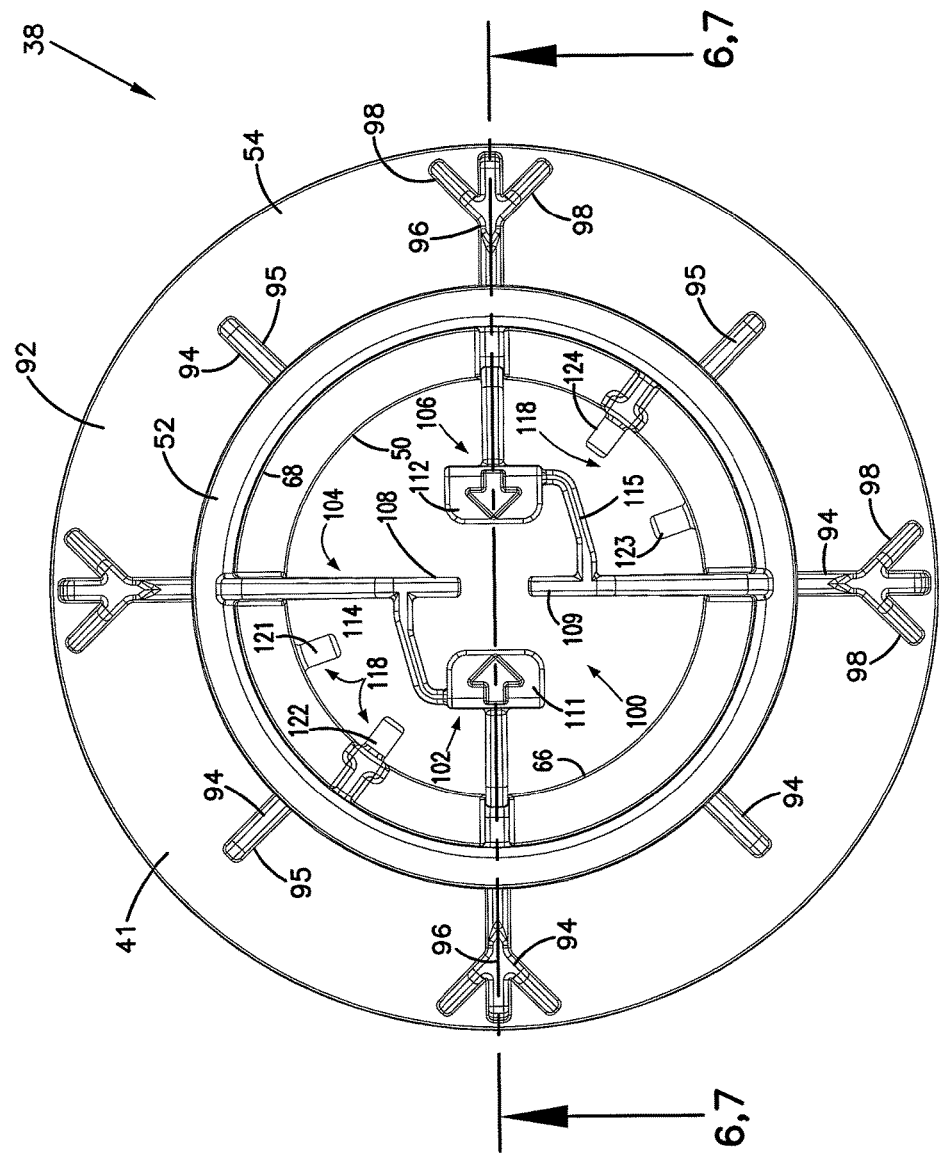
FIG. 5 is a top plan view of a filter cartridge utilized in the filter assembly of FIG. 2.

Still in reference to FIG. 5, the semi-tubular arrangement 102 has a gripper arrangement 104 and a release arrangement 106. In general, the gripper arrangement 104 is useful in providing a releasable connection with other structure in the filter bowl 36 to allow for the cartridge 38 to remain retained in the filter bowl 36 when servicing system 30. The release arrangement 106 is useful in providing a convenient, quick, and easy to use mechanism to release the filter cartridge 38 from the filter bowl 36, during servicing, and allow the cartridge 38 to be removed from the bowl 36.

As embodied herein, the gripper arrangement 104 includes a pair of opposing fingers 108, 109 radially extending into the end cap aperture 50. As will be explained below, in Section M of this disclosure, the fingers 108, 109 engage structure (a button 326, which is part of a core piece 222) in the filter bowl 36.

As embodied herein, the release arrangement 106 includes a pair of opposing tabs 111, 112. In the embodiment shown, each tab 111, 112 is located about 90 degrees relative to the fingers 108, 109. Tab 111 is connected to finger 108 by way of rib 114, while tab 112 is connected to finger 109 by way of rib 115.

The tabs 111, 112 are depressible or compressible in a direction toward each other, and because of the connection of the tabs 111, 112 to the fingers 108, 109 by way of the ribs 114, 115, upon squeezing the tabs 111, 112 toward each other, the ribs 114, 115 move the fingers 108, 109 away from each other. Moving the fingers 108, 109 away from each other will release the filter cartridge 38 from the corresponding structure in the filter bowl 36.

The filter cartridge 38 further includes a protrusion arrangement 118 (FIG. 5) extending into the first open aperture 50. The protrusion arrangement 118 cooperates, in one embodiment with the lock-out arrangement described in Section K below. In the embodiment shown, the protrusion arrangement 118 includes at least first and second protrusions 121, 122 extending from the aperture wall 66 and into the first open aperture 50. By reviewing FIGS. 6 and 7, it can be seen how in the preferred embodiment, the first protrusion 121 is spaced from the second protrusion 122 in a vertical direction along the aperture wall 66. That is, in the embodiment shown, the first protrusion 121 is vertically lower than the second protrusion 122. By reviewing FIGS. 6 and 7, it can further be appreciated that the first protrusion 121 is circumferentially-spaced from the second protrusion 122 along the aperture wall 66. In preferred embodiments, the vertical distance between first and second protrusions is between 2-30% of the distance of the inner diameter of the first open aperture 50.

In preferred embodiments, the first protrusion 121 extends into the first open aperture 50 no greater than 40% of the inner diameter of the first open aperture 50. Similarly, the second protrusion 122 extends into the first open aperture 50 no greater than 40% of the inner diameter of the first open aperture 50. In the preferred embodiment illustrated, the first and second protrusions 121, 122 extend a same amount into the first open aperture 50. In other embodiments, one of the first and second protrusions 121, 122 can be longer than the other.

Attention is directed to FIG. 5. In FIG. 5, there is a top plan view of the filter cartridge 38. In the embodiment shown, the protrusion arrangement 118 further includes at least a third protrusion 123 extending from the aperture wall 66 and into the first open aperture 50. The third protrusion 123 is circumferentially-spaced from the first protrusion 121 and the second protrusion 122. The third protrusion 123 is vertically spaced from only one of either the first protrusion 121 or the second protrusion 122; in other words, the third protrusion 123 is evenly spaced at the same vertical distance along the aperture wall 66 with only one of either the first protrusion 121 or the second protrusion 122.

In FIG. 5, it can be seen that the protrusion arrangement 118, in the embodiment shown, further includes at least a fourth protrusion 124. The fourth protrusion 124 is shown extending from the aperture wall 66 and into the first open aperture 50. The fourth protrusion 124 is circumferentially-spaced from the first protrusion 121, the second protrusion 122, and the third protrusion 123. The fourth protrusion 124 is vertically-spaced from only two of the first protrusion 121, the second protrusion 122, or the third protrusion 123. In other words, the fourth protrusion 124 is vertically even with only two of the first protrusion 121, the second protrusion 122, and the third protrusion 123.

In the particular embodiment illustrated, the third protrusion 123 is vertically-spaced from the second protrusion 122 and the fourth protrusion 124, while it is vertically even with the first protrusion 121. Also, in the specific illustrated embodiment, the fourth protrusion 124 is vertically even with the second protrusion 122, while being vertically spaced from the first protrusion 121 and the third protrusion 123.

While the embodiment of FIG. 5 identifies the first protrusion at 121, it could also be located at the physical location of the third protrusion 123. Likewise, while the second protrusion is shown in FIG. 5 at reference numeral 122, it could also be at the location shown at fourth protrusion 124. In other words, in one contemplated embodiment, the protrusion arrangement 118 can include only a protrusion located at 121 and a protrusion located at 122. Another variation includes the protrusion arrangement 118 as including a protrusion only at 121 and only at 124. Another variation of the protrusion arrangement 118 includes a protrusion only at 123 and 122. Another variation includes the protrusion arrangement 118 as including a protrusion only at 123 and only at 124. The particular embodiment illustrated has the protrusion arrangement 118 as including four protrusions at 121, 122, 123, and 124. Additional protrusions can be utilized to help cooperate with the other features of the assembly 34, but in the embodiment of FIG. 5, there are only four protrusions depicted.

In the embodiment shown, for the protrusion arrangement 118, two of the first protrusion 121, second protrusion 122, third protrusion 123, and fourth protrusion 124 are circumferentially-spaced within 45 degrees of each other (for example, 10-20 degrees), and a remaining two of the first protrusion 121, second protrusion 122, third protrusion 123, and fourth protrusion 124 are located within 45 degrees of each other (for example, 10-20 degrees). In the embodiment illustrated in FIG. 5, the first protrusion 121 and second protrusion 122 are circumferentially-spaced within 45 degrees of each other, while the third protrusion 123 and fourth protrusion 124 are circumferentially-spaced within 45 degrees of each other. In general, in preferred embodiments, the first protrusion 121 and the second protrusion 122 are circumferentially-spaced within 50 degrees of each other.

In some arrangements, one of the protrusions will be located greater than 45 degrees relative to the other protrusion. For example, consider an embodiment in which the protrusion arrangement 118 includes a first protrusion at 121, and the second protrusion is located where the fourth protrusion 124 is located—in such an embodiment, the protrusions are located greater than 45 degrees relative to each other. In such a case, it could be said that the first protrusion 121 and the second protrusion located at reference numeral 124 are circumferentially-spaced greater than 45 degrees of each other. An analogous embodiment would include a first protrusion at reference numeral 123 and a second protrusion at reference numeral 122.

C. The Filter Head 32 and Adaptor 64

In FIGS. 1, 11, and 39, a schematic depiction of filter head 32 is shown. The filter head 32 in the embodiment shown has an inlet conduit 128 (FIG. 1) and an outlet conduit 130. As mentioned above, in the particular example shown in FIG. 1, the filter head 32 shows connections with three filter assemblies, two of which are full-flow filter assemblies 34, and one of which is a bypass filter assembly 35. Of course, this is just an example, and other arrangements can include only a single filter assembly 34 connected to a filter head 32. The filter head 32 is connected to other equipment, such that liquid to be filtered flows into the filter head 32 through the inlet conduit 128 and then exits the filter head 32 by flowing through the outlet conduit 130. In some example arrangements, the filter head 32 is constructed of a cast metal part.

The filter head 32 includes mating structure 132 for selective engagement with the filter bowl 36. In the embodiment shown, the mating structure 118 includes threads 134. The threads 134 are illustrated as being along an outer radial surface of the filter head 32. Of course, the threads 134 can also be located on an inner radial surface of the filter head 32. In addition, other ways of connecting the bowl 36 to the filter head 32 are contemplated, as conventionally known in the art.

In FIG. 11, it can be seen that the adaptor 64 is connected to the outlet conduit 130, in this example, by way of threads 136. In this manner, the adaptor 64 can be selectively secured to the filter head 32 through engagement through the threads 136. Other ways can also be used to attach the adaptor 64 to the filter head 32, including, for example, press-fit, adhesive, welding, or making the adaptor 64 integral to the head 32.

In the embodiment shown, the adaptor 64 includes a funnel 138 circumscribing a central, open aperture 140. Extending from the funnel 138 is a cylindrical wall 142. The wall 142 becomes positioned between the first neck 52 and the second projection 96 of the first endcap 91. The wall 142 defines an inner radial surface 144, which provides a surface against which seal 62 (FIG. 11) is formed between the filter cartridge 38 and the adaptor 64.

Extending from an inner wall of the funnel surface 138 is a plurality of ribs 146. The ribs 146, in this embodiment, cooperate with the lock-out mechanism (Section K, below) in that they interfere with a portion of the filter bowl 36 when the cartridge 38 is not operably oriented within the filter bowl 36, and the engagement between the ribs 146 and the structure within the filter bowl 36 prevents the filter head 32 from threadably engaging the filter bowl 36. See FIG. 39 for an example of when the ribs 146 engage end rims 311, 354 of an inner assembly 364, as described more fully below in Section K of this disclosure.

From reviewing FIG. 11, it can also be seen how the filter head 32 forms a seal 148 with the bowl 36, when the seal 136 is operably-mounted on the filter head 132.

D. Filter Bowl 36

Figure 8:
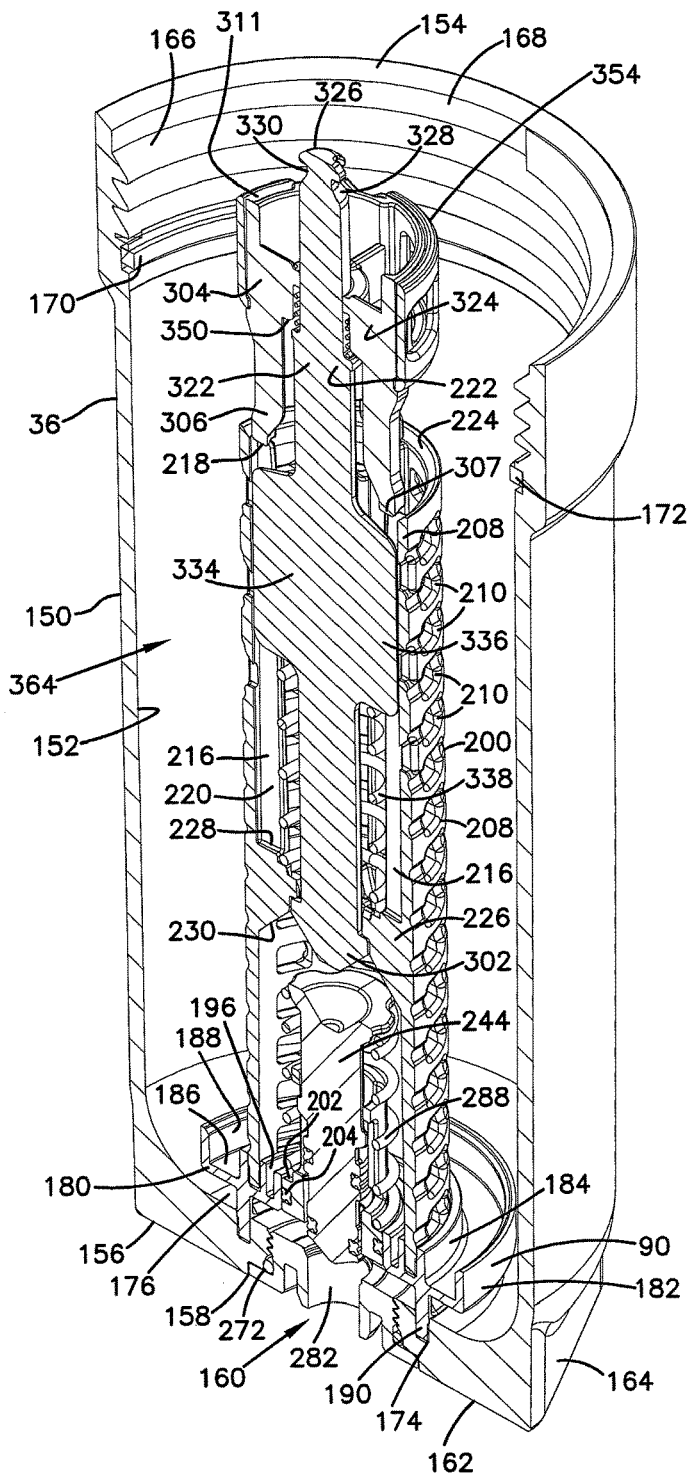
FIG. 8 is a perspective, cross-sectional view of only the filter bowl and inner assembly, with the filter cartridge being removed therefrom.

Attention is directed to FIG. 8, in which a perspective, cross-sectional view of the filter bowl 36 is illustrated. In the embodiment shown, the filter bowl 36 includes a surrounding wall 150 defining an open interior volume 152 for receiving and holding filter cartridge 38 therein.

The bowl 36 has, at one end, an open mouth 154 for allowing the filter cartridge 38 to be selectively inserted and removed from the bowl 36. At an end opposite of the open mouth 154 is a closed end 156 defining an opening 158. In preferred embodiments, the opening 158 cooperates to form part of a drainage aperture arrangement 160.

The closed end 156 in the embodiment shown generally has a flat base 162 to allow the bowl 36 to be stood on a horizontal surface, such as a shop bench, without tipping. In this embodiment, the end 156 further includes flat side surfaces 164 (FIG. 1) to be used in conjunction with a tool, such as a wrench.

Adjacent to the mouth 154 is mating structure 156, illustrated herein as threads 168. The threads 168 are selectively engageable with the threads 134 of the filter head 132 to allow for attachment and removal of the bowl 36 with the filter head 32. Of course, the threads 168 could also be on an exterior wall with threads 134 on the head 132 on an interior wall. Also viewable in FIG. 8 is a seal member 170 held on an inner radial surface of the surrounding wall 150 within a groove 172. The seal member 170 forms seal 148 (FIG. 11) with the filter head 32.

The closed end 156 of the bowl 36, in the embodiment shown, includes a disk-holding groove 174. The disk-holding groove 174 is defined by a floor 176 on an inner surface of the wall 150 at the closed end 156. The disk-holding groove 174 supports the disk 90 extending axially from the floor 176 of the inside surface of the wall 150 of the bowl 36.

In the embodiment shown in FIG. 8, the disk 90 includes a cartridge-receiving tray 180 constructed and arranged to receive at least a portion of the filter cartridge 38. In preferred embodiments, the cartridge receiving tray 180 receives the second axially-extending neck 82 of the filter cartridge 38 and forms seal 88 (FIG. 12) therewith. In FIG. 8, the cartridge receiving tray 180 includes an outer ring 182, an inner ring 184, and a base 186 therebetween. In the embodiment shown in FIG. 12, the seal 88 is formed between and against neck 82 and an inner radial surface 188 of the outer ring 182.

Figure 12:
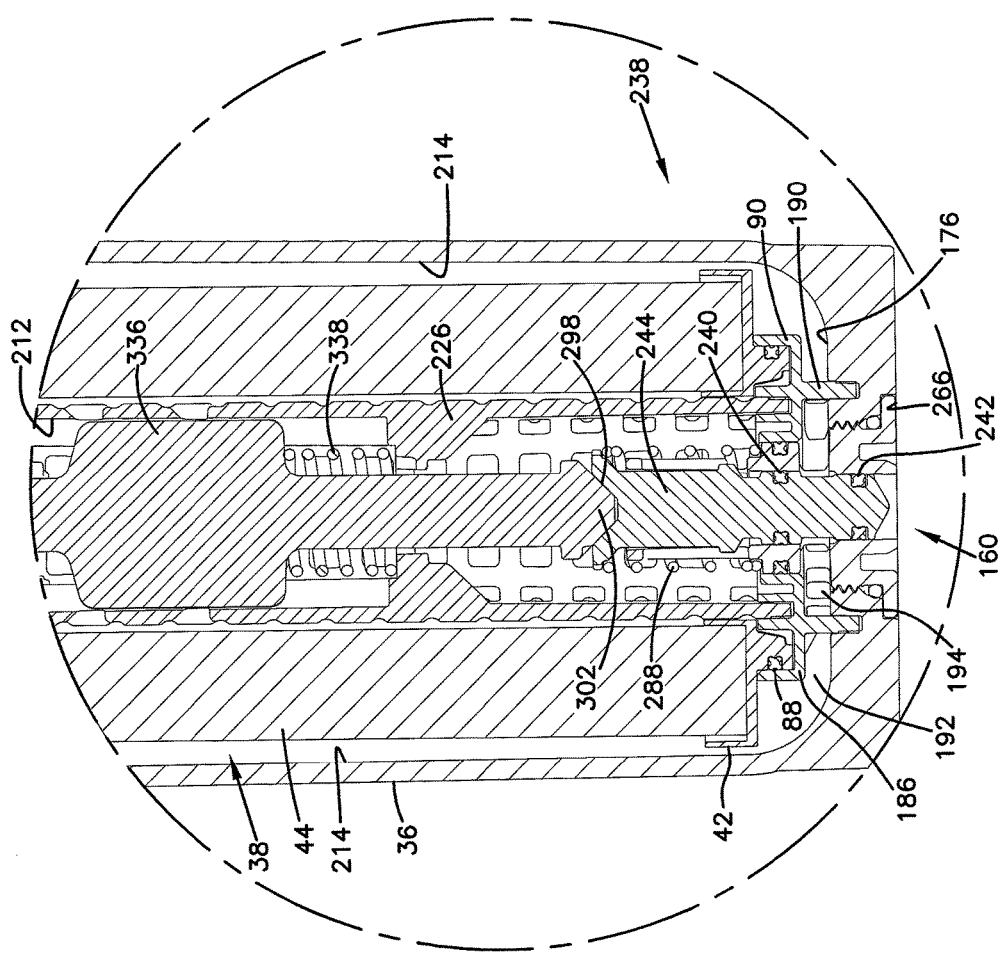
FIG. 12 is an enlarged, cross-sectional view of the drain valve feature depicted in FIG. 11.

Extending axially below the cartridge-receiving tray 180 is a base ring 190, which is held by and fixed within the disk-holding groove 174. As can be seen in FIGS. 8 and 12, the base ring 190 holds a remaining portion of the disk 90 from the floor 176 to allow for a flow of liquid in the volume 192 (FIG. 12) between the base 186 and the floor 176. The base ring 190 includes through-holes 194 (FIG. 12) to allow for the flow of fluid to flow from volume 192 through the base ring 190, and in a direction toward the drainage aperture arrangement 160.

In the embodiment shown in FIG. 8, the disk 90 further includes a second inner ring 196. The second inner ring 196 is spaced radially inwardly of the inner ring 184. The space located between the inner ring 184 and the second inner ring 196 accommodates a porous inner filter support 200, described further below. In the embodiment shown, the disk 90 further includes a third inner ring 202 located radially inwardly of the second inner ring 196. The third inner ring 202 has an inner radial surface that provides a seal surface for forming a seal 204 between a drain valve housing 206 (FIGS. 13 and 15) and the disk 90.

E. Porous Inner Filter Support 200

One embodiment of a porous inner filter support 200 is illustrated in various FIGS. including, for example, FIGS. 3, 4, 8, 9, 11, and 18. Portions of the filter support 200 can be seen in several of the other figures. The porous inner filter support 200 is oriented within the open filter interior 46 (FIG. 6) of the filter cartridge 38. Further, in the embodiment shown, the porous inner filter support 200 is oriented within the open interior volume 152 of the bowl 36. In the specific embodiment illustrated, the inner filter support 200 is secured to the filter bowl 36 by being secured to the disk 90 between inner ring 184 and second inner ring 196. In other embodiments, the support 200 can be secured directly to the bowl 36 at, for example, the floor 176 of the bowl 36. Filter support 200 can be permanently secured to the disk 90 through a variety of techniques including adhesive, press-fit, staking, welding; or, the support 200 and the bowl 36 can be the same integral piece. In another embodiment, the disk 90 and the filter support 200 can be the same integral piece.

In the embodiment illustrated, the inner filter support 200 includes a porous wall 208. The porous wall 208 defines a plurality of flow passages 210 (FIGS. 8, 9 and 18) therethrough. In use, the filter support 200 functions to help support the filter media 44 by lining the open filter interior 46 of the media 44, and the flow passages 210 allow for the filtered liquid to flow into a filtered liquid volume 212 (FIGS. 3 and 4) within the porous wall 208.

In preferred embodiments, the porous wall 208 of the filter support 200 includes a plurality of guide rails 216 projecting radially inwardly in a direction toward an inside volume of the filter support 200. In the cross section of FIGS. 8 and 9, a cross-section of the guide rails 216 is depicted, so that only half of the guide rail 216 is viewable. In FIGS. 19-22, the upper ends of the guide rails 216 can be seen. In FIGS. 19-22, the upper ends of the guide rails 216 function as projections 218 extending from a remaining portion of the porous wall 208; the projections 218 cooperate with the lock-out mechanism, explained below. Between the guide rails 216, a slide channel 220 (FIG. 8) is formed, which helps to slidably hold a portion (e.g., fins 336) of a core piece 222, described further below. As can be seen in FIG. 8, the guide rails 216 extend at least a partial length along the wall 208 of the filter support 200. In FIG. 8, the guide rails 216 are shown extending from a free end 224 of the filter support 200 about half way down the full length of the filter support 200.

In the embodiment shown, the porous inner filter support 200 further includes an inwardly extending shoulder or support 226. The inwardly extending support 226 extends radially inwardly from the wall 208 and includes an upper surface 228 and a lower surface 230. The support 226 defines a throat or opening 232, as it extends circumferentially along and within the wall 208 of the filter support 200. The opening 232 within the inwardly extending support 226 allows for a portion of the core piece 222 to slide therewithin and also cooperates with a portion (e.g., the head 302) of the core piece 222 to help hold the core piece 222 in place. It also helps to cooperate with the auto-drain mechanism, which is described in Section L below.

F. Drain Valve Assembly

The filter system 30 depicted also has a drain-valve assembly 236 (FIG. 13) to allow liquid in the complete assembly to automatically be drained during the servicing of the system 30. The drain-valve assembly 236 can be implemented independently of other features in the example embodiment. For example, the drain valve assembly 236 can be implemented independently of the lock-out mechanism and cartridge retention mechanism 100.

Figure 13:
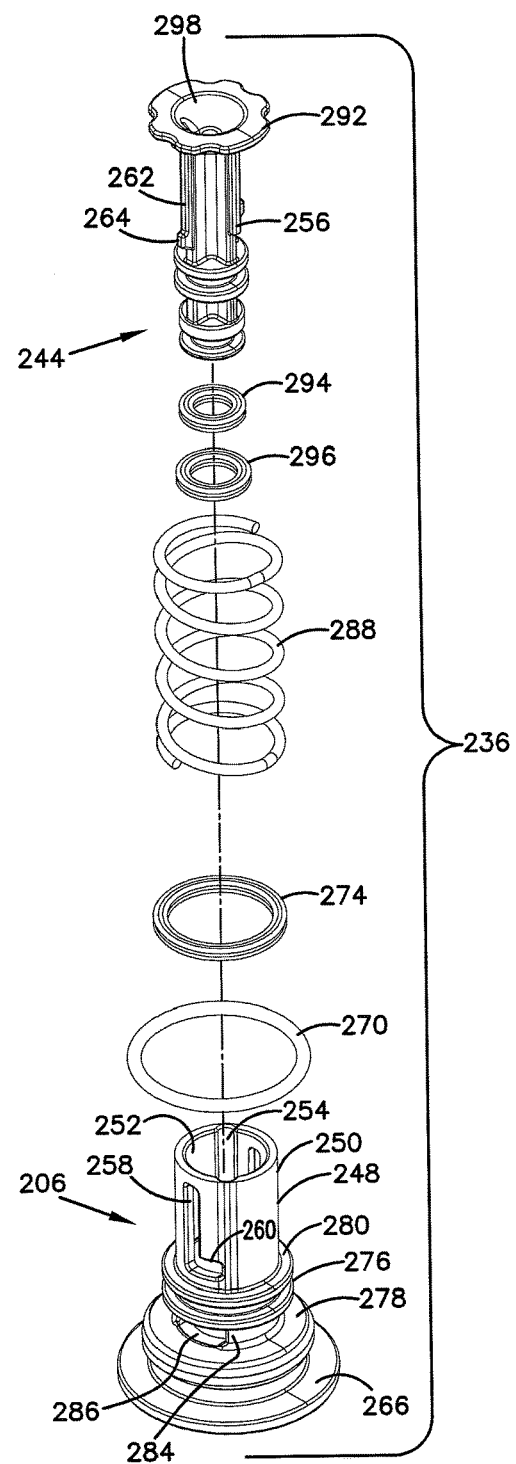
FIG. 13 is an exploded, perspective view of a drain valve assembly utilized in the filter assembly of FIGS. 1-12.

Attention is directed to FIGS. 12 and 13. In FIGS. 12 and 13, the filter cartridge 38 is operably positioned in the filter bowl 36, and the bowl 36 is fully-threaded on the filter head 32. In this condition, the drain-valve assembly 236 is in a sealed position 238. In the sealed position 238, there is in place a first plug seal 240 and a second plug seal 242.

Figure 9:
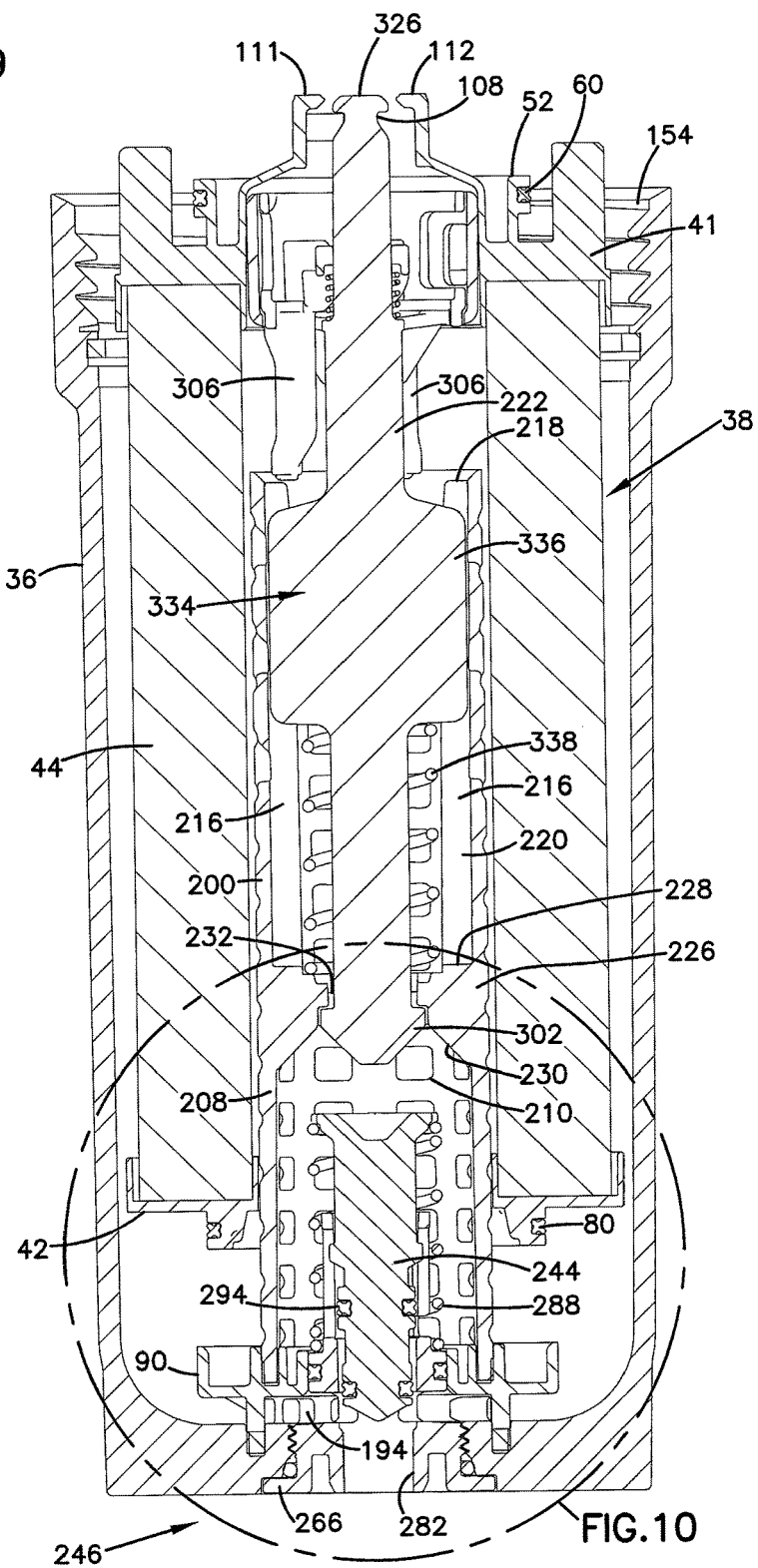
FIG. 9 is a cross-sectional view of the filter assembly similar to FIG. 4 and highlighting a drain valve feature.
Figure 10:
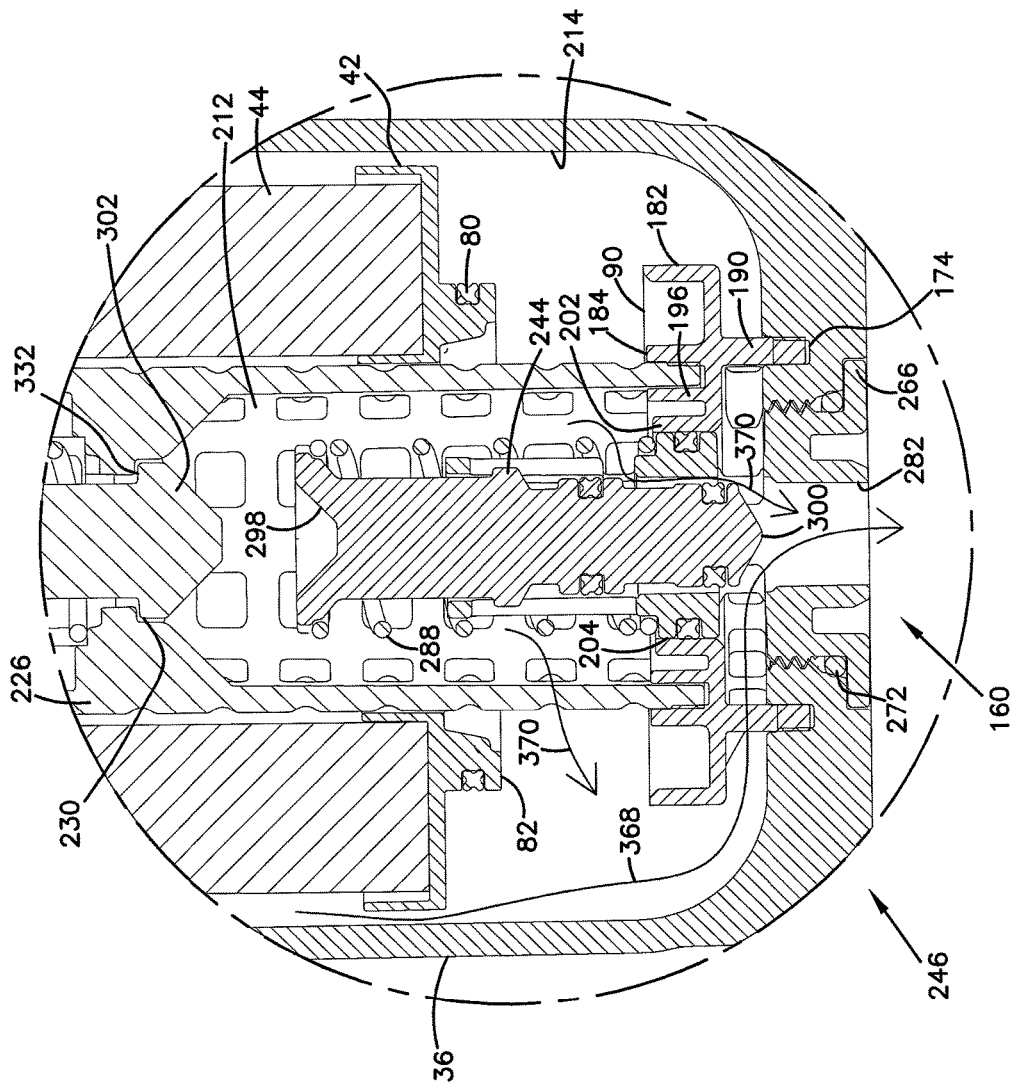
FIG. 10 is an enlarged cross-sectional view of the region of the drain valve feature of FIG. 9.

The drain-valve assembly 236 includes a plug 244. The plug 244 is movably oriented between the sealed position 238 (FIGS. 11 and 12) and a drainage position 246 (FIGS. 9 and 10, for example). The sealed position 238 includes the plug 244 blocking fluid flow between the interior volume 152 of the bowl 36 and the drainage aperture arrangement 160. The drainage position 246 includes the plug 244 being oriented relative to the bowl 36 to permit flow from the interior volume 152 of the bowl 36 through the drainage aperture arrangement 160.

Figure 14:
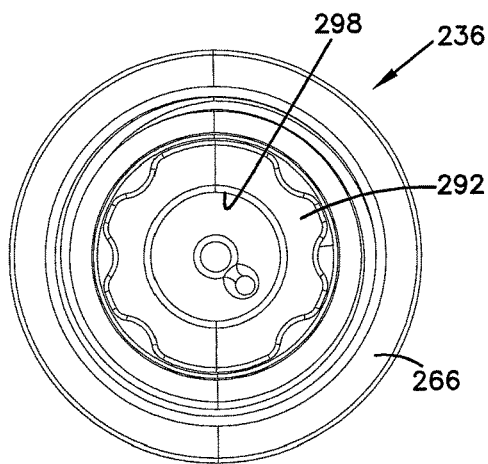
FIG. 14 is a top plan view of the drain valve assembly of FIG. 13, when assembled together.
Figure 15:
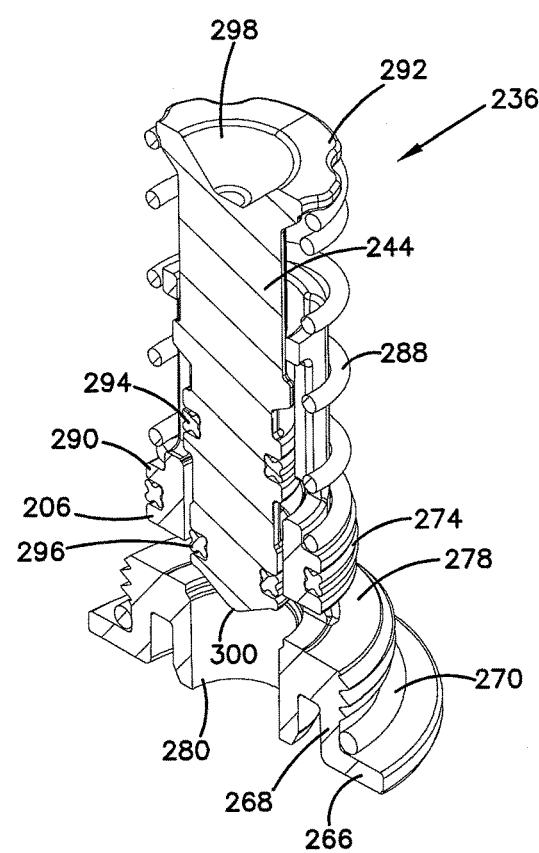
FIG. 15 is a perspective, cross-sectional view of the assembled drain valve assembly of FIGS. 13 and 14.
Figure 16:
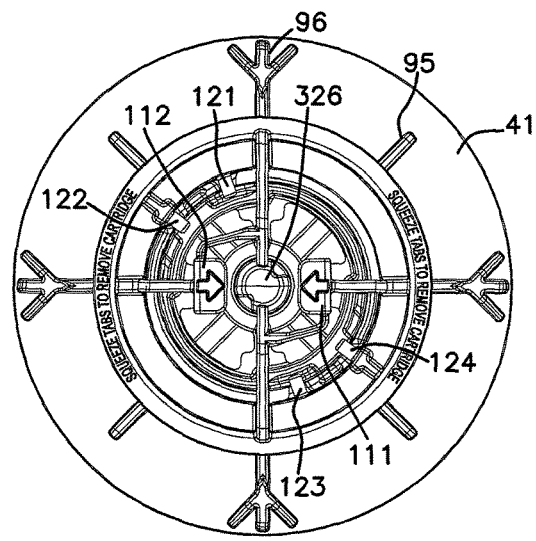
FIG. 16 is a top plan view of an endcap of the filter cartridge as it is ready to engage a core piece and filter support, remaining portions of the filter cartridge being omitted for purposes of explanation.
Figure 17:
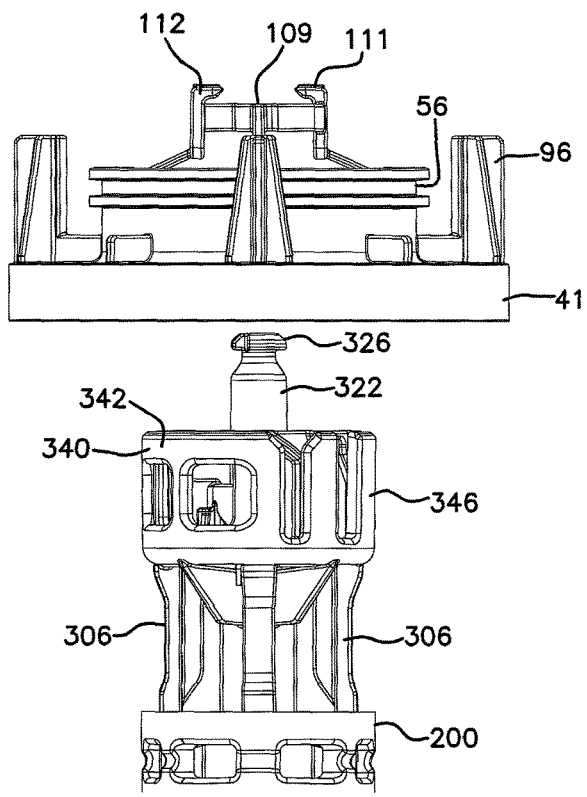
FIG. 17 is a side elevational view of the view of FIG. 16, showing the endcap, core piece, and a portion of the filter support.
Figure 18:
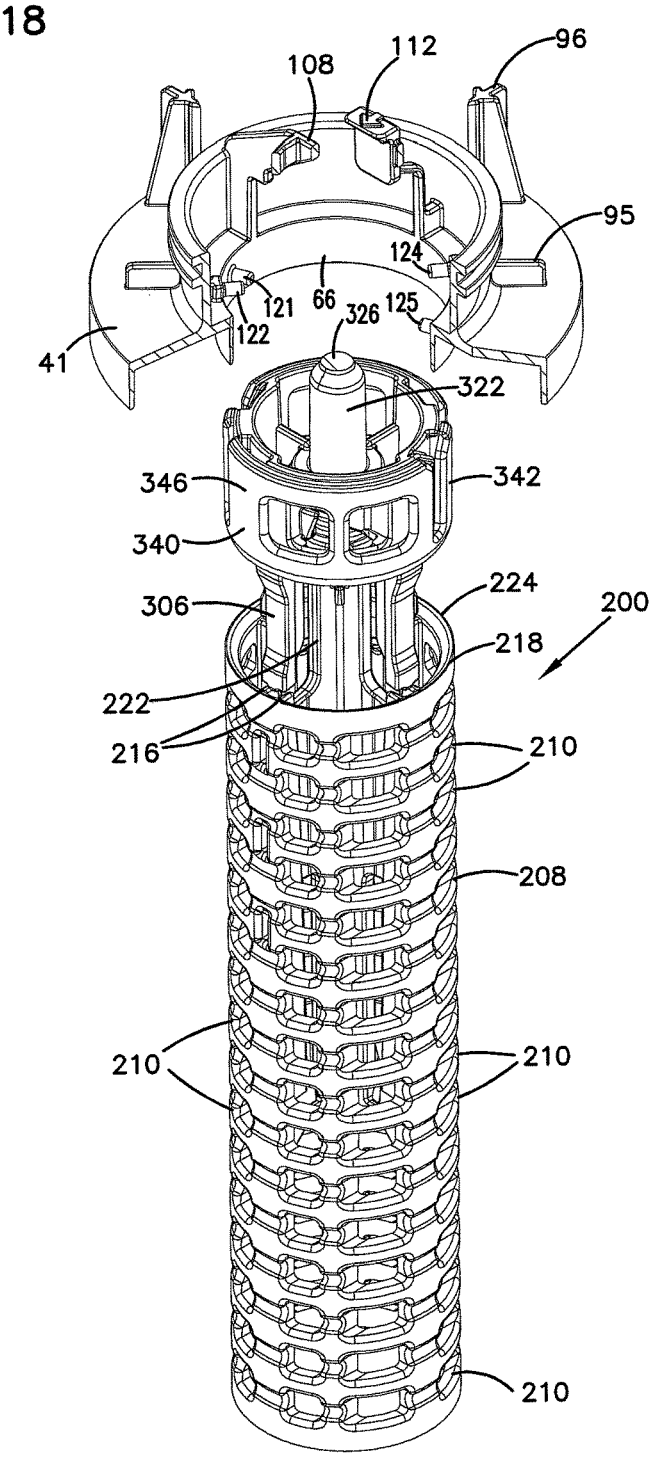
FIG. 18 is a perspective view of FIG. 17 and showing the full extension of the filter support, while having a portion of the endcap broken away.

FIGS. 13-15 show one example embodiment of drain valve assembly 236. FIG. 13 shows an exploded, perspective view of the drain-valve assembly 236, while FIG. 14 is a top plan view of the assembly 236 after it has been assembled. FIG. 15 is a cross-sectional perspective view of the drain valve assembly 236, after it has been assembled.

While a variety of embodiments can be used, in the embodiment pictured in FIGS. 13-15, the drain valve assembly 236 includes a valve housing 248. The valve housing 248 includes a generally tubular wall 250 defining an opening 252. The opening 252 receives the plug 244, such that the plug 244 is axially moveable therewithin. The wall 250 defines a pair of grooves 254 extending longitudinally, and constructed and arranged to receive corresponding ribs 256 on the plug 244. The wall 250 further includes an elongated slot 258 including a transverse portion 260. The elongated slot 258 receives ribs 262 emanating from the plug 244. The ribs 262 have hooks or extensions 264 that help to keep the plug 244 from popping out of the valve housing 248 through opening 252.

Still in reference to FIGS. 13-15, the valve housing 248 depicted further includes a base 266. The base 266 is held within the opening 158 (FIG. 8) of the bowl 36, and when properly oriented therein forms a part of the flat base 162 of the bowl 36. Extending vertically from the base 266 is a wall 268 (FIG. 15). The wall 268, in the embodiment shown, is threaded such that it can be removably mounted within the opening 158 of the bowl 36. Along the wall 268 is a valve seal member 270. The seal member 270 forms a second valve seal 272 (FIG. 8) with the bowl 36. The second valve seal 272 prevents fluid from flowing from the bowl 36 through the opening 158.

The first valve seal 204 was described above. The first valve seal 204 is formed by seal member 274 which is held within a groove 276 of the valve housing 248. The seal member 274 forms first valve seal 204 (FIG. 8) with the disk 90 connected to the bowl 36 to prevent unfiltered fluid from bypassing the filter media 44 and flowing into the open filter 46.

Still in reference to FIG. 15, in the valve housing 248 depicted, extending from the wall 268 is an upper base 278. The upper base 278, in the embodiment shown, is generally parallel to the base 266, but is radially spaced and vertically spaced therefrom. Extending downwardly from the upper base 278 is an inner wall 280. The inner wall 280 forms the drain port 282 (FIG. 8) of the drainage aperture arrangement 160.

Extending upwardly from the upper base 278 is a slotted wall 284 (FIG. 13). The slotted wall 284 has apertures 286 to allow liquid to flow through the wall 284.

Still in reference to FIGS. 13-15, a spring 288 is operably oriented around the valve housing wall 250 and pushes against a portion of the plug 244. Specifically, the spring 288 is located between an outwardly extending rib 290 extending outwardly from the wall 250 of the valve housing 248. The spring 288 engages rib 290 and against flange 292 of the plug 244. The spring 288 biases the plug 244 to be in the position in FIG. 15, which corresponds to drainage position 246. The plug 244 is moveable within the opening 252 of the valve housing 248 in a direction toward the sealed position 238 by compression of the spring 288.

The drain valve assembly 236 further includes a first plug seal member 294 secured to the plug 244 to form first plug seal 240 (FIG. 12). The first plug seal 240 prevents unfiltered fluid from bypassing the filter media 44 and then flowing into the open filter interior 246, when the plug 244 is in the sealed position 238 (FIG. 12). The drain valve assembly 236 further includes a second plug seal member 296 secured to the plug 244 to form the second plug seal 242 (FIG. 12) with the inner wall 280 of the valve housing 248. The second plug seal 242 prevents liquid from flowing from the bowl 36 through the drain port 282 of the drainage aperture arrangement 160.

Still in reference to FIGS. 13-15, in the embodiment shown, the plug 244 includes a receiver 298, which is circumscribed by the flange 292. The receiver 298 is at an end of the plug 244 that is opposite from a sealing end 300 (FIG. 15) of the plug 244. The receiver 298 is generally bowl-shaped and is constructed and arranged to engage and receive a portion (head 302) of the core piece 222, described further below.

Details of the core piece 222 are described further below. One portion of the core piece 222 includes a core piece head 302 (FIGS. 8, 11, and 12). The head 302 engages the plug 244 when the drain valve assembly 236 is in its sealed position 238. When the head 302 moves away from the plug 244, this allows the plug 244 to move axially within the interior of the filter support 200, with the spring 288, to allow the plug 244 to move to the drainage position 246.

Further details on operation of the auto drain valve assembly 236 are described further below in Section L.

G. Basket 304

Figure 24:
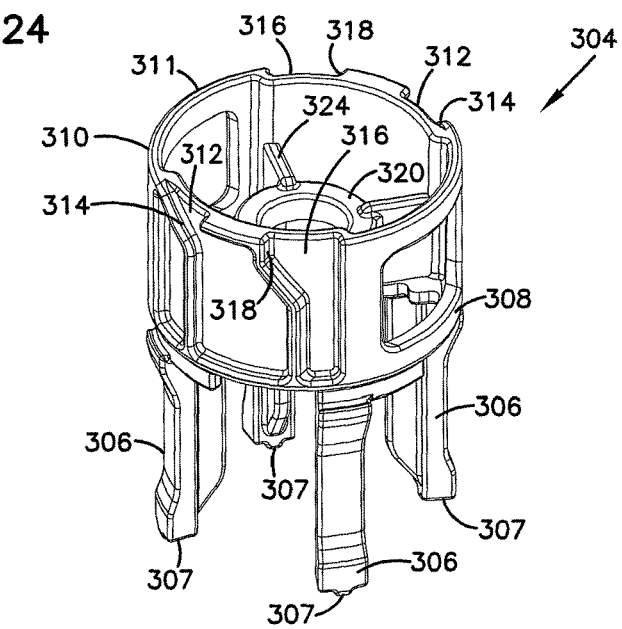
FIG. 24 is a perspective view of the basket.

Attention is directed to FIG. 24. A basket 304 is illustrated in perspective view. The basket 304 can be seen in various other views, and the FIG. 24 perspective view is an example implementation. The basket 304 is part of the lock-out mechanism, and its function will be more fully-described below in Section K.

In the embodiment illustrated, the basket 304 includes at least one cantilevered leg 306 extending from a basket base 308. The leg 306 extends axially in a direction toward the closed end 156 of the bowl 36. In preferred embodiments, the basket 34 includes a plurality of legs 306, and in the example embodiment shown, there are four legs 306, evenly and circumferentially spaced relative to each other.

Figure 19:
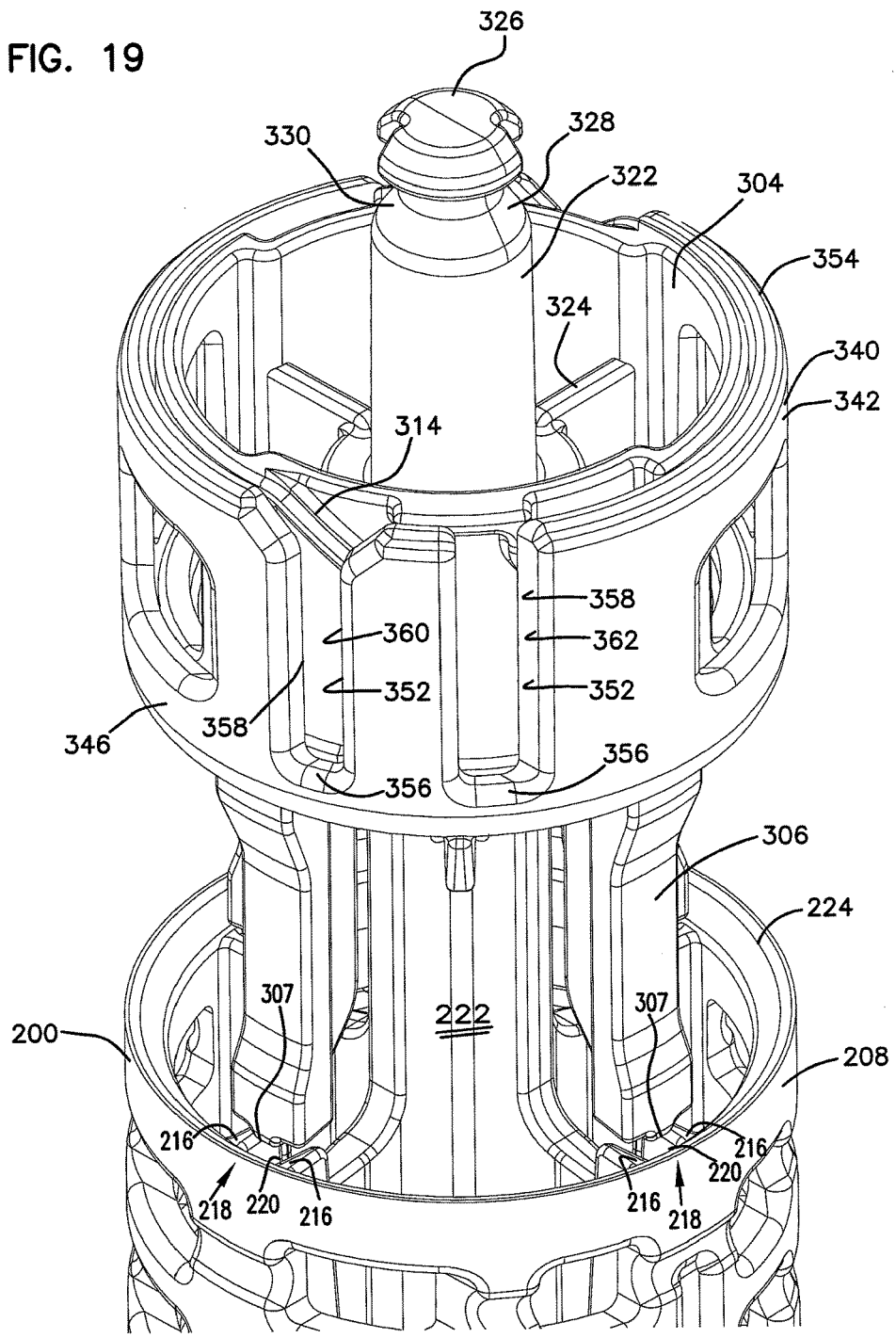
FIG. 19 is a perspective view showing the basket within a basket holder of the core piece and in a first locked position relative to the filter support.
Figure 21:
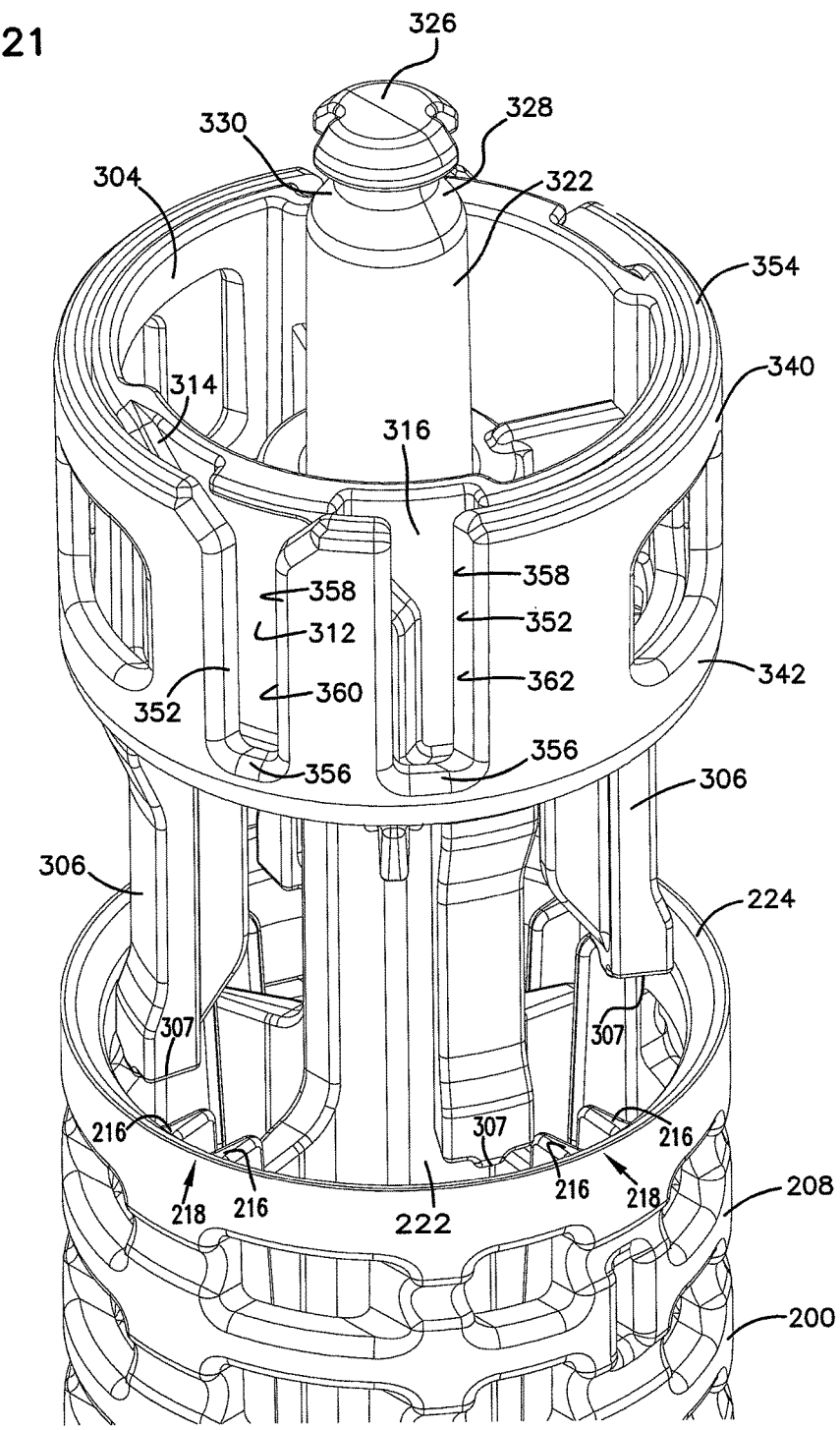
FIG. 21 is a perspective view analogous to FIGS. 19 and 20 but showing the basket in an unlocked position relative to the filter support.

The embodiment of the basket 304 depicted further includes a grooved wall 310. The groove wall 310 forms, generally, a cylinder and extends axially in a direction toward the open mouth 154 of the bowl 36. In general, the grooved wall 310 is constructed and arranged to engage a portion of the filter cartridge 38 such that the engagement with the filter cartridge 38 will rotate the basket 304 from a first locked position to an unlocked position. The first locked position is a position in which the at least one leg 306 axially abuts the projection 218 on the filter support 200 (FIG. 19). The unlocked position is a position in which the at least one leg 306 is free of the axial abutment with the projection 218 and permits the basket 304 to move in a direction toward the end 156 of the bowl 36 (FIG. 21).

Figure 20:
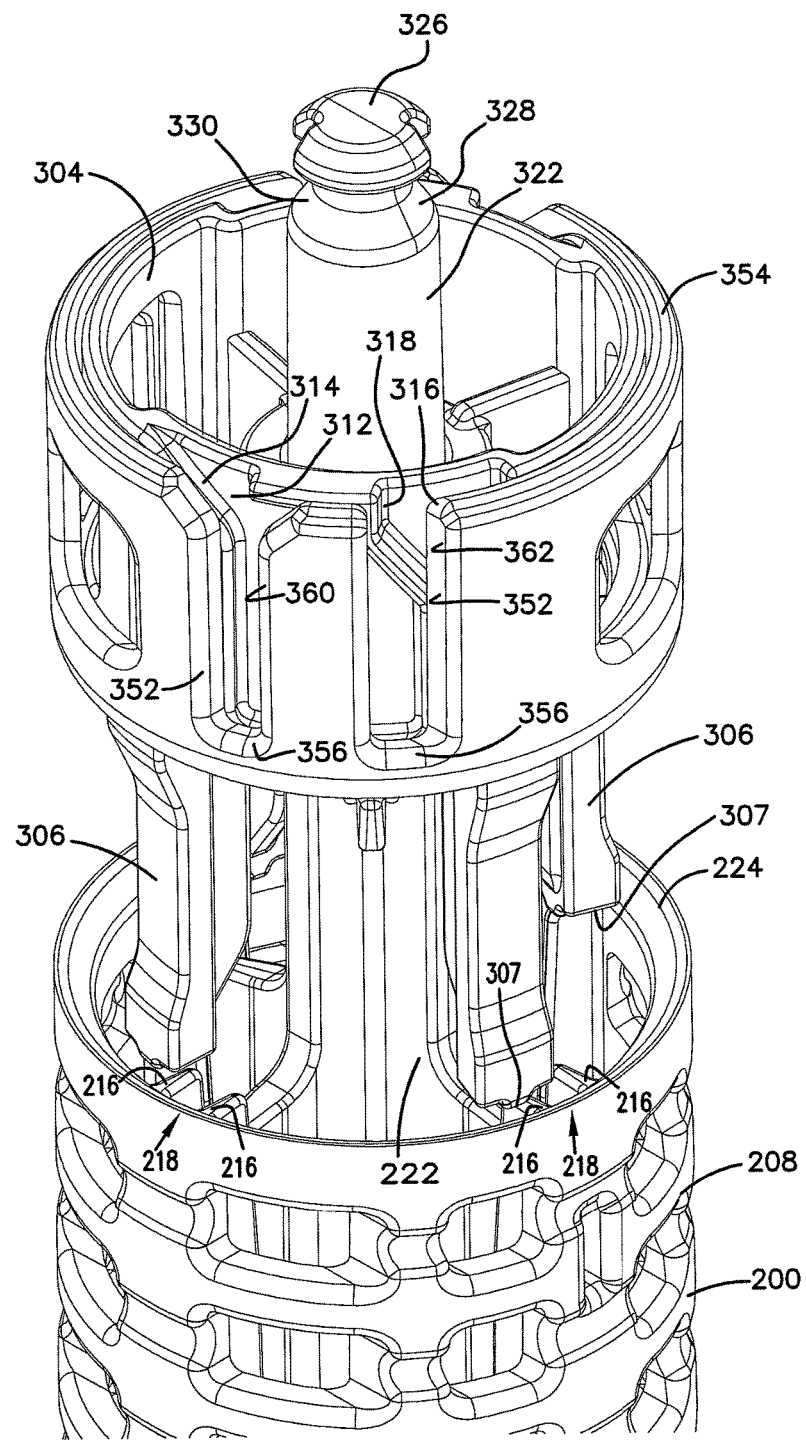
FIG. 20 is a perspective view analogous to FIG. 19, but showing the basket in a second locked position relative to the filter support.

In preferred embodiments, the basket 304 is rotationally moveable from the first locked position (FIG. 19) to a second locked position (FIG. 20). In the second locked position (FIG. 20), the at least one leg 306 is partially free of the abutment against the at least one projection 218 on the filter support 200, but there is still axial interference therebetween.

The grooved wall 310 has at least a first groove 312 with a first slide surface 314, and a second groove 316 with a second slide surface 318. In the preferred embodiment, the grooved wall 310 includes a pair of first grooves 312, each having a first slide surface 314, and a pair of second grooves 316, each having a second slide surface 318. As can be seen in FIG. 24, the pair of first grooves 312 are located about 180 degrees relative to each other while the pair of second grooves 316 are located about 180 degrees relative to each other.

The first slide surface 314 of the first groove 312 is constructed and arranged to engage the filter cartridge 38 and rotate the basket 304 from the first locked position to the second locked position. This rotation of the basket 304 also exposes the second slide surface 318 of the second groove 316 to engagement with the filter cartridge 38. An example can be seen by comparing FIGS. 19 and 20. In FIG. 19, the basket 304 is in the first locked position. The first slide surface 314 is exposed to engagement with the filter cartridge 38. In particular, and as explained further below in Section K, the first slide surface 314 engages the first protrusion 121 of the filter cartridge 38. The third protrusion 123 will engage the other first slide surface 314, in preferred embodiments. The first protrusion 121 engages the first slide surface 314, which rotates the basket 304 clockwise when viewed from above. The basket 304 is rotated to the second locked position, depicted in FIG. 20. The second locked position then exposes the second slide surface 318. The second slide surface 318, in preferred embodiments, has the second protrusion 122 engage against it, which causes the basket 304 to further rotate clockwise, when viewed above, to the unlocked position as shown in FIG. 21. In preferred embodiments, the fourth protrusion 124 will engage the other second slide surface 318.

In FIG. 24, in the embodiment shown, the basket 304 further includes a hollow column circumscribed by the grooved wall 310. In use, as explained further below, the column 320 receives a post 322, which is part of the core piece 222, explained in Section H below. The basket 304 further includes webs or flanges 324 extending between the column 320 and the grooved wall 310.

Further operation of the basket 304 is described below in connection with the lock-out mechanism, Section K.

H. Core Piece 222 and Spring

Several FIGS. show an embodiment of The core piece 222. The core piece 222 is operably-oriented within the interior of the wall 208 of the filter support 200, and within the filtered liquid volume 212.

As mentioned above, in the embodiment shown, the core piece 222 includes post 322. At one free end of the post 322, a button 326 is defined. Adjacent to the button 326 is a reduced dimension 328 in the form of a neck 330. The post 322 is received by the column 320 of the basket 304. The retention mechanism 100 engages the post 322 at the button 326. Specifically, the gripper arrangement 104 holds the post 322 at the button 326 by having fingers 108, 109 engage the neck 330 of the post 322. Further operational details of the retention arrangement 100 are discussed below in Section M.

As mentioned previously, the post 322 further includes, at an end opposite of the button 326, the head 302. In the embodiment shown, the head 302 is mushroom-shaped and constructed and arranged to engage the inwardly extending shoulder or support 226 of the filter support 200.

The head 302 of the core piece 222 is movably oriented between an engaged position and a released position. The engaged position includes the head 302 being oriented against the receiver 298 of the plug 244 to push the plug 244 into the sealed position 238. The released position includes the head 302 being spaced away from the receiver 298 of the plug 244 to allow the plug 244 to move to the drainage position 246. When the head 302 is in the released position, a radial flange 332 (FIG. 10) on the head 302 is engaged against lower surface 230 of the inwardly extending support 226. When the head 302 is in its engaged position (FIG. 12), the head 302 is engaged against the plug 244 and received within the receiver 298.

In the embodiment shown, the core piece 222 further includes a fin arrangement 334. The fin arrangement 334 includes a plurality of fins 336 projecting radially from a center longitudinal axis of the post 322. In preferred embodiments, the fins 336 slide within respective channels 220 defined by guide rails 216. The fins 336, in cooperation with the channels 220 within the guide rails 216, ensure that the core piece 222 will maintain operable orientation and sliding orientation within the porous inner filter support 200. A core piece spring 338 is operably oriented between the fin arrangement 334 and the upper surface 228 of the support 226 (FIG. 10). The spring 338 will exert a pushing force on the core piece 222 in a direction axially upwardly relative to the porous inner filter support 200 and in a direction toward the open mouth 154 of the bowl 36.

In reference now to FIGS. 17-22, the core piece 222 further includes a basket holder 340. The basket holder 340 supports the basket 304 and allows the basket 304 to move between its first locked position (FIG. 19), to its second locked position (FIG. 20), and to its unlocked position (FIG. 21). In the embodiment shown, the basket holder 340 includes an apertured frame 342. The apertured frame 342 defines leg-receiving apertures 344 (FIG. 22), such that the legs 306 of the basket 306 can penetrate the basket holder 340 by having legs 306 pass through the leg-receiving apertures 344. The basket holder frame 342 includes a slotted wall 346 circumscribing the post 322 and also includes spokes 348 (FIG. 22) joining the slotted wall 346 to the post 322. Adjacent spokes 348 define the leg-receiving apertures 344.

Figure 22:
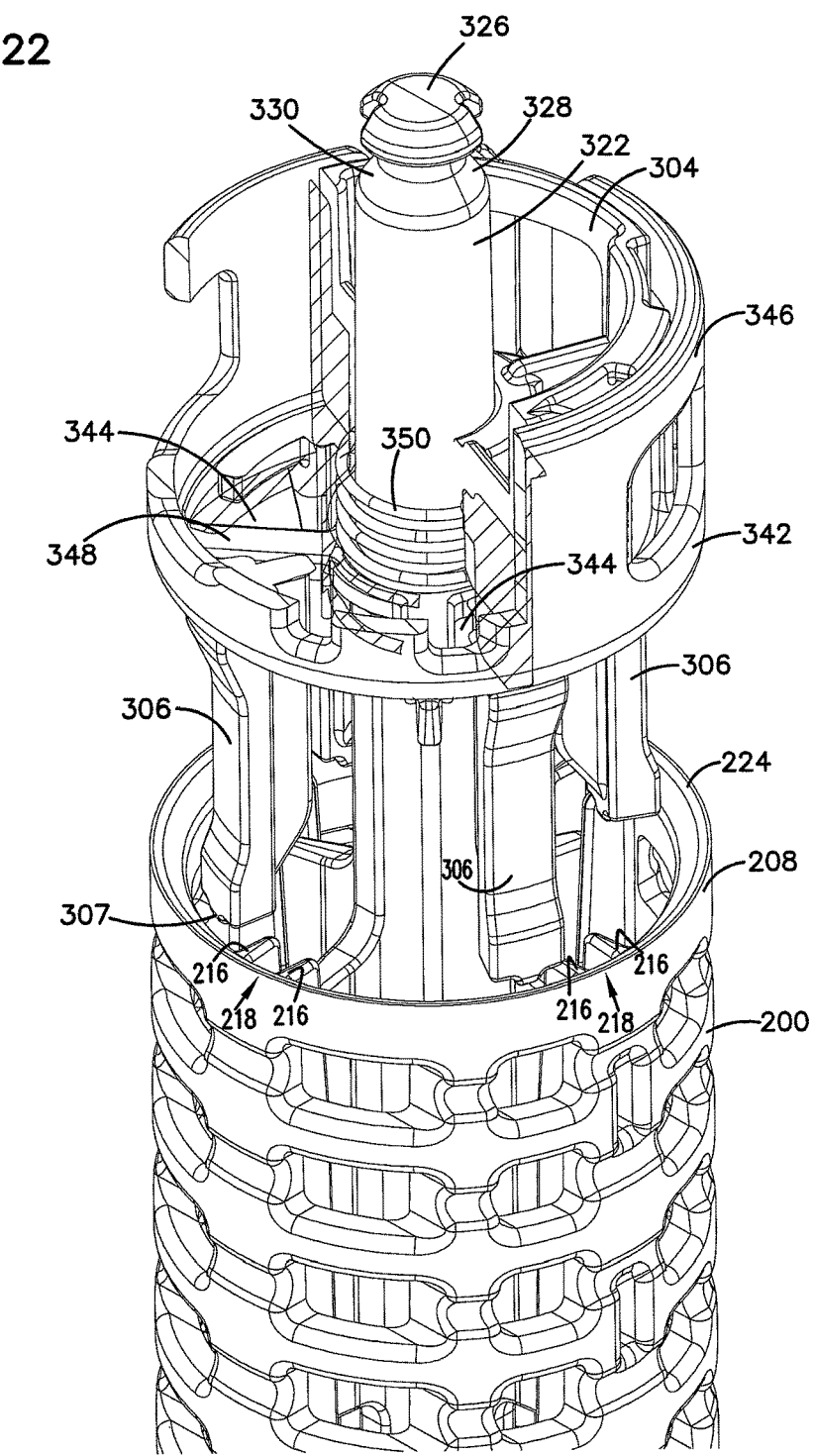
FIG. 22 is a the same perspective view as FIG. 21, but showing a portion of the basket and basket holder broken away in order to show other parts.

In reference to FIG. 22, the assembly includes a spring 350 oriented around the post 322 and operably oriented between the webs or flanges 324 of the basket 304 to bias the basket 304 rotationally within the basket holder 340 and into the locked position (FIG. 19).

The slotted wall 346 includes a plurality of slots 352. The slots 352 are open at one end and closed at an opposite end; that is, the slots 352 are open at the end rim 354 of the slotted wall 346 and have closed ends 356 adjacent to a bottom portion of the slotted wall 346. The slots 352 function as a slide channel 358 for cooperating structure on the filter cartridge 38.

In particular, the first slot 360 forms slide channel 358 for the first protrusion 121 or the third protrusion 123, after the first protrusion 121 or third protrusion 123 engages the first slide surface 314 of the basket 304, rotating the basket 304 from the first locked position. This rotation of the basket 304 then aligns the first slot 360 with the first groove 312 of the basket 304.

The second slot 362 will be put in alignment with the second groove 316, to allow either the second protrusion 122 or the fourth protrusion 124 slide therewithin slide channel 358 after the basket 304 has been rotated from the second locked position to the unlocked position (FIG. 21).

I. Bypass Filter Cartridge FIG. 32

Figure 32:
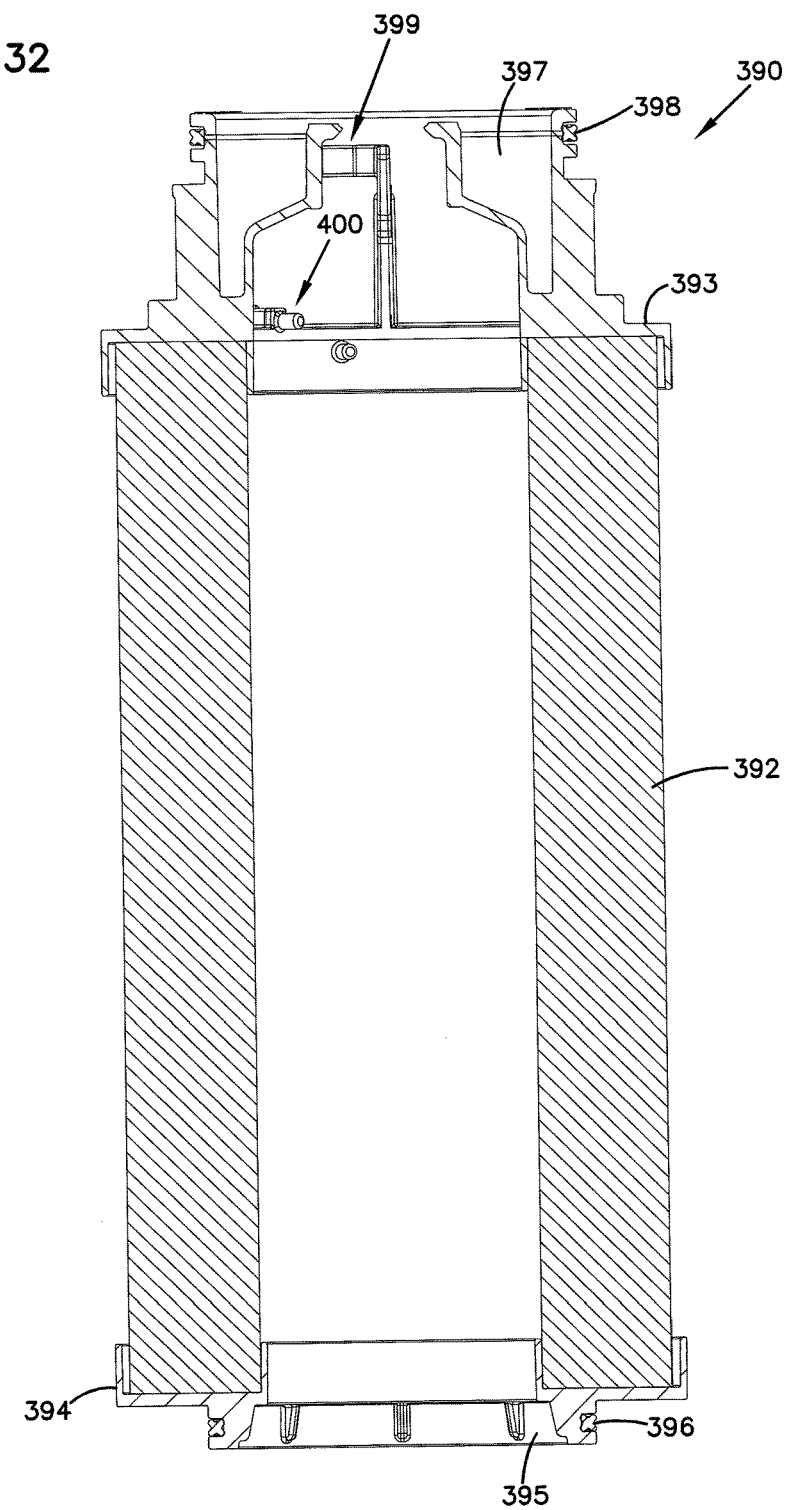
FIG. 32 is a cross-sectional view of a bypass filter cartridge utilized with the system of FIG. 1.

FIG. 32 shows a cross-sectional view of one embodiment of a bypass filter cartridge 390. The bypass filter cartridge 390 is usable with a bowl 391 (FIG. 1) in the system 30. The bypass filter cartridge 390 includes a region of filter media 392 attached between a first endcap 393 and a second endcap 394. The second endcap 394 has an axially extending neck 395 holding a seal member 396.

The first endcap 393 is preferably constructed and arranged in a manner that will prevent it from operably fitting within the bowl 36 for the full flow filter assembly 34. Switching the bypass filter cartridge 390 and the full-flow filter cartridge 38 could have catastrophic results. Therefore, structure is built in to prevent this mix-up. One structure is the lock-out mechanism, described herein and further below. Another such mechanism is the structure of the first endcap 393. The first endcap 393 includes an upstanding projection 397 that holds seal member 398. The height of the projection 397 is such that it will not be allowed to operably-engage the filter head 32 in the location of the full-flow filter assemblies 34.

In the bypass filter cartridge 390, it can optionally include a cartridge retention mechanism 399, analogous to the retention mechanism 100 described above. Further, it may also include a protrusion arrangement 400 analogous to the protrusion arrangement 118, described above.

J. Adaptor Arrangements, FIGS. 33-38

Attention is directed to FIGS. 33-38, which illustrate various embodiments of an adaptor arrangement 402. FIG. 33 illustrates one method for using, including installing an adaptor arrangement 402.

A first embodiment of an adaptor arrangement 402 is shown in FIGS. 33 and 34 as adaptor ring 404. A second embodiment is shown in FIGS. 35 and 36 as 404', and a third embodiment is shown in FIGS. 37 and 38 as 404". Each of the adaptor rings 404, 404', and 404" have common features, and will utilize common reference numerals. Differences will be indicated by different reference numerals.

The adaptor ring 404, 404', 404" includes a circular band 406 defining an open aperture 408. In the embodiment shown, the band 406 is generally circular, defining a generally circular open aperture 408. The band 406 has an outer radial surface 410 and an opposite inside radial surface 412. The inside radial surface 412 defines an aperture wall 414, because it lines the open aperture 408.

A protrusion arrangement 416 extends from the band 406. Preferably, the protrusion arrangement 416 includes at least first and second protrusions 421, 422 extending from the aperture wall 414 and into the open aperture 408. The first protrusion 421 is spaced from the second protrusion 422 in a vertical direction along the aperture wall 414. The first protrusion 421 is also circumferentially spaced from the second protrusion 422 along the aperture wall 414.

Preferably, the first protrusion 421 extends into the open aperture 408 no greater than 40% than the inner diameter of the open aperture 408. Similarly, it is preferred that the second protrusion 422 extends into the open aperture 408 no greater than 40% of the inner diameter of the open aperture 408. Preferably, the vertical distance between the first protrusion 421 and the second protrusion 422 is 2-30% of the inner diameter of the open aperture 408.

The first protrusion 421 and the second protrusion 422 are circumferentially spaced within 50 degrees of each other. It is also possible to arrange the first protrusion 421 and the second protrusion 422 such that they are located greater than 45 degrees relative to each other.

In the embodiment shown, the protrusion arrangement 416 further includes a third protrusion 423 extending from the aperture wall 414 and into the open aperture 408. The third protrusion 423 is circumferentially spaced from the first protrusion 421 and the second protrusion 422. The third protrusion 423 is also vertically spaced from only one of either the first protrusion 421 or the second protrusion 422.

In the illustrated embodiments, there is also at least a fourth protrusion 424 extending from the aperture wall 414 and into the open aperture 408. The fourth protrusion 424 is circumferentially spaced from the first protrusion 421, the second protrusion 422, and the third protrusion 423. The fourth protrusion 424 is also vertically spaced from only two of the first protrusion 421, the second protrusion 422, or the third protrusion 423; that is, the fourth protrusion 424 is vertically even with only two of the first protrusion 421, second protrusion 422, and third protrusion 423.

In the embodiments shown, two of the first protrusion 421, second protrusion 422, third protrusion 423, and fourth protrusion 424 are circumferentially-spaced within 15 degrees of each other, while a remaining two are circumferentially-spaced within 15 degrees of each other.

The embodiment of adaptor ring 404' illustrated in FIGS. 35 and 36 differs from the embodiment of adaptor ring 402 in FIGS. 33 and 34, in that the band 406 has a longer vertical wall 430. This longer vertical wall 430 can be useful in certain arrangements.

The embodiment of the adaptor ring 404" of FIGS. 37 and 38 further includes cartridge retention mechanism 440. The retention mechanism 440 is analogous to the retention mechanism 100 and includes a gripper arrangement 442 including fingers 443, 444. Further, the retention mechanism 440 includes a release arrangement 446, including opposing tabs 447, 448.

FIG. 33 demonstrates a technique for using the adaptor arrangements 402 in order to unlock the core piece 222 and the inner filter support 200. Adaptor arrangements 402 are useful in that it is sometimes helpful to be able to use a filter cartridge that does not have the protrusion arrangement 118 on the endcap 41. For example, in the laboratory and out in the field, it may be desirable to test filter cartridges that have different filtration performance but do not have the protrusion arrangement 118. In such situations, the adaptor arrangements 402 are useful.

In FIG. 33, the arrow 450 shows herein the adaptor ring 404 is mounted relative to the filter support 200. The adaptor ring 404 is generally mounted over the filter support 200, to engage the basket 304. The filter cartridge 452 may then be mounted thereon. The adaptor ring 404 is generally located between the filter cartridge 452 and the filter support 200. In the embodiment shown, the adaptor ring 404 is then located within the aperture of the first endcap 454 of the cartridge 452.

In use, the adaptor ring 404 is oriented into the filter bowl 36, and the first protrusion 421 is pushed against the basket 304 to then allow the second protrusion 422 to engage the basket 304. Engagement of the second protrusion 422 against basket 304 then rotates the basket 304 relative to the projections 218 (FIG. 19) on the filter support 200. This frees the legs 306 of the basket 304 relative to the projections 218. When the legs 306 are free of interference with the projections 218, the core piece 222 may move axially relative to the inner filter support 200.

K. Methods of Operation of the Lock-Out Mechanism

As mentioned above, it may be desirable to have in the filter system 30 a mechanism that ensures that the filter system 30 cannot be operated unless the filter cartridge 38 has been operably assembled within the filter bowl 36. In addition, in the particular system 30 depicted, there is more than one type of filter assembly and it would be disastrous if a user were to mix up filter cartridges. A lock-out mechanism will achieve both objectives.

Reference is first made to FIG. 39 which depicts filter bowl 36, inner filter support 200, core piece 222, and filter head 32. In FIG. 39, the filter cartridge 38 is not within the filter bowl 36. During servicing, for example, the bowl 36 would not have the filter cartridge 38 installed therewithin. FIG. 8 also depicts the bowl 36 without the filter cartridge 38 installed within.

In FIGS. 8, 18, 19, and 39, the basket 304 is fitted around the post 322, and the basket 304 is oriented in its locked position by the bias of spring 350. In particular, the spring 350 is oriented such that it biases the basket 304 into the locked position by rotational force exerted between the flanges 324 and the resistance to that force because of engagement between the legs 306 and the leg-receiving apertures 344 (FIG. 22). In FIG. 19, when the basket 304 is in its locked position, each of the legs 306 has its free end 307 in engagement with the projections 218 formed by the ends of the guide rails 216.

In this position, without filter cartridge 38 installed in the filter bowl 36, the upper rim 311 of the basket 304 and the upper rim 354 of the basket holder 340 will contact or engage against ribs 146 of the adaptor 64. See FIG. 39. Because the legs 306 are resting on top of the projections 218 (in this embodiment, shown as an end of the guide rails 216), the core piece 222 and the basket 304 cannot move axially downwardly in a direction toward the closed end 156 of the bowl 36. The entire inner assembly 364 is in an extended and rigidly fixed position. As can be seen in FIG. 39, in this rigidly fixed position, the filter head 32 cannot operably connect with the bowl 36 by connection between the threads 134 on the filter head 32 and the threads 168 on the bowl 36.

During servicing, when a new filter cartridge 38 has been provided, the filter cartridge 38 is oriented in the bowl 36 by placing it through the open mouth 154. When the filter cartridge 38 is properly and operably positioned in the filter bowl 36, the first protrusion 121 comes in contact or engages the ramped first slide surface 314 of the basket 304. See FIGS. 19, 28, 29, and 30. In embodiments that have more than two protrusions, one possibility is that both the first protrusion 121 and the third protrusion 123 will engage a corresponding first slide surface 314 on the basket 304. As the first protrusion 121 engages this first slide surface 314, it causes the basket 304 to rotate against the spring 350. In preferred embodiments, the rotation will be less than 45 degrees, for example, 5-20 degrees. This rotates the basket 304 from the first locked position (FIGS. 19 and 30) to the second unlocked position (FIG. 20). The first groove 312 in the basket 304 become aligned with the first slot 360 of the basket holder 340, which will eventually allow the first protrusion 121 to slide down.

Figure 23:
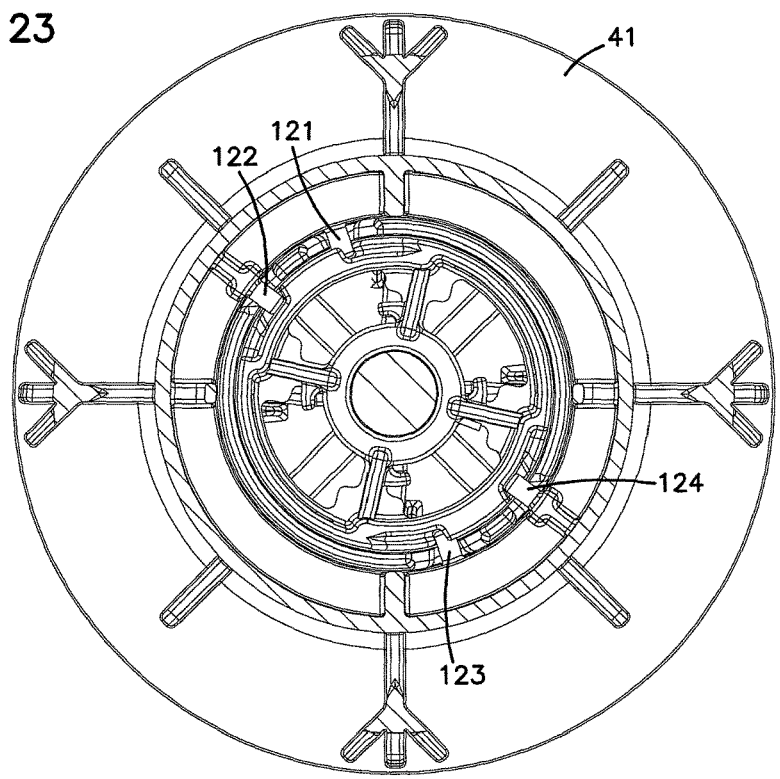
FIG. 23 is a partial cross-section, top plan view showing the endcap engaged against the basket and basket holder as the basket is rotated from its first locked position to its second locked position.
Figure 25:
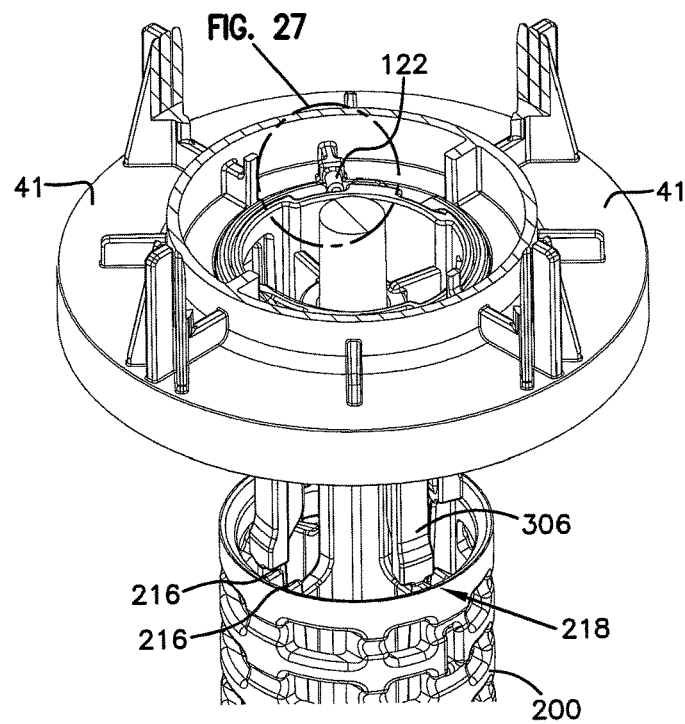
FIG. 25 is a perspective view of the arrangement of FIG. 23.
Figure 26:
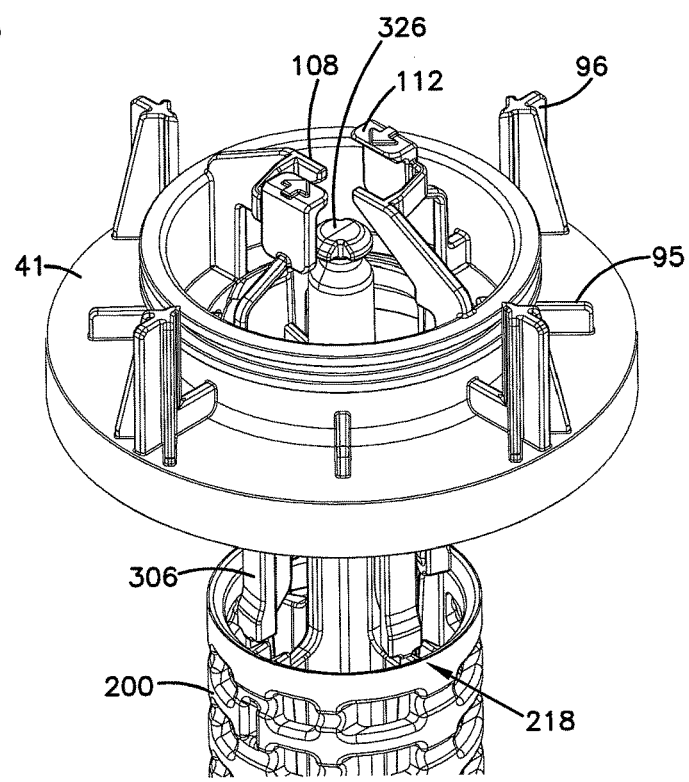
FIG. 26 is a perspective view of the arrangement of FIG. 25, but not having structure cut off in cross-section as shown in FIG. 25.
Figure 27:
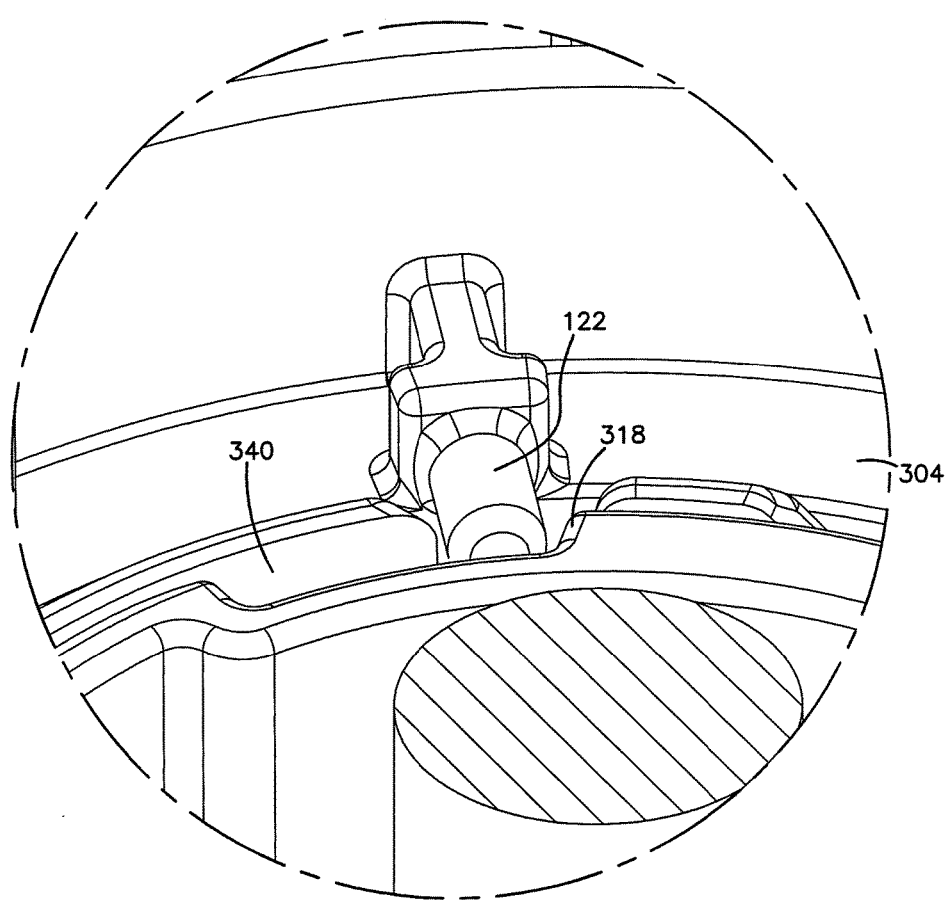
FIG. 27 is an enlarged, perspective, partially cross-sectional view of the arrangement of FIG. 25 at the portion shown in FIG. 25.
Figure 28:
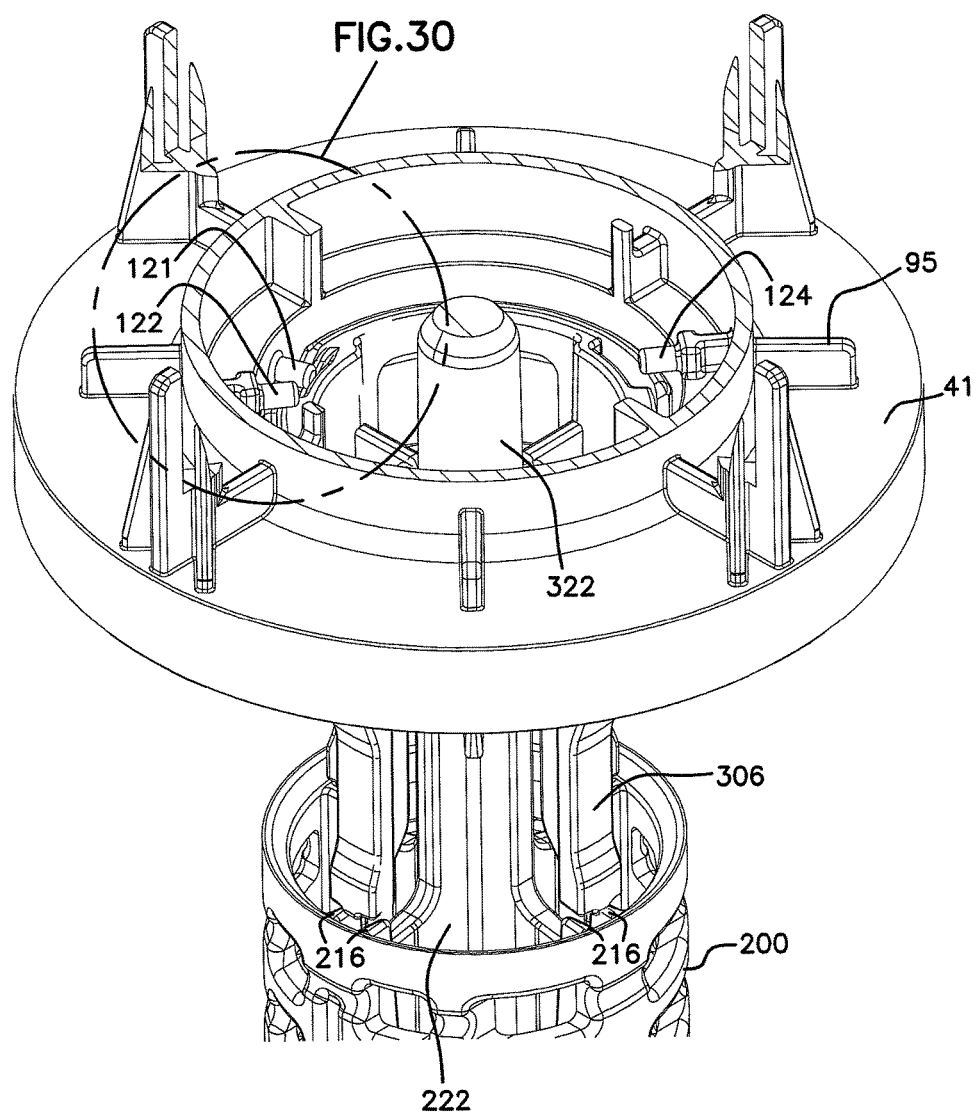
FIG. 28 is a perspective, partially cross-sectional view of the cartridge end cap in engagement with the basket and basket holder, analogous to the view of FIG. 25, but showing the basket in the first locked position.
Figure 29:
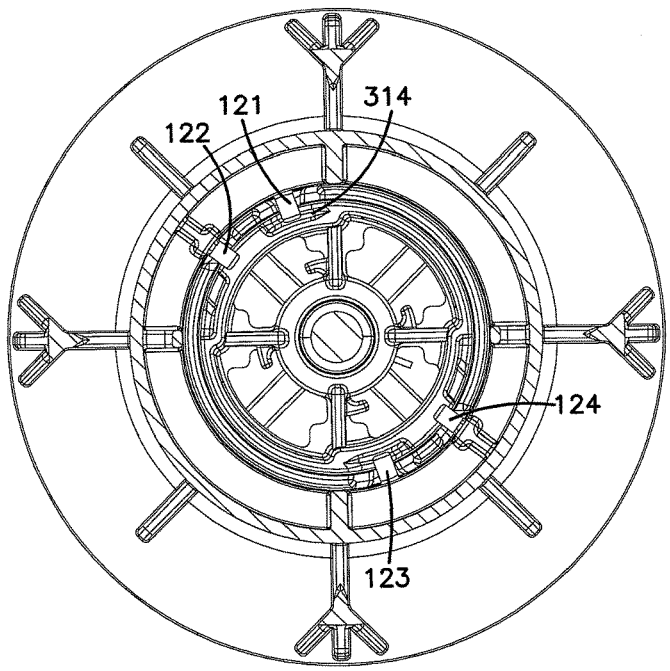
FIG. 29 is a top plan view of the arrangement of FIG. 28.
Figure 30:
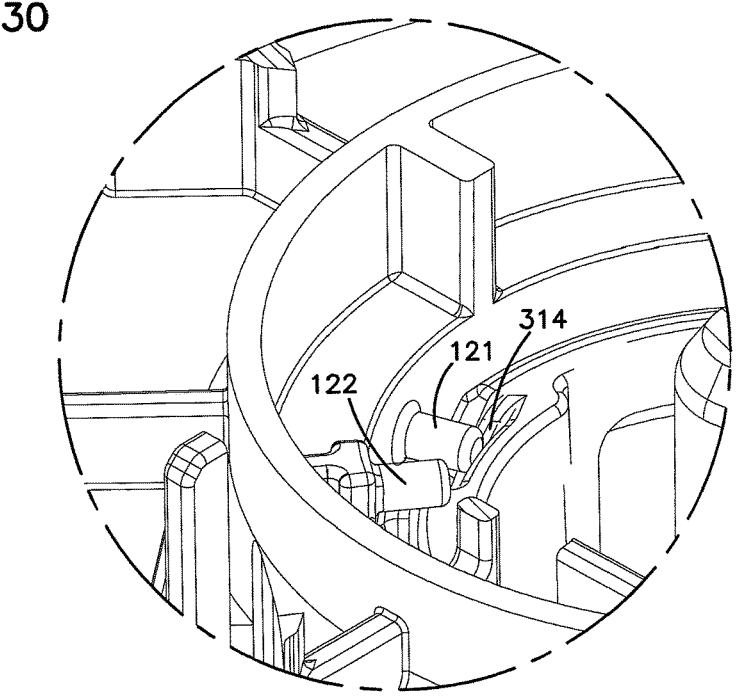
FIG. 30 is an enlarged, perspective view of the portion shown in FIG. 28.
Figure 31:
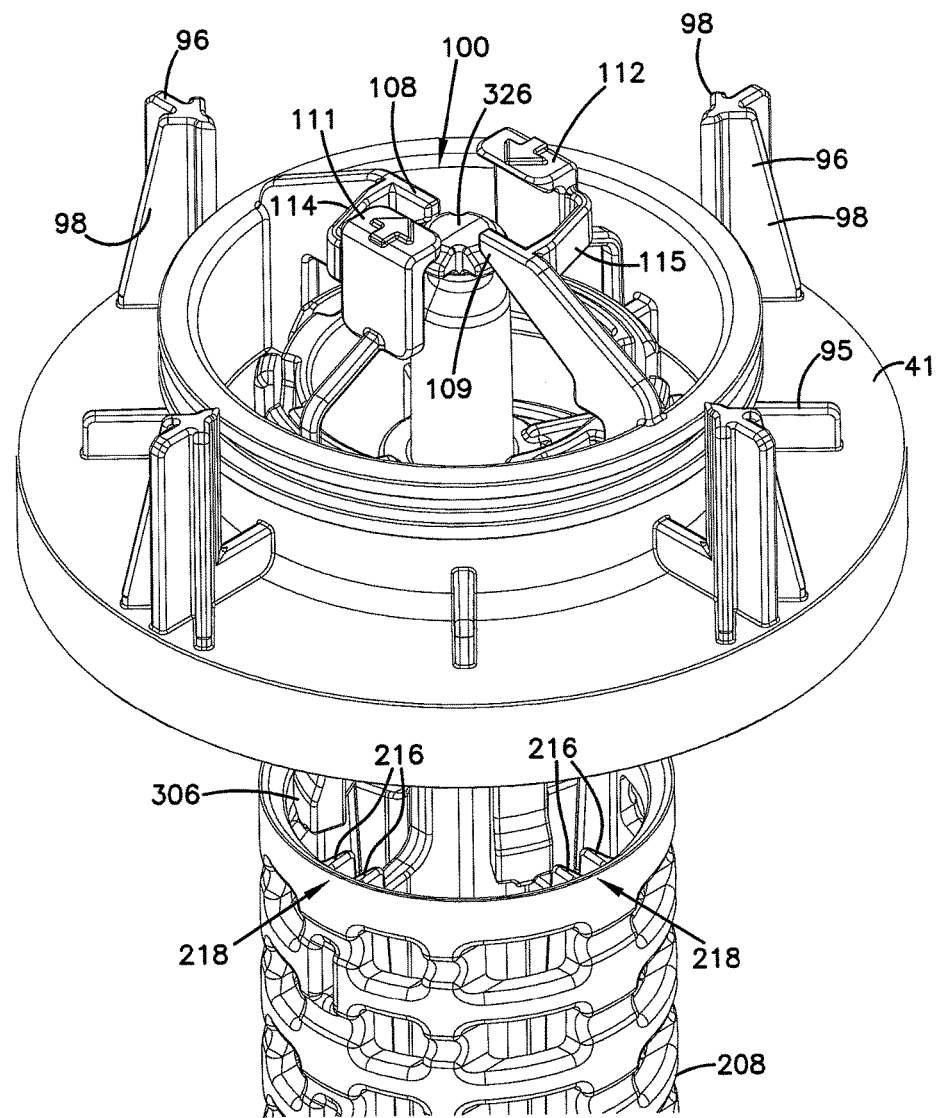
FIG. 31 is a perspective view of the cartridge endcap engaged with the basket, when the basket is in the unlocked position.

When the basket 304 is rotated to the second locked position (FIG. 20), this exposes the second slide surface 318. The second protrusion 122 is oriented such that it will contact or engage the second slide surface 318. The contact with the second slide surface 318 can be made through a protrusion located in the location of the fourth protrusion 124, as well. In embodiments that have protrusions at both locations of the second protrusion 122 and fourth protrusion 124, then both the second protrusion 122 and the fourth protrusion 124 will contact the corresponding second slide surface 318. The initial contact between the second protrusion 122 and the second slide surface 318 causes the basket 304 to rotate against the spring 350 from its second locked position to its unlocked position (FIG. 21). FIGS. 23, 25, and 27 illustrate engagement of the second protrusion 122 against the second slide surface 318. The rotation of the basket 304 from the second locked position (FIG. 20) to the unlocked position (FIG. 21) is preferably less than 45 degrees, for example, 5-20 degrees. Rotation to the unlocked position aligns second groove 316 and second slot 362, which will eventually allow axial sliding of the second protrusion 122 therein downwardly.

As the basket 304 moves to the unlocked position, the legs 306 also rotate, moving away from engagement against the projections 218 created by the end of the guide rails 216. When the legs 306 are completely clear of the projections 218, any additional movement of the filter cartridge 38 in a downwardly axial direction toward the closed end 156 will cause the basket 304 and the core piece 222 to also move in that direction against the core piece spring 338. The core piece spring 338 normally biases the basket 304 and the core piece 222 in the extended position of FIGS. 8 and 39.

When the filter assembly 34 is mounted onto the filter head 32, the adaptor 64 will exert force on the first end cap 41 of the filter cartridge 38, moving the filter cartridge 38 downwardly relative to the bowl 36 and the inner filter support. Moving the filter cartridge 38 downwardly toward the closed end 156 of the bowl 36 also moves downwardly the core piece 222. The filter head 32 will then be able to matably engage the threads 168 on the bowl 36 for secure attachment, as shown in FIG. 11.

It should be appreciated that the lock-out mechanism as characterized above can be utilized in a method of installing a filter cartridge into a filter bowl such as a filter cartridge 38 into filter bowl 36. In such a method, filter cartridge 36 is oriented into filter bowl 36. The filter cartridge 36 will have a tubular construction of filter media, such as media 44. The filter bowl 36 will have a porous inner filter support 200 mounted therein and a core piece 222 within the inner filter support 200. The core piece 200 will be holding a basket 304. The method further includes while orienting, pushing the filter cartridge 38 against the basket 304 to disengage the core piece 222 and the inner filter support 200. For example, this can be implemented by pushing a protrusion arrangement 118 against the basket 304. In particular, first protrusion 121 can be pushed against the first slide surface 304 to rotate the basket 304 from the first locked position to the second locked position. Then, the second protrusion 122 will be oriented to be in a position to engage the second slide surface 318 and cause further rotation of the basket 304 from the second locked position to the unlocked position. The unlocked position will cause the legs 306 to move from engagement against projections 218 to a position in which they are free of interference with the projections 218. This disengages the interference between the core piece 222 and the filter support 200. Next, after disengaging, the method includes axially moving both the filter cartridge 38 and the core piece 222 relative to the inner filter support 200.

This method of installing can be incorporated into a method for servicing, in which, first, the bowl 36 is removed from the filter head 32. Next, the bowl filter cartridge 38 is removed from the bowl 36. This method can employ the method of using the retention mechanism 100, which is described further below (Section M). During services, the bowl can be drained, which is also described in Section L.

Next, a new filter cartridge 38 is provided. The method of installing the filter cartridge, as described above, is then utilized. In preferred such methods, after the cartridge 38 unlocks the engagement between the basket 304 and inner filter support 200, and the cartridge 38 with the basket 304 and core piece 222 is allowed to move axially downwardly.

L. Drain Valve Mechanism

The filter system 30 depicted also has a drain valve mechanism to allow liquid in the complete assembly to automatically be drained during the servicing of the system 30. The drain valve mechanism can be implemented independently of other features in the example embodiment.

When the filter cartridge 38 is operably positioned in the filter bowl 36 with the bowl 36 being fully-threaded on the filter head 32 as shown in FIG. 11, the plug 244 is in the closed and sealed position. In this position, the first plug seal 240 and the second plug seal 242 are in place (FIG. 12).

The first plug seal 240 seals off liquid located on the clean side in the filtered liquid volume 212 (FIG. 12), from allowing unfiltered liquid in the unfiltered liquid volume 214 from flowing through holes 194 (FIG. 12). The second plug seal 242 seals off liquid from the unfiltered liquid volume 214 from the drain port 282 that is directed to the outside environment. Also, the seal 204 (FIG. 10) prevents liquid from the unfiltered liquid volume 214 to be able to reach the filtered liquid volume 212.

With the filter cartridge 38 operably positioned in the bowl 36 and the head 32 fully engaged and connected to the bowl 36, the adaptor 64 presses against the first endcap 41, which pushes the cartridge 38 and the core piece 222 holding the basket 304 and legs 306 downward axially relative to the porous inner filter support 200. As the core piece 222 moves in a direction toward the closed end 156 of the bowl 36, the head 302 of the core piece 222 is moved away from the inwardly extending support 226 and engages the receiver 298 of the plug 244. This axial force presses the plug 244 against the valve spring 288 to move the plug into the sealed position of FIG. 12.

When it is time to service the filter cartridge 38, because of wear or because of occlusion, the filter assembly 34 will be rotated about its central axis relative to the filter head 32. As this occurs, the filter assembly 34 moves downwardly along the central axis due to the unthreading action between the bowl 36 and the filter head 32. While this downward action is occurring, the core spring 338 pushes against fins 336 on the core piece 222. This moves the cartridge 38 holding the core piece 222 axially upwardly relative to the bowl 36. The axial motion upwardly of the core piece 222 stops when the head 302 is stopped by engagement with the lower surface 230 of the inwardly extending support 226. When the head 302 is not acting against the plug 244, it allows the plug 244 to move with the valve spring 288 away from drain port 282 to the position of FIG. 10. This allows liquid to drain from both the unfiltered liquid volume 214, shown by drain path arrow 368, as well as drain from the filtered liquid volume 212 shown by drain path arrow 370 through the drain port 282 into the outside environment where it can be captured by some kind of container for proper disposal. This drainage can occur while the assembly 34 remains attached to the filter bowl 36.

It should be appreciated that with the described drainage system, a method for draining liquid from the filter assembly 34 can be employed. One such method would include at least partially unscrewing the bowl 36 containing the filter cartridge 38 from the filter head 32 to permit the spring 338 to move the plug 244 from the sealed position to a drainage position. The bowl 36 has an interior volume 152 and drainage aperture arrangement 160. The sealed position includes the plug 244 blocking fluid flow between the interior volume 152 of the bowl 36 and the fluid outlet port 282 in the drainage arrangement 160 and by blocking fluid flow between an upstream side of the filter cartridge 38 and a downstream side of the filter cartridge 38. The upstream side of the filter cartridge 38 corresponds to the unfiltered liquid volume 214. The downstream side of the filter cartridge 38 corresponds to the filtered liquid volume 212. The drainage position includes the plug 244 being oriented to permit fluid flow between the interior volume 152 of the bowl 36 and fluid outlet port 282 of the bowl 36. The fluid outlet port 282 of the bowl is part of the drainage aperture arrangement 160, in which in the embodiment shown, holds the valve housing 248 having drain port 282 therein. The step of partially unscrewing the bowl 36 includes permitting core piece spring 338 to move the core piece 222 having head 302 axially out of engagement with the plug 244, permitting valve spring 248 to move the plug 244 from the sealed position to the drainage position.

When the assembly 34 is mounted onto the filter head 32, engagement between a portion of the filter head (such as adaptor 64) and the cartridge (such as end cap 41), pushes the filter cartridge 38 and structure connected to it, axially downwardly against the core piece spring 338 in a direction toward the closed end 156 of the bowl 36. The structure connected to the cartridge 38 will include the core piece 222, having head 302. The core piece 222 moves axially relative to the filter support 200, and the fins 336 will slide within channels 220 between the guide rails 216. As the core piece 222 moves in a direction toward the closed end 156, the head 302 moves toward the valve assembly 236. Eventually, the head 302 engages the receiver 298 of the plug 244 and pushes the plug 244 against spring 288 to move the plug 244 into the sealed position 238, in which first plug seal 240 is formed and second plug seal 242 is formed.

M. Cartridge Retention Mechanism 100

In the preferred embodiment, illustrated, the filter system 30 includes cartridge retention mechanism 100 to releasably hold the filter cartridge 38 within the filter bowl 36 during servicing. The cartridge retention mechanism 100 can be implemented independently of the other features in the filtration system, including independent of the lock-out mechanism and the drain valve mechanism.

FIGS. 2, 3, 4, 9, and 11 each shows the retention mechanism 100 engaged with the gripper arrangement 104 connected to the core piece 222, specifically, the neck 330 of the button 326. Specifically, the fingers 108, 109 are gripping the neck 330, which causes the filter cartridge 38 to remain in the bowl 36, rather than stay connected to the adaptor 64 in the filter head 32.

When the filter assembly 34 is removed from the head 32, the filter cartridge 38 remains captured in the bowl 36 by engagement between the fingers 108, 109 of the gripper arrangement 104 and the button 326 of the post 322. In order to release the filter cartridge 38 from the bowl 36, the release arrangement 106 is actuated. Specifically, the tabs 111, 112 are squeezed together in a direction toward each other and toward the post 322, by using, for example, the thumb and forefinger of the person providing the servicing. This causes the fingers 108, 109 to move away from the neck 330 of the post 322, allowing the fingers 108, 109 to clear the button 326. The thumb and forefinger of the service person is on the tabs 111, 112, and the service person can now pull the filter cartridge 38 clear of the button 326 and remove the filter cartridge 38 from the bowl 36.

The retention mechanism 100 can be made from a material flexible enough to provide deflection of the fingers 108, 109 away from each other when the tabs 111, 112 are squeezed. This material may be plastic, although it may be other materials as well.

The retention system 100 can be used in a method for servicing the filter system 30 including removing the filter assembly 34, including bowl 36 containing filter cartridge 38, from filter head 32. Next, during the step of removing, the method includes retaining the filter cartridge 38 to the bowl 36 by gripping the button 326 with opposing fingers 108, 109, radially extending toward each other. After the step of retaining, opposing tabs 111, 112 may be gripped and squeezed toward each other to release the fingers 108, 109 from the button 326 and thereby release the filter cartridge 38 from the bowl 36. The method further includes the step of, while still gripping the opposing tabs 111, 112, pulling the filter cartridge 38 from the bowl 36. The step of gripping includes using opposing fingers 108, 109 that are integral with the filter cartridge 38. The step of gripping may also include using opposing fingers 443, 444 that are part of an adaptor 404" between the filter cartridge 38 and the core piece 222.

II. The Embodiments of FIGS. 40-68

FIGS. 40-71 depict top load assemblies. By the term "top load", it is meant an arrangement in which there is a serviceable filter cartridge contained within a housing and is removable therefrom through access provided by a top cover.

A. FIGS. 40-53

FIGS. 40 and 44 show front and rear perspective views of one embodiment of a top load assembly 900. In FIG. 40, the assembly 900 can be seen as having a housing 902 with a removable service cover 904 covering a mouth 903. In this embodiment, the housing 902 is integral with a filter base 908. The housing 902 defines an inlet 906 (FIG. 46), which passes through the base 908 of the housing 902. The base 908 is at an end of the housing 902 opposite from where the cover 904 is located. In use, the cover 904 will be located vertically above the base 908. Through the base 908 is also defined an outlet 910.

In FIGS. 42, 43, 46, and 47 inside of the housing 902, a removable and replaceable filter cartridge 912 can be seen. In use, when it is time to service the assembly 900, the cover 904 is removed from the housing 902. The cartridge 912 is removed from the housing 902 through the access opening created when the cover 904 is removed. The old filter cartridge 912 is discarded, and a new filter cartridge 912 is provided.

As mentioned above, one preferred feature is a feature that ensures the filter assembly 900 is not allowed to operate unless a filter cartridge is operably oriented within the housing 902. Further, it is important that a correct filter cartridge is oriented within the housing 902. Therefore, the assembly 900 includes a lock-out feature, as described above.

FIGS. 42, 43, 46, and 47 illustrate cross-sectional views of the housing 902, cover 904, and internal components 920. The internal components 920 include a lock-out mechanism, similar to that described above. The internal components 920 include a porous inner filter support 922; a core piece 924; and a basket 926. The filter support 922 is attached to the filter housing 902 by a disk 928. The filter support 922 includes an inwardly extending shoulder or support 930. The porous inner filter support 922 further includes guide rails 932 (FIGS. 47 and 52), defining a slide groove 936 therein. The ends of the rails 932 form projections 938 (FIG. 52), which are also at a free end of a porous inner filter support 922.

The core piece 924 includes a basket holder 946 and a post 939 having a head 940, which engages the inwardly extending support 930. The core piece 924 further defines a fin arrangement 942 including a plurality of fins 944. The fins 944 slide within the channels or grooves 936 between the rails 932.

At an end of the core piece 924 opposite of the head 940 is a basket holder 946. The basket holder 946 is constructed analogously as the basket holder 340 described previously. A basket spring 927 biases the basket holder 946 toward a locked position, analogous to spring 350, described previously.

A core piece spring 948 pushes the core piece 924 in a direction axially upwardly, toward the cover 904, by exerting a force between the inwardly extending support 930 and the fin arrangement 942.

Figure 47:
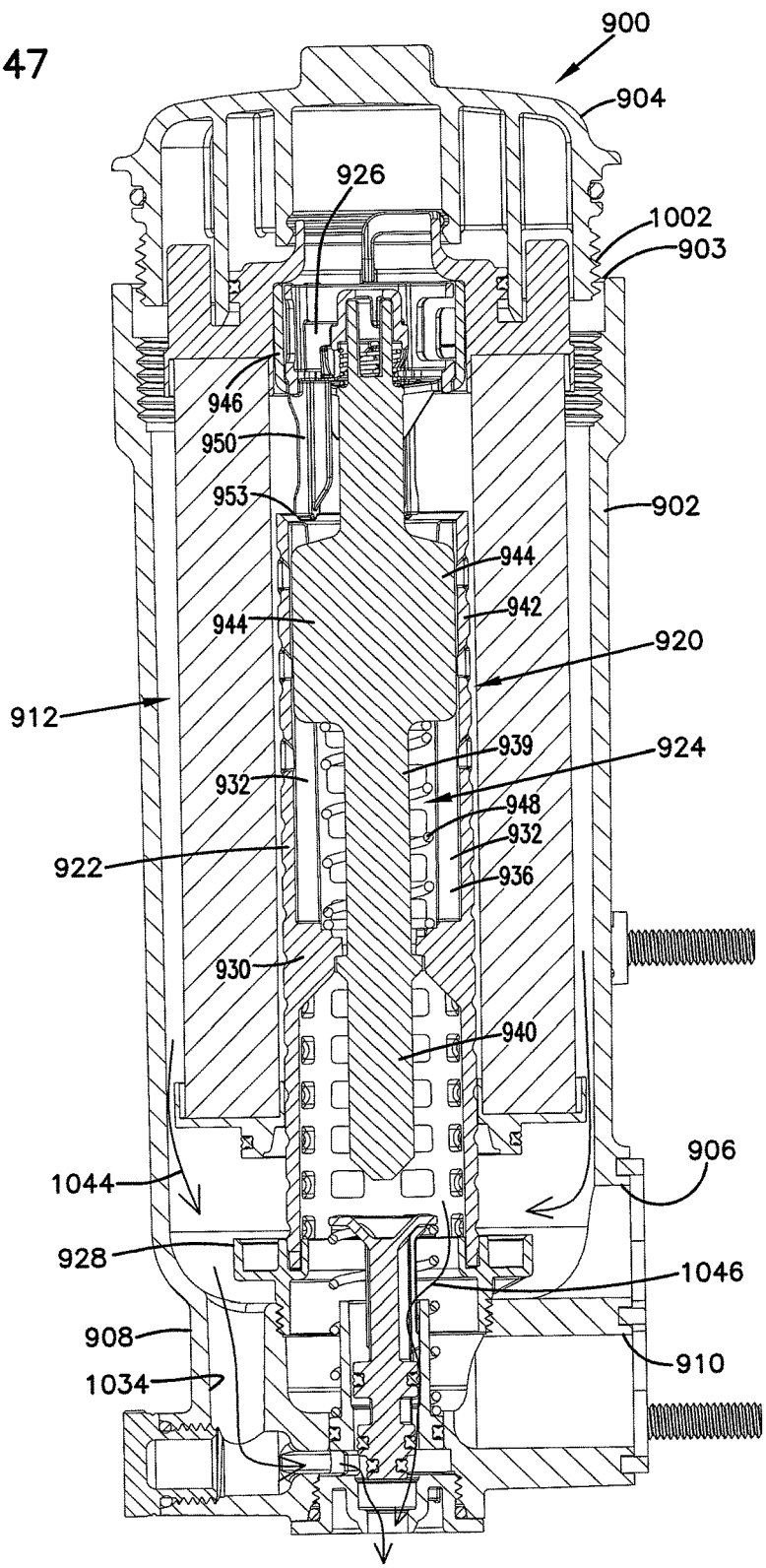
FIG. 47 is a cross-sectional view of the filter assembly of FIG. 46, the view being analogous to FIG. 46 but showing the plug in a drain position.
Figure 52:
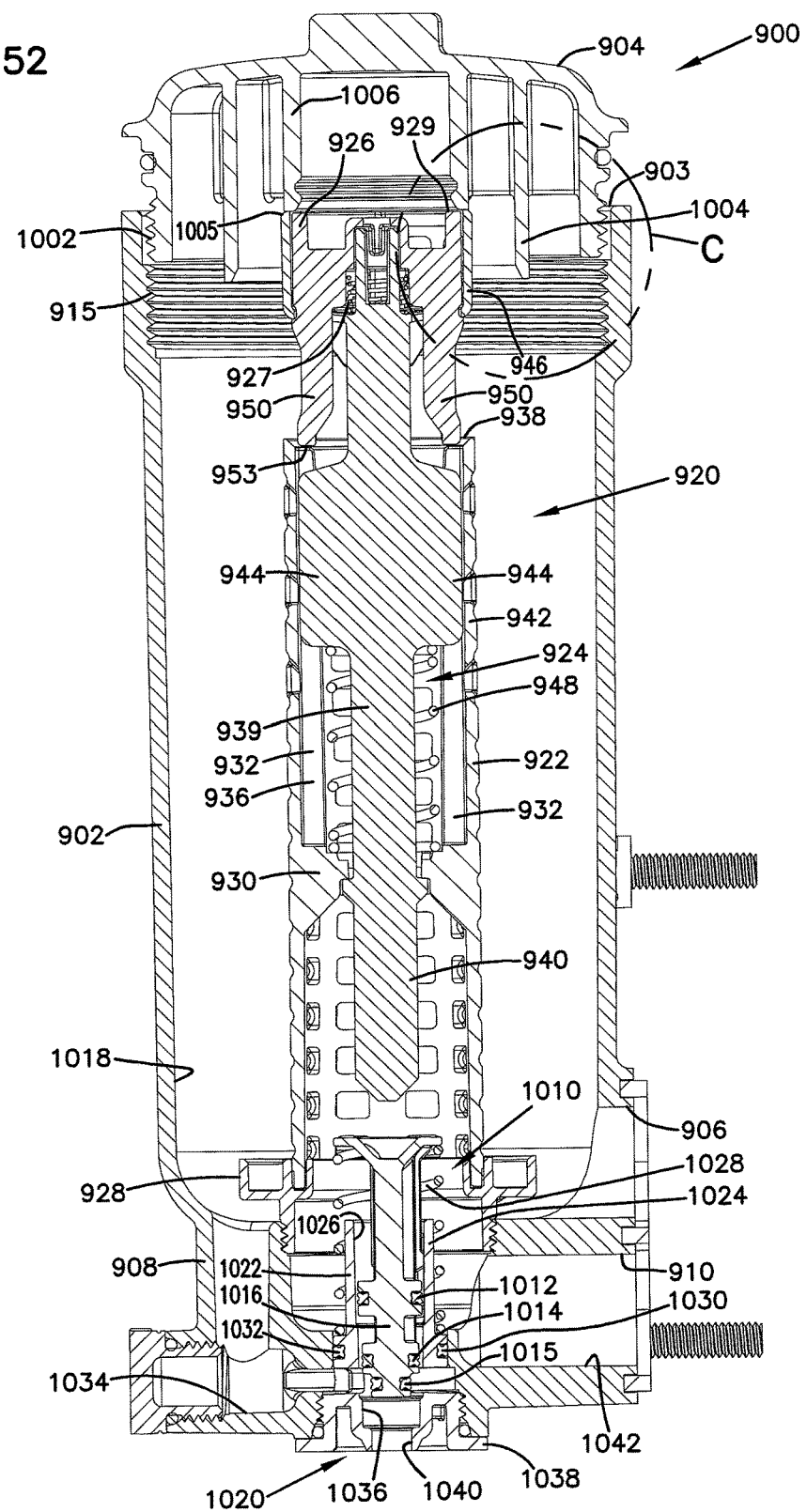
FIG. 52 is a cross-sectional view of the top load filter assembly of FIGS. 40-47 and showing the cover not being able to mate with the housing because of the lockout arrangement.
Figure 53:
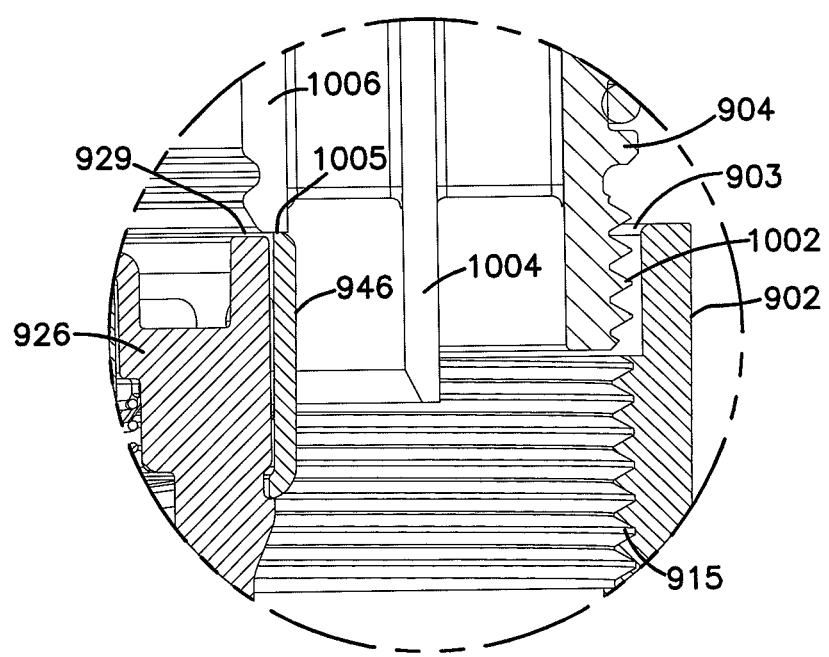
FIG. 53 is an enlarged, cross-sectional view of portion C depicted in FIG. 52.

The basket 926 is supported by the basket holder 946. The basket 926 is constructed analogously to the basket 304, described above. In FIGS. 46 and 47, the basket 926 can be seen as including a plurality of legs 950. When the assembly is in its locked position, the legs 950 interfere with and engage against the projections 938 as can be seen in FIG. 52.

This engagement prevents the core piece 924 from moving axially downwardly in a direction toward the base 908 of the housing 902.

In use, the filter cartridge 912 is oriented into the housing 902 through mouth 903 exposed by removal of the service cover 904. The filter cartridge 912 will be pushed against the basket 926 to disengage the core piece 924 and the inner filter support 922. For example, this can be implemented by pushing a protrusion arrangement 918 (FIG. 49), analogous to the protrusion arrangement 118 characterized above against the basket 926. In FIG. 49, the protrusion arrangement 918 is shown as first protrusion 951 and second protrusion 952. In preferred embodiments, the protrusion arrangement 918 is analogous to arrangement 118, and can optionally include more protrusions, such as a third and fourth protrusion, arranged as described above in connection with the embodiments of FIGS. 1-32. As explained above, engaging the first protrusion 951 against the basket 926 will rotate the basket 926 from a first locked position to a second locked position, as characterized above in connection with FIGS. 1-32. Then, second protrusion 952, analogous to second protrusion 122 as characterized above, will be in a position to engage the basket 926 and cause further rotation of the basket 926 from the second locked position to the unlocked position. The unlocked position will cause the legs 950 to move from engagement against the projections 938 to a position in which they are free of interference with the projections 938. This disengages the interference between the core piece 924 and the filter support 922. Next, after disengaging, both the filter cartridge 912 and the core piece 924 can be moved axially downwardly relative to the inner filter support 922.

The filter cartridge 912 can be constructed analogously to the filter cartridge 38, as characterized above. Further, it can be desirable to test the assembly 900 by utilizing a cartridge without the protrusion features. In such a system, an adaptor can be utilized. Adaptors as described above with respect to FIGS. 33-38 can be utilized.

In reference now to FIGS. 48 and 49, the filter cartridge 912 utilized in this embodiment is illustrated. The filter cartridge 912 depicted includes a first endcap 956. The first endcap 956 defines a first open volume 958 in open communication with an interior 960 of the cartridge 912. While in some embodiments, the first endcap 956 is closed, in the specific embodiment illustrated here, it is depicted as an open endcap 956 with an open aperture. A cylindrical section of filter media 962 is secured to the first endcap 956 at one end. In preferred implementations, the filter media 962 will be pleated media. In the embodiment shown, the section of media 962 is arranged in a cylinder, but it is envisioned that in other embodiments, the filter media 962 could be arranged tubular in non-cylindrical forms, such as oval.

The first endcap 956 further defines a wall 964 (in this example, a tubular wall 964) lining the first open volume 958. As explained above, and as shown in analogous arrangements described in connection with FIGS. 1-32 above, in preferred arrangements, the tubular wall 964 will support the protrusion arrangement 918. The first endcap 956 includes an axial surface 966 oriented axially with respect to the filter media 962.

Still in reference to FIGS. 48 and 49, in the embodiment shown, the first endcap 956 defines a first neck 968. The first neck 968 defines an inner radial surface 970 and an inner radial surface 970 and an outer radial surface 971. The first neck 968 extends from the axial surface 966 to project axially above a remaining portion of the first endcap 956.

As described above with respect to analogous filter cartridges, this filter cartridge 912 also includes a centering arrangement 972. In this embodiment, the centering arrangement 972 is depicted as a plurality of stand-offs 974 extending axially from the first endcap 956; and in particular, from the outer axial surface 966. The stand-offs 974 are depicted as being spaced radially outwardly from the first neck 968. In use, these stand-offs 974 help to better orient and position the cartridge 912 within the assembly 900.

The filter cartridge 912 depicted further includes a second endcap 976. The second endcap 976 is secured to the filter media 962 at an end opposite from where the first endcap 956 is secured. In the embodiment shown, the second endcap 976 defines a second neck 978 extending axially from a remaining portion of the second endcap 976.

In the embodiment shown, the cartridge 912 further includes at least first and second cover-gripping members 981, 982. In the embodiment shown, the first and second cover-gripping members 981, 982 extend from the first endcap 956. The cover-gripping members 981, 982 are constructed and arranged to mate with a portion of cover 904, when the filter cartridge 912 is operably connected to the cover 904.

In FIG. 48, it can be seen that the first and second cover-gripping members 981, 982 are opposed to each other. The cover-gripping members 981, 982 are also made of a material that allows them to deflect radially toward and away from each other. This allows for the cover-gripping members 981, 982 to be moved into a position to operably connect to the cover 904.

In the embodiment shown, the first and second cover-gripping members 981, 982 extend from the tubular wall 964, which can include the inner radial surface 970 of the first neck 968. The first and second cover-gripping members 981, 982 extend radially inwardly into the first open volume 958.

In FIG. 48, the first and second cover-gripping members 981, 982 each have a respective arched segment 983, 984 opposed to each other in a concave orientation. Each arched segment 983, 984 defines a projection 985, 986 that is received by a portion of the cover 904, when the filter cartridge 912 is operably connected to the cover 904. FIG. 50 shows projection 985 being received within a recess 988 defined by a portion of the cover 904. It should be understood that the recess 988 and projections 985, 986 may be reversed in that the projection can be on the cover 904 while the recesses can be defined by the cover-gripping members 981, 982 and accomplish the same purpose.

In the embodiment shown, the filter cartridge 912 further includes a first endcap seal member 990. The first endcap seal member 990 is operably held by the first endcap 956 in order to create a seal between the filter cartridge 912 and the housing 902. In the embodiment shown, the first endcap seal member 990 is oriented on the outer radial surface 971 of the first neck 968.

Further, in the embodiment shown, the cartridge 912 includes a second endcap seal member 992 operably held by the second endcap 976. The second endcap seal member 992, in the embodiment shown, is oriented on an outer radial surface 994 of the second neck 978.

In reference now to FIGS. 49 and 51, the interaction between cover 904 and filter cartridge 912 is further explained. In the embodiment shown, the cover 904 includes a top portion 996 and an outer surrounding wall 998. The outer surrounding wall 998 in the embodiment shown, defines threads 1002 for threadably connecting with corresponding threads 915 on the housing 902.

Extending from the top portion 996 is an internally extending sealing wall 1004. The sealing wall 1004, in the embodiment shown, extends a length from the top portion 996 that is longer than an end of the outer surrounding wall 998. The sealing wall 1004 is oriented to form a seal with the first end cap seal member 990, when operably connected.

In the embodiment shown, radially inwardly of the sealing wall 1004 is an internally extending cartridge-engaging wall 1006. In the embodiment shown, the cartridge-engaging wall 1006 is shorter than the sealing wall 1004. In preferred implementations, the cartridge-engaging wall 1006 will include suitable structure to engage mating structure of the cover-gripping members 981, 982. In the particular embodiment illustrated, the cartridge-engaging wall 1006 defines recess 988. The recess 988, in this embodiment, receives projections 985, 986 as described above.

FIG. 50 illustrates a close-up of recess 988 receiving projection 985. The mating of projections 985, 986 with recess 988 helps to retain the filter cartridge with the cover 904, when the cover 904 is removed from the housing 902. During servicing, the cartridge 912 can then be removed from the cover 904.

The top load assembly 900 depicted also has a drain-valve assembly 1010 to allow liquid in the complete assembly to automatically be drained during servicing of the assembly 900. The drain-valve assembly 1010 can be implemented independently of other features in this example embodiment. In FIGS. 42 and 46, the filter cartridge 912 is operably positioned in the housing 902, and the housing 902 is fully-threaded with the cover 904. In this condition, the drain-valve assembly 1010 is in a sealed position. In the sealed position, a first plug seal 1012, a second plug seal 1014, and a third plug set 1015 are operably in place.

The drain-valve assembly 1010 includes a plug 1016. The plug 1016 is movably oriented between the sealed position (FIGS. 42 and 46) and a drainage position (FIG. 47). The sealed position includes the plug 1016 blocking fluid flow between an interior volume 1018 of the housing 902 and a drainage aperture arrangement 1020 defined by the base 908. The drainage aperture arrangement 1020, in this embodiment, is at an end opposite from the cover 904. In use, the drainage aperture arrangement 1020 is located underneath the cartridge 912 and cover 904.

In the embodiment shown, and in particular reference to FIG. 52, the drain valve assembly 1010 includes a valve housing 1022. The valve housing 1022 includes a generally tubular wall 1024 defining an opening 1026. The opening 1026 receives the plug 1016, such that the plug 1016 is axially slidable therewithin. The plug 1016 and the tubular wall 1024 can have structure, such as grooves and ribs as explained above in connection with FIG. 13, to help hold the plug 1016 within the housing 1022, while allowing the plug 1016 to slidably move within the tubular wall 1024. A spring 1028 is located around the wall 1024 and engages an end of the plug 1016 to bias the plug 1016 in the drainage position of FIG. 47.

The valve housing 1022 holds a seal member 1030 around an outside radial surface to form a seal 1032 between the tubular wall 1024 and the base 908. The seal 1032 helps to prevent liquid from the assembly 900 from bypassing the outlet 910 and flowing through the drainage aperture arrangement 1020.

The first plug seal 1012 forms a seal between the tubular wall 1024 and the plug 1016. It helps to prevent unfiltered liquid from bypassing the filter media and flowing through drainage channel 1034 to reach the clean side of the cartridge 912 and pass through the outlet 910.

The second plug seal 1014 forms a seal with inner wall 1036 of a portion of the base 908. In the embodiment shown, the base 908 receives a threaded fitment 1038, which defines drain hole 1040 therein. The threaded fitment 1038 is considered to be part of the base 908, in this context. It can be seen in FIGS. 42 and 46 how the second plug seal 1014 is formed between the plug 1016 and the threaded fitment 1038. This second seal 1014 prevents unfiltered liquid from flowing from the drainage channel 1034 through the drain hole 1040.

As mentioned above, there is also a third plug seal 1015. The third plug seal 1015 is located near an end of the plug 1016 opposite from the end that engages the head 940 of the post 939. The third plug seal 1015 forms a seal between the plug 1016 and the inner wall 1036. This prevents unfiltered liquid from flowing through the drain hole 1040 when in the sealed position.

In operation, liquid to be filtered enters the base 908 through the inlet 906. From there it flows into the interior volume of the housing 1018. The liquid is prevented from passing through the drain hole 1040 because of the second seal plug 1014 and third plug seal 1015. The liquid then flows through the filter media 1062 and into the interior of the inner filter support 922. The filter media 962 removes particulate and debris from the liquid. From the interior of the inner filter support 922, the filtered liquid flows into outlet channel 1042 and then out through the outlet 910. The liquid is prevented from bypassing the filter media 962 by the first endcap seal member 990 and the second endcap seal member 992. In addition, the first plug seal 1012 also prevents unfiltered liquid from bypassing the filter media 962 and flowing into the outlet channel 1042.

After a period of operation, it will be time to service the top load assembly 900. To service the assembly 900, the cover 904 is removed from the housing 902 by unscrewing the cover 904 from the housing 902. As this occurs, the core piece spring 948 pushes against spring 944 on the core piece 924. This moves the cartridge 912 holding the core piece 924 axially upwardly relative to the housing 902. The axial motion upwardly of the core piece 924 stops when the head 940 is stopped by engagement with a lower surface of the inwardly extending shoulder or support 930. This moves the head 940 from out of engagement with the plug 1016. When the head 940 is not acting against the plug 1016, it allows the plug 1016 to move with the valve spring 1028 away from the drain hole 1040 to the position of FIG. 47. This allows liquid to drain from both the unfiltered liquid volume, shown by drain path arrow 1044, as well as drain from the filtered liquid volume shown by the drain path arrow 1046 through the drain hole 1040 into the outside environment where it can be captured by a container for proper disposal. This drainage can occur while the filter cartridge 912 remains at least partially secured to the cover 904.

Next, the cover 904 is removed from the housing 902. In removing the cover 904 from the housing 902, the filter cartridge 912 is also removed from the housing 902 through the engagement between the cover-gripping members 981, 982 and the cartridge-engaging wall 1006 of the cover 904. This pulls the cartridge 912 from the mouth 903 of the housing 902.

The old cartridge 912 is then physically separated from the cover 904. A new filter cartridge 912 with new filter media 962 is then supplied. This new filter cartridge 912 is placed through the mouth 903 into the housing 902. The cover 904 is operably oriented on the housing 902 and threaded into place. While the cover 904 is being threaded into place on the housing 902, the cover-gripping members

981, 982 snap into place within the recess 988 on cartridge-engaging wall 1006. Also, the first endcap seal member 990 forms a seal with the sealing wall 1004 of the cover 904. In addition, the second endcap seal member 992 forms a seal with the disc 928. The plug 1016 is moved into its sealed position by being pushed by the head 940 of the core piece 924. This creates first plug seal 1012, second plug seal 1014, and third plug seal 1015.

If the user tries to orient the cover 904 on the housing 902 without first placing an appropriate cartridge 912 in the housing 902, the lock-out mechanism prevents the cover 904 from engaging the housing 902. An example is illustrated in the previous embodiment of FIG. 52.

When there is no filter cartridge 912 installed within the housing 902, the basket 926 is oriented in its locked position by the bias of these basket spring 927 as explained above to basket 304 and spring 350. When the basket 926 is in its locked position, each of the legs 950 has its free end 953 engagement with projections 938 formed by the ends of the guide rails 932.

When the basket 926 is in its locked position, without filter cartridge 912 installed in the housing 902, the upper rim 929 of the basket 926 and the upper rim of the basket holder 946 will contact or engage against an end 1005 of the cartridge engaging wall 1006. See FIG. 52. Because the legs 950 are resting on top of the projection 938 (in this embodiment, shown as an end of the guide rails 932), the core piece 924 and the basket 926 cannot move axially downwardly in a direction toward the base 908 of the housing 902. The internal components 920 are in an extended and rigidly fixed position. As can be seen in FIG. 52, in this rigidly fixed position, the cover 904 cannot operably connect with the housing 902 by connection between the threads 1002 on the cover 904 and threads 915 on the housing 902.

During servicing, when a new filter cartridge 912 has been provided, the filter cartridge 912 is oriented in the housing 902 by placing it through the open mouth 903. When the filter cartridge 912 is properly and operably positioned in the housing 902, the first protrusion 951 comes in contact or engages the ramped first slide surface, shown in connection with the description of the previous embodiment of FIGS. 19, 28, 29, and 30 at reference numeral 314 of the basket 304. In embodiments that have more than two protrusions, one possibility is that both the first protrusion 121 and a third protrusion (such as third protrusion 123, as described previously) will engage a corresponding first slide surface 314 on the basket 926. As the first protrusion 951 engages the first slide surface (such as first slide surface 314 of FIGS. 19, 28, 29, and 30) it causes the basket 926 to rotate against the basket spring 927. In preferred embodiments, the rotation will be less than 45 degrees, for example, 5-20 degrees. This rotates the basket 926 from a first blocked position (such as the position shown in FIGS. 19 and 30) to the second locked position (such as shown in FIG. 20, above). A first groove (such as groove 312 in basket 304) becomes aligned with a first slot (such as first slot 360 of basket holder 340), which will eventually allow the first protrusion 951 to slide downwardly.

When the basket 926 is rotated to the second locked position (such as the position shown in analogous view FIG. 20), this exposes a second slide surface on the basket 926. The second slide surface of basket 926 is analogous to second slide surface 318 of FIG. 20. The second protrusion 952 is oriented such that it will contact or engage the second slide surface of the basket 926. The contact with the second slide surface can be made through a protrusion located in the location of a fourth protrusion (such as fourth protrusion 124) as well. In embodiments that have protrusions at both locations of the second protrusion 952 and a fourth protrusion (such as fourth protrusion 124), then both the second protrusion 952 and the fourth protrusion will contact the corresponding second slide surface. The initial contact between the second protrusion 952 and the second slide surface causes the basket 926 to rotate against the basket spring 927 from its second locked position (FIG. 20) to its unlocked position, such as the position shown in analogous FIG. 21. In analogous FIGS. 23, 25, and 27, engagement of the analogous second protrusion 122 is shown as being against the analogous second slide surface 318. The rotation of the basket 926 from the second locked position (FIG. 20) to the unlocked position (FIG. 21) is preferably less than 45 degrees, for example, 5-20 degrees. Rotation to the unlocked position aligns a second groove of the basket holder 946 (analogous to second groove 316 of FIG. 21) and a second slot (such as analogous second slot 362) of the basket 926, which will eventually allow axial sliding of the second protrusion 952 therein downwardly.

As the basket 926 moves to the unlocked position, the legs 950 also rotate, moving away from engagement against the projections 938 created by the end of the guide rails 932. When the legs 950 are completely clear of the projections 938, any additional movement of the filter cartridge 912 in a downwardly axial direction toward the base 908 will cause the basket 926 and the core piece 924 to also move in that direction against the core piece spring 948. The core piece spring 948 normally biases the basket 926 and the core piece 924 in the extended position of FIG. 52.

When the filter cartridge 912 has been properly mounted within the housing 902 and the basket 926 moves to the unlocked position, this allows the filter cartridge to 912 to move downwardly relative to the base 908 and the inner filter support 922. Moving the filter cartridge 912 downwardly towards the base 908 also moves downwardly the core piece 924. The cover 904 will then be able to matably engage the threads 915 of the housing 902 for secure attachment as shown in FIGS. 40-46.

It should be appreciated that the lockout mechanism as characterized above can be utilized in a method of installing a filter cartridge into a housing, such as filter cartridge 912 into housing 902.

B. FIGS. 54-66

A second embodiment of a top load assembly is illustrated in FIGS. 54-66 at reference numeral 1050. This embodiment has features analogous to the features described for top load assembly 900 of FIGS. 40-53. As such, the top load assembly 1050 has a lockout feature as described above, which description in incorporated by reference herein. The embodiment of FIGS. 54-66 further includes an air bleed passage incorporated therein.

In many fuel systems, a considerable amount of air is introduced into the system during filter servicing. When a clean filter is installed initially, the space around the filter element is air. If there is an attempt to start the engine at this point, all of the air must pass through the entire fuel supply system before any fuel can reach the combustion chambers, allowing the engine to run. This can require several minutes of turning over the engine before enough fuel reaches the combustion chamber. Because most engines are turned over using a battery-powered electric motor, doing this for several minutes can overheat the electric motor or drain the battery before allowing the engine to start. A current solution to this problem is to add a primer pump somewhere in the fuel system and a manual air bleed vent to allow air to be removed from the fuel system prior to starting the engine using the battery/electric motor. It is desirable to add an air bleed path to be incorporated into the fuel filter system allowing air to continuously bleed back to the fuel tank whenever fuel is flowing through the system, such as described in U.S. Pat. No. 6,709,588; U.S. Pat. No. 5,896,846; and U.S. Pat. No. 7,014,766, each incorporated herein by reference. The embodiment of FIGS. 54-66 incorporates an air bleed path into internal components.

Figure 56:
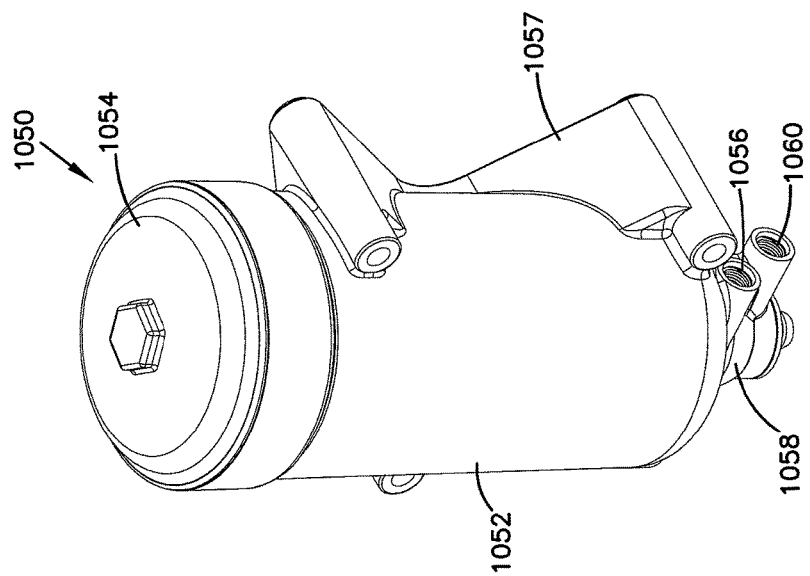
FIG. 56 is another perspective view of the filter assembly of FIG. 54.
Figure 55:
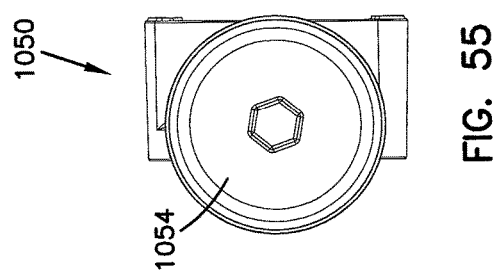
FIG. 55 is a top plan view of the filter assembly of FIG. 54.
Figure 54:
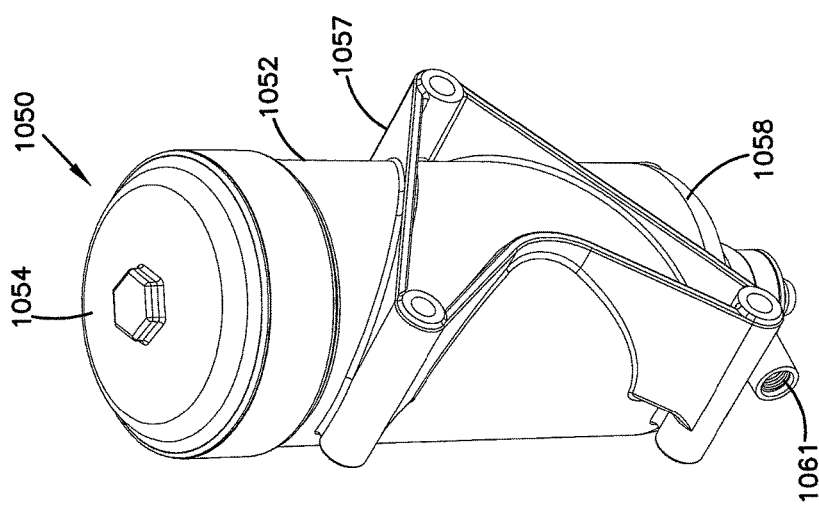
FIG. 54 is a perspective view of another embodiment of a top load filter assembly having a removable filter cartridge, constructed according to principles of this disclosure.
Figure 57:
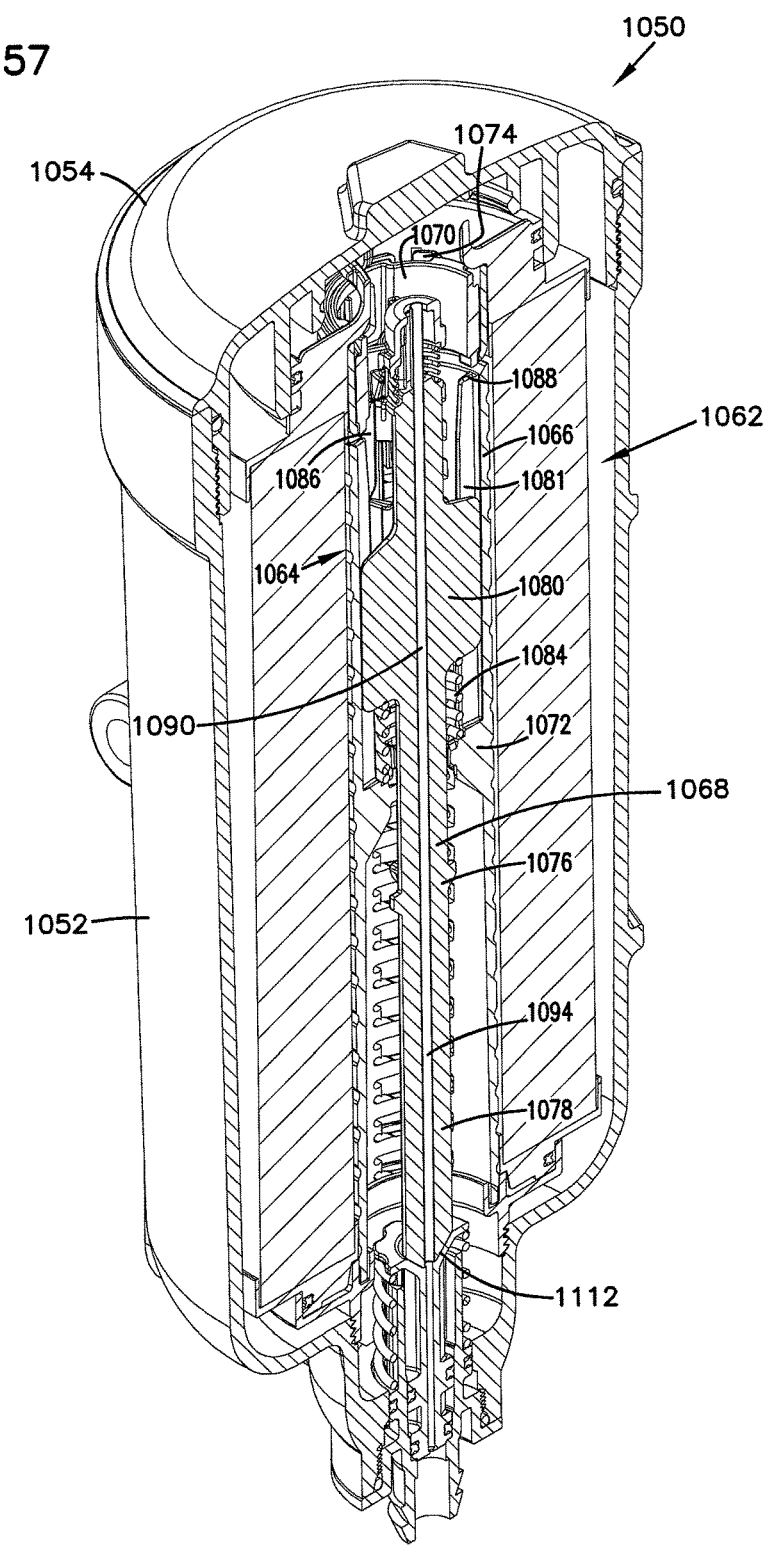
FIG. 57 is a perspective cross-sectional view of the filter assembly of FIGS. 54-56, the cross-section being taken along the line A-A of FIG. 59.

FIGS. 54-56 show external views of the top load assembly 1050. The top load assembly 1050 depicted includes a housing 1052 with a removable service cover 1054 covering a mouth 1053 (FIG. 57). The housing 1052 is integral with a filter base 1058. A mounting flange 1057 allows for mounting the assembly 1050 onto suitable equipment. The housing 1052 defines an inlet 1056, which passes through the base 1058 of the housing 1052. The base 1058 also defines an outlet 1060. Housing 1052 further defines port 1061, which can be used for receiving various diagnostic components, such as sensors; or, if a water separator is added to the filter, it can be used as a port to drain away collected water; or alternatively, the port 1061 can be closed with a plug and not used.

Figure 58:
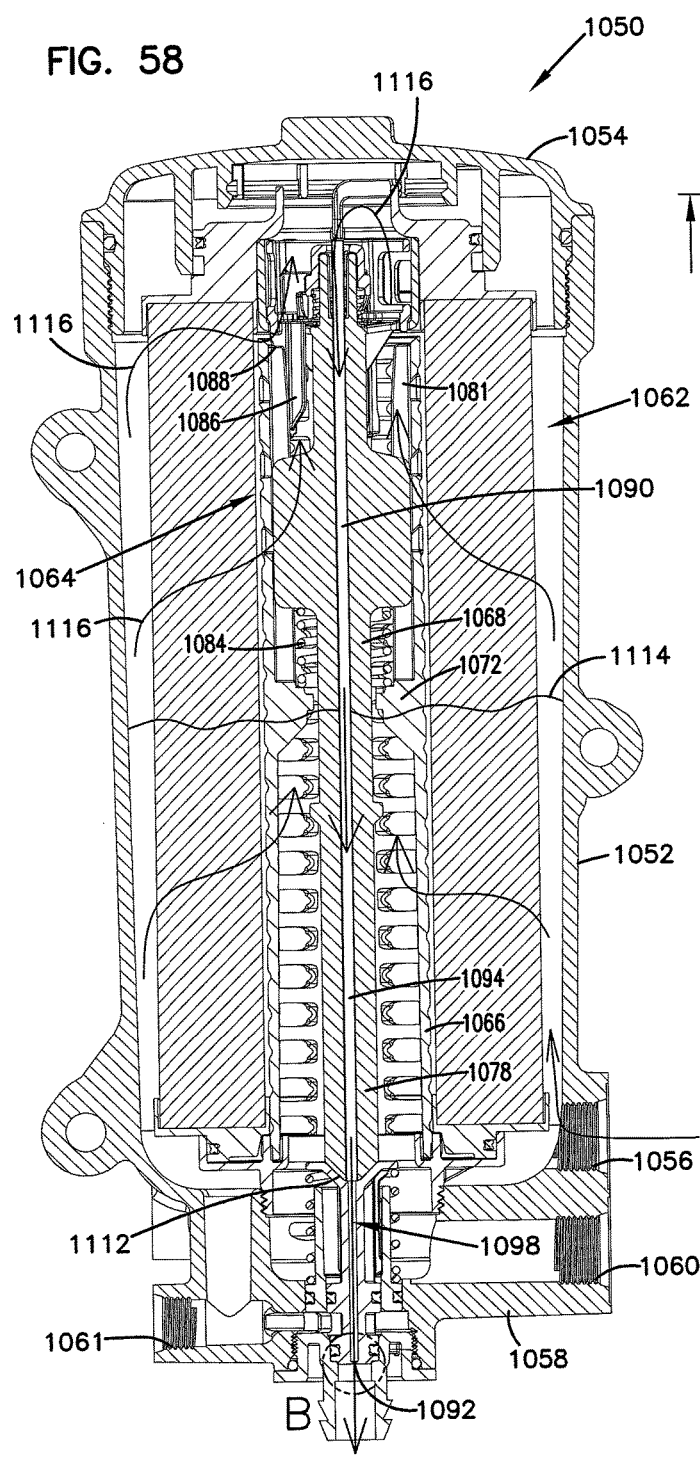
FIG. 58 is a cross-sectional view of the filter assembly of FIGS. 54-56, the cross-section being taken along the line A-A of FIG. 59.
Figure 59:
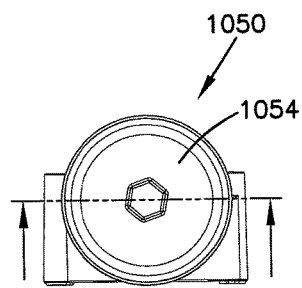
FIG. 59 is a top plan view of the filter assembly of FIGS. 54-56.

FIGS. 57 and 58 show a cross-sectional view of the top load assembly 1050. The housing 1052 holds a removable and replaceable filter cartridge 1062 (with analogous features as cartridge 912, whose description is incorporated by reference herein). In use, when it is time to service the assembly 1050, the cover 1054 is removed from the housing 1052. The cartridge 1062 is removed from the housing 1052 through the access opening created when the cover 1054 is removed. The old filter cartridge 1062 is discarded, and a new filter cartridge 1062 is provided.

The top load assembly 1050 includes a lockout feature, as described above. The lockout feature will not again be described with respect to this embodiment. Rather, the features have been previously described, and that description is incorporated by reference herein.

In FIGS. 57 and 58, internal components 1064 can be seen. The internal components 1064 include a lockout mechanism, as described above. The internal components 1064 include a porous inner filter support 1066; a core piece 1068; and a basket 1070. The filter support 1066 includes an inwardly extending shoulder or support 1072. The core piece 1068 includes a basket holder 1074 and a post 1076 having a head 1078. The head 1078 engages the inwardly extending shoulder or support 1072. The core piece 1068 further defines a plurality of fins 1080 that slide within channels or grooves between guide rails 1081.

A core piece spring 1084 pushes the core piece 1068 in a direction axially upwardly, toward the cover 1054, by exerting a force between the inwardly extending shoulder or support 1072 and the fins 1080.

The basket 1070 is supported by the basket holder 1074. The basket 1070 is constructed analogously to basket 926 and basket 304, described above. The basket 1070 has a plurality of legs 1086. When the assembly is in its locked position, the legs 1086 interfere with and engage against projections 1088. In this embodiment, the projections 1088 are formed by the ends of guide rails 1081, which are also at a free end of the porous inner filter support 1066. This engagement prevents the core piece 1068 from moving axially downardly in a direction toward the base 1058 of the housing 1052.

Figure 60:
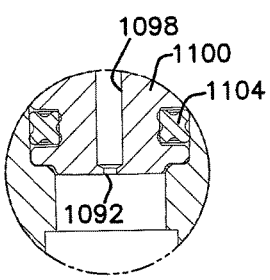
FIG. 60 is an enlarged cross-sectional view of section B of FIG. 58.

Attention is directed to FIGS. 61-64. The core piece 1068 is illustrated. In this embodiment, the core piece 1068 includes an air vent passage 1090 extending the length of the post 1076. The air vent passage 1090 allows air in the filter housing 1052 to move into fuel tank and out to the atmosphere through a fuel tank vent. The air will move through the upper end of the housing 1052, as fuel is initially flowing into the housing 1052. As the fuel initially flows into the housing 1052 through the inlet 1056, the air is pushed toward the upper region around the cover 1054 and is then allowed to pass through the air vent passage 1090 where it flows through the post 1076 and out through orifice 1092 (FIG. 60). From there the air goes to the fuel tank, where it is vented to the atmosphere.

In one embodiment, the air vent passage 1090 is formed by a vent tube 1094 (FIG. 62). The vent tube 1094 can be formed with the core piece 1068 in a variety of implementations, such as by insert molding to the vent tube 1094 into the post 1076. In other embodiments, the air vent passage 1090 can simply be formed by having a hollow section in the post 1076, without the need for a separate tube 1094.

Figure 65:
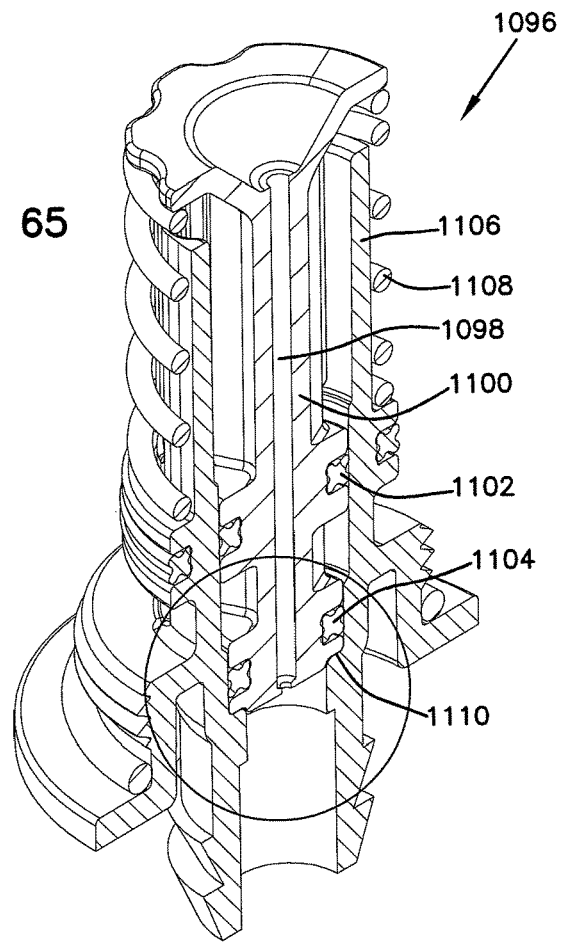
FIG. 65 is a perspective view of a portion of the drain assembly that is part of the filter assembly of FIGS. 54-60.
Figure 66:
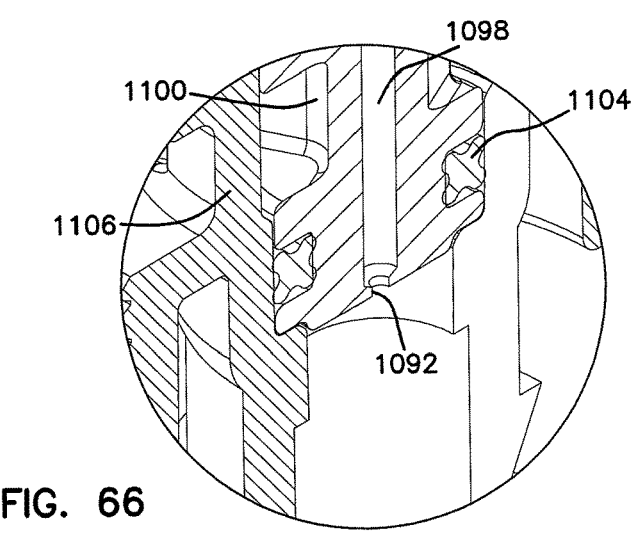
FIG. 66 is an enlarged perspective view of section C of FIG. 65.

FIGS. 65 and 66 depict perspective views of the valve assembly 1096. The valve assembly 1096 is analogous to the valve assembly 1010 and 236, described previously, but with the additional feature of defining part of the air vent passage 1090. The air vent passage 1090 includes valve assembly air vent passage 1098 extending through the plug 1100. In the embodiment shown, the valve assembly 1096 includes plug 1100, first plug seal 1102 and second plug seal 1104. The plug 1100 is held within valve housing 1106. A valve spring 1108 biases the plug 1100 from a position away from the opening 1110 in the valve housing 1106. The orifice 1092 can be seen in the center of the plug 1100, in this embodiment. As described above, the post 1076 has head 1078 that engages against an end of the plug 1100. As this interface 1112, the vent tube 1094 in the post 1076 meets up with and is in air flow communication with the valve assembly air vent passage 1098. At this interface 1112, some air can escape back into the fuel and eventually will be returned to this same air vent passage 1090. This leak path would increase the time it takes to remove air from the system. Locating a seal (not shown) between the end of the post 1076 and end of the plug 1016 would eliminate this leak path.

The size of the orifice 1092 is selected to allow for the venting of air, and to also minimize the amount of fuel that would eventually flow through the air vent passage 1090, when all of the air has been evacuated from the housing 1052.

In use, fluid to be filtered enters the assembly 1050 through the inlet 1056. From there, it flows to the region between the housing 1052 and the media in the cartridge 1062. The fluid then flows through the media in the cartridge 1062 and into the interior of the inner filter support 1066. From there the fluid flows through the bottom opening of the filter support 1066 and then through the outlet 1060 to exit the assembly 1050.

From time to time, the filter assembly 1050 will need servicing. To service the assembly 1050, the cover 1054 is removed from the housing 1052. In doing so, the cartridge 1062 will also be removed from the housing 1052 because of the cover-gripper members 981, 982, described in connection with the embodiment of FIGS. 43-53. If cover-gripper members 981, 982 are not used, then the cartridge 1062 is removed from the housing 1052 in a separate step after the cover 1054 has already been removed. A new filter cartridge is then provided and operably installed in the housing 1052 by placing the cartridge 1062 through the open mouth 1053. The manner in which the lockout mechanism is unlocked has been described previously, and that description is incorporated herein by reference. Once the cover 1054 is threadably connected to the housing 1052, the assembly 1050 is again ready for use.

After servicing, the housing 1052 will have air trapped therewithin. In use, when the fluid is entering the inlet 1056 and then into the housing 1052 for filtering, the fluid, whose level is shown at reference numeral 1114 in FIG. 58 will start to rise. This will push the air in a direction upwardly shown at arrows 1116. As the air is pushed to the top, it finds air vent passage 1090. The air is then allowed to pass through the passage 1090 and ultimately out through orifice 1092 where it can be returned to the fuel tank.

The assembly 1050 of FIGS. 58-66 can also be used for a method of draining liquid during servicing. This method has been described previously in connection with the embodiment of FIGS. 40-52, and is incorporated by reference herein. In the method used by the embodiment of FIGS. 58-66, the plug used will be plug 1100, which defines air vent passage 1098.

Figure 67:
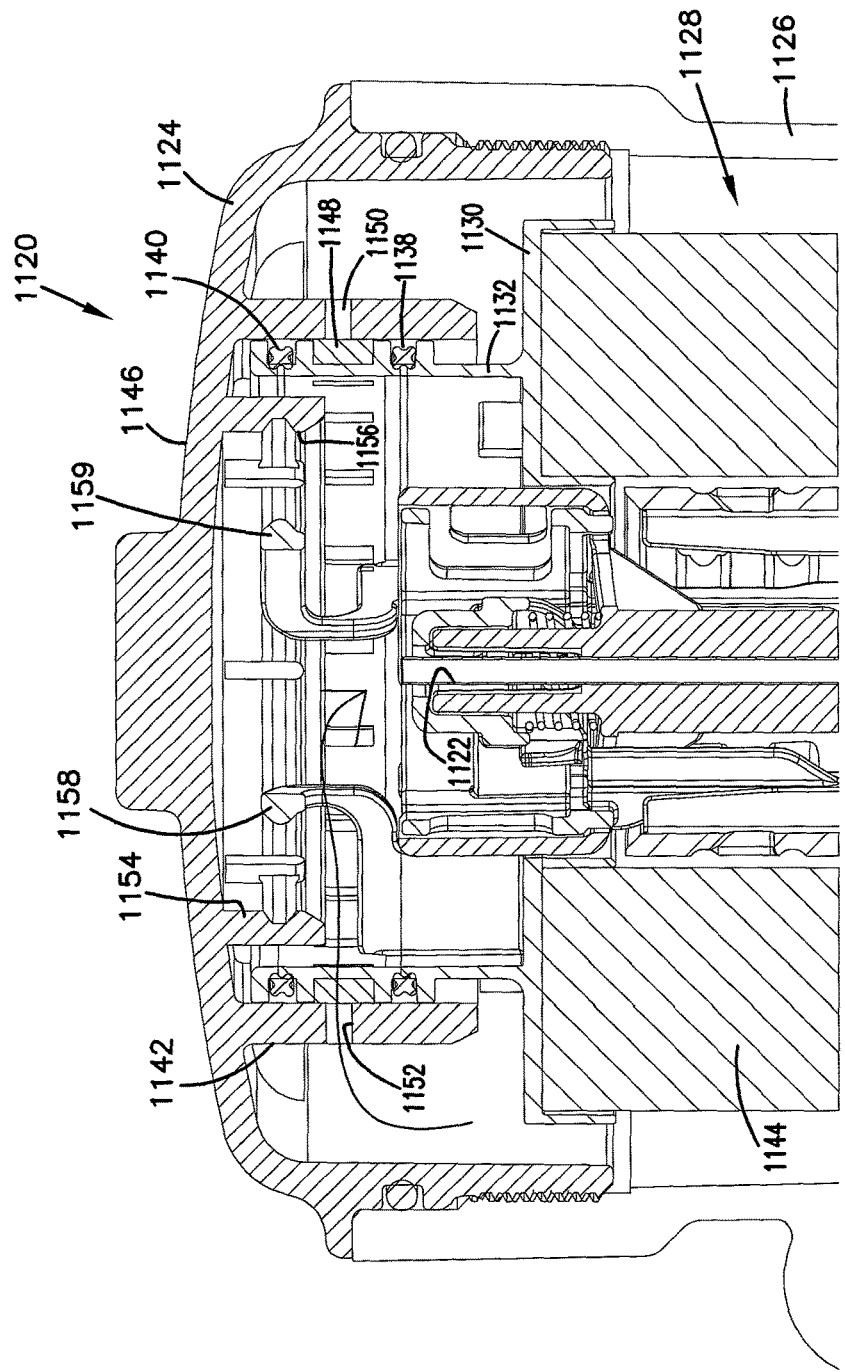
FIG. 67 is a partial cross-sectional view of another embodiment of a filter cartridge and cover used in a top load filter assembly, constructed in accordance with principles of this disclosure.
Figure 68:
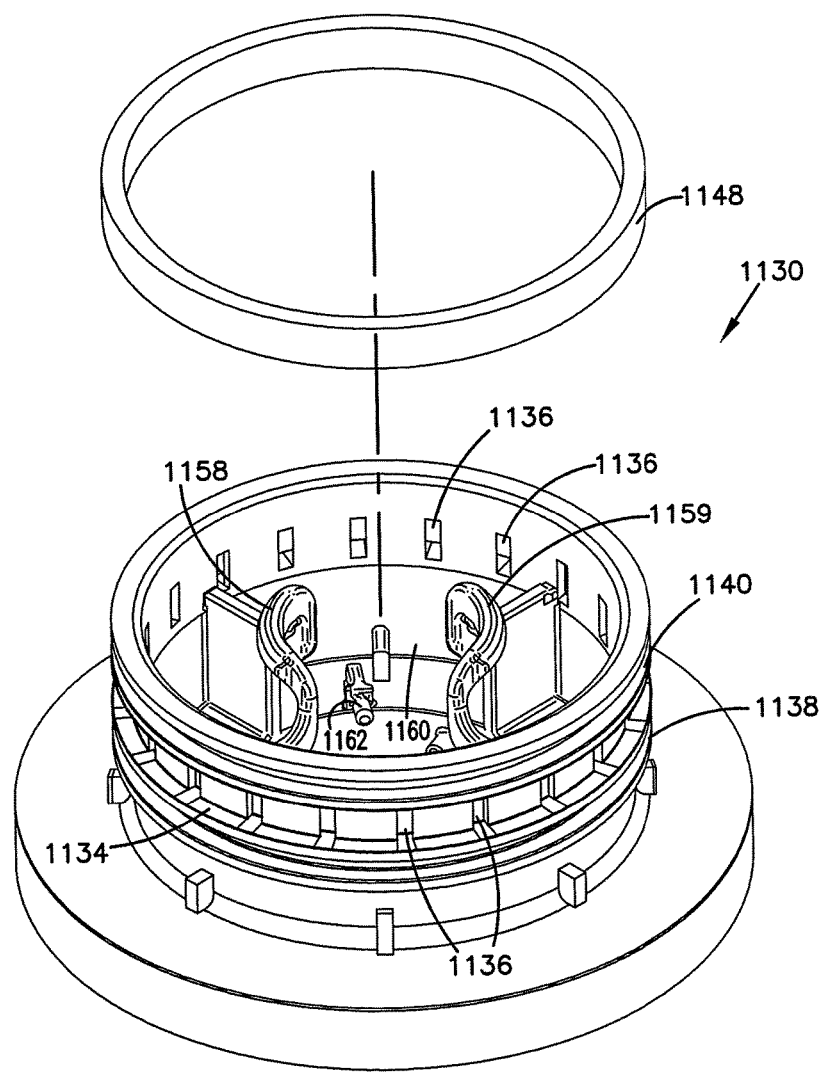
FIG. 68 is an exploded perspective view of an endcap useable in the topload assembly of FIG. 67.

C. FIGS. 67 and 68

A third embodiment of a topload assembly is partially illustrated in FIGS. 67 and 68 at reference numeral 1120. The topload assembly 1120 is designed similarly to the embodiment of FIGS. 54-66, in that it includes an air vent passage 1122, like the air vent passage 1090. This embodiment allows for the additional venting of air. In the embodiment of FIGS. 54-66, some of the air located in the region of the cover 1054 between the sealing wall (such as sealing wall 1004 of the embodiment of FIGS. 40-53) and the top of the cover 1054 can get trapped. The air in this region is on the unfiltered side of the media. The air vent passage 1090 in the previous embodiment is located on the filtered side of the media. In order to remove the air from this region, a way of preventing contaminant from the unfiltered side moving from the filtered side is desirable.

In FIG. 67, the cover 1124 is shown secured to the housing 1126. The filter cartridge 1128 is operably secured within the housing 1126.

The filter cartridge 1128 includes a first endcap 1130 having a first neck 1132. In this embodiment, the first neck 1132 defines a through-channel arrangement 1134 (FIG. 68) that allows for fluid communication on opposite sides of the first neck 1132. In the embodiment shown, in FIG. 68, the through-channel arrangement 1134 includes a plurality of spaced openings 1136. In the embodiment shown, the openings 1136 are evenly spaced about the entire circumference of the first neck 1132.

The first endcap 1130 holds a first endcap seal member 1138 and a first endcap second seal member 1140 such that these seal members 1138, 1140 form a seal with sealing wall 1142 of the cover 1124. In the embodiment shown, the first endcap seal member 1138 is oriented on an outer radial surface of the first neck 1132 on one side of the through-channel arrangement 1134, while the first endcap second seal member 1140 is also oriented on a outer radial surface of the first neck 1132 and on a second side of the through-channel arrangement 1134. In the particular embodiment illustrated, the first endcap seal member 1138 is oriented on the side of the through-channel arrangement 1134 that is closer to the filter media 1144 than the first endcap second seal member 1140. That is, the first endcap second seal member 1140 is oriented closer to the end wall 1146 of the cover 1124 than the first endcap seal member 1138.

A second filter media construction 1148 is operably oriented to cover the through-channel arrangement 1134. The second media construction 1148 functions to filter or clean any fluid, such as air, fuel, oil, or other liquids, that pass therethrough.

In this embodiment, the sealing wall 1142 defines a through-opening arrangement 1150. The through-opening arrangement 1150, in the embodiment shown, is a plurality of spaced openings or slots 1152 extending radially through the sealing wall 1142. When the filter cartridge 1128 is properly and operably oriented with the cover 1124 in place, the through-opening arrangement 1150 is in fluid communication with the through-channel arrangement 1134 of the first neck 1132. In this way, when fluid flows through the slots 1152, it then flows through the second media construction 1148 and then through the openings 1136 of the through-channel arrangement 1134.

Also visible in FIGS. 67 and 68 is a cartridge engaging wall 1154 extending downwardly from the end wall 1146 of the cover 1124. The cartridge engaging wall 1134 defines recess 1156 therein. Mating with the cartridge engaging wall 1134 are cover-gripping members 1158, 1159 extending from an aperture wall 1160 of the endcap 1130.

A first protrusion 1162 is also viewable extending from the aperture wall 1160. As explained above, this is used as part of a lockout arrangement.

In use, if there is air trapped in the housing 1126, as liquid enters the housing 1126 for filtering, the air will be pushed to the top of the housing 1126. As it is pushed to the top of the housing 1126, it will pass through the air vent passage 1122. Some of the air will travel to the air vent passage 1122 by first passing through the slots 1152 of the through-opening arrangement 1150 of the sealing wall 1142 of the cover 1146. Then the air will flow through the media 1148 and then through the openings 1136 of the through-channel arrangement 1134 of the first neck 1132 of the first endcap 1130. From there, the air is free to travel to the air vent passage 1122. The second media construction 1148 helps to remove debris from the air. In addition, the second media construction 1148 will remove debris from the liquid that is being filtered that passes through the second media construction 1148.

D. FIGS. 69-71

Figure 69:
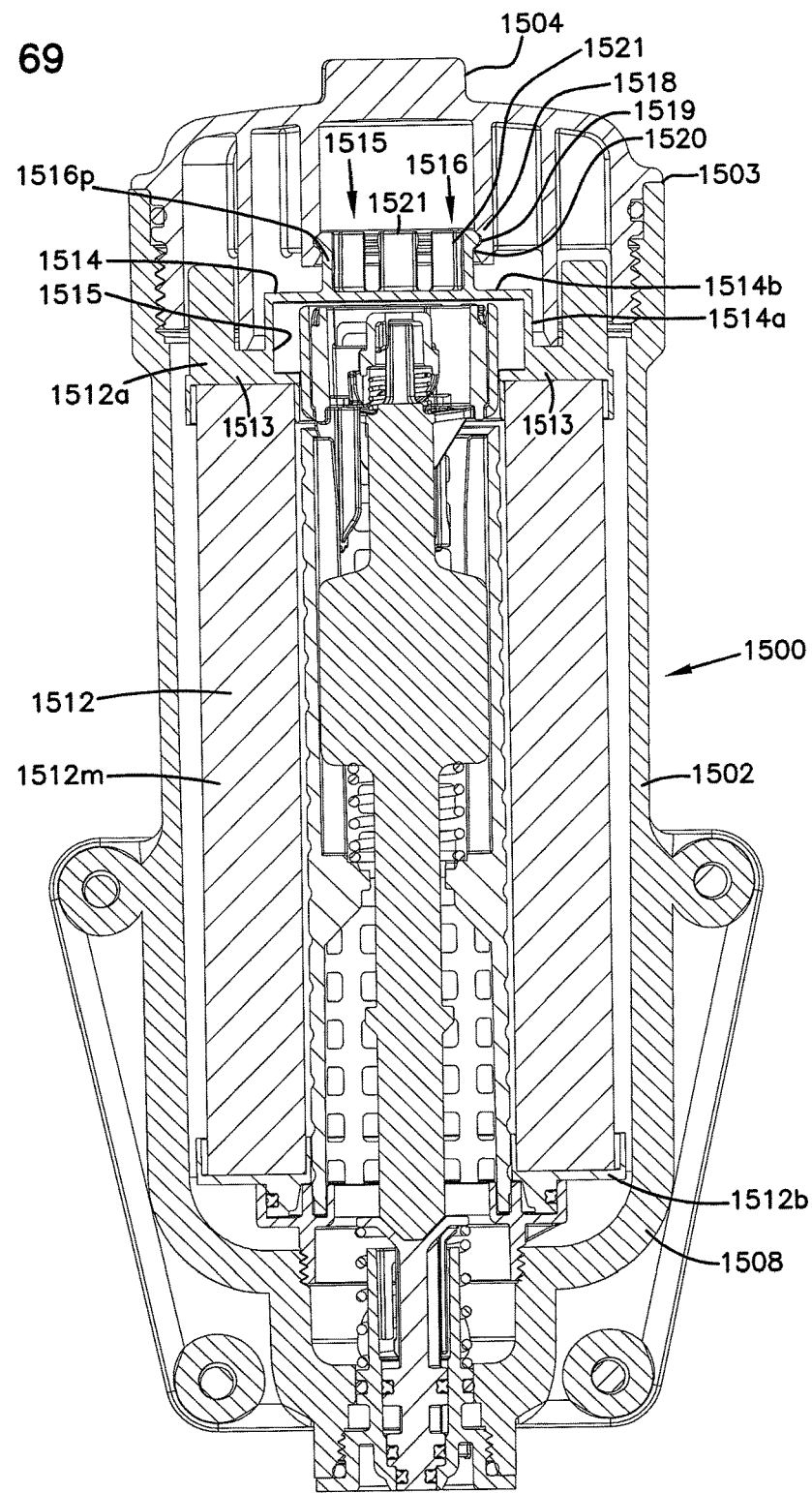
FIG. 69 is a cross-sectional view of another embodiment of a top-load filter assembly, constructed in accord with principles of this disclosure.
Figure 70:
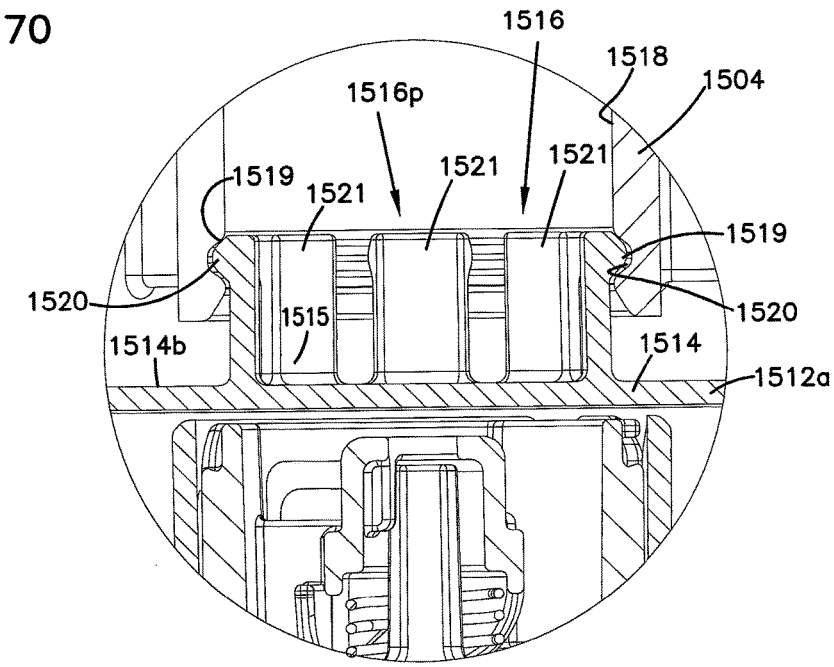
FIG. 70 is an enlarged fragmentary view of a selected portion of FIG. 69.
Figure 71:
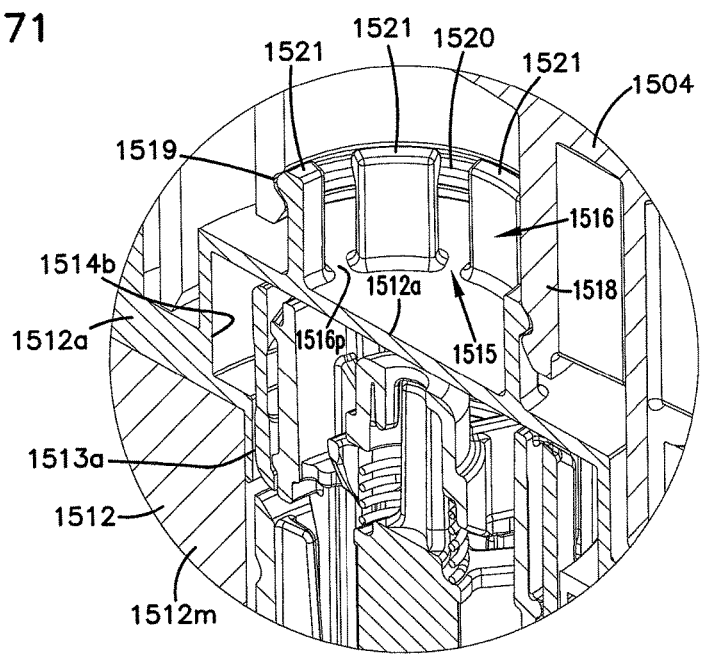
FIG. 71 is a fragmentary perspective view of the portion of the assembly depicted in FIG. 70.

In FIGS. 69-71 depict a fourth embodiment of the top-load filter assembly in accord with the present disclosure is depicted. Referring to FIG. 69, the top-load filter assembly 1500 is depicted in cross-sectional view. The filter assembly 1500 can be viewed as comprising an assembly generally analogous to assembly 900, FIG. 42, except modified as characterized herein.

The assembly 1500 differs from assembly 900 in two ways, generally as follows: (1) the upper end of the cartridge, as explained further below, is closed; and (2) the manner by which the cartridge is secured to the service cover is modified. The top load assembly 1500 has a lockout feature as described above with respect to assembly 900, which description in incorporated by reference herein. The top load assembly 1500 also has a drain-valve assembly analogous to drain-valve assembly 1010 (whose description is incorporated by reference herein) to allow liquid in the complete assembly to automatically be drained during servicing of the assembly 1500.

Referring to FIG. 69, assembly 1500 includes a housing 1502 with a removable service cover 1504 covering a mouth 1503. The housing 1502, as will be understood by comparing FIGS. 69 and 42, includes many features analogous to housing 902, and, thus, includes a base 1508.

Within the housing 1502 is positioned removable and replaceable filter cartridge 1512. The filter cartridge 1512 comprises media 1512*m* extending between a first upper end cap 1512*a* and a second, opposite, lower end cap 1512*b*. End caps 1512*a*, 1512*b* can be molded-in-place, or can be preformed and be secured to the media 1512*m* with adhesive, i.e. by potting.

The first, upper, end cap 1512*a* is "closed." By this, it is meant that the end cap 1512*a* extends across an otherwise open end of the media 1512*m*, and includes no open aperture therethrough.

Referring to FIG. 69, end cap 1512*a* can be seen as including: peripheral ring 1513, which engages and overlaps an end of the media 1512*m* closing same; and, centerpiece 1514, which extends across, and closes, peripheral ring 1513.

Centerpiece 1514, in the embodiment depicted, comprises a projection on end cap 1512*a*, that projects in a direction away from media 1512*m* and end cap 1512*b*. More specifically, the example centerpiece 1514 depicted includes an outer peripheral ring, projection or tubular wall 1514*a*, which extends in a direction away from media 1512*m* and end cap 1512*b*. The tubular wall 1514*a* lines a first open volume of the endcap 1512*a*. Further, centerpiece 1514 includes a closed end 1514*b* supported by the wall 1514*a*, to extend across a middle of centerpiece 1512*a*, closing same.

The wall 1514*a* provides for clearance over internally received componentry, which componentry is analogous to that of a previously described embodiment of FIG. 42. As mentioned, the assembly includes a lockout feature as described above with respect to assembly 900; as such, the endcap 1512*a* includes at least a first protrusion and a second protrusions extending from an inside wall 1514*b* (FIG. 71) of the wall 1514*a* and inside wall 1513*a* (FIG. 71) of ring 1513 into the first open volume 1515; the first protrusion being spaced from the second protrusion in a vertical direction along the inside wall 1514*b* and 1513*a*; the first protrusion being circumferentially spaced from the second protrusion along the insides wall 1514*b* and 1513*a*.

Still referring to FIG. 69, the cartridge 1512 includes thereon, positioned on end cap 1512*a*, and projecting in a direction away from media 1512*m* and end cap 1512*b*, a first member 1515 of an interference fit connector arrangement 1516 removably securing the cartridge 1512 to the end cover 1504. End cover 1504, includes a second member 1518 of the interference fit connector arrangement 1516.

In general terms, the interference fit connector arrangement 1516 provides that the cartridge 1512 is removably connected to the cover 1504, so that when the cover 1504 is removed from housing 1502, the cartridge 1512 is also removed; and, such that the cartridge 1512 can be easily separated from the cover 1504. The interference fit connector arrangement 1516 depicted is configured to provide: that the cover 1504 can be rotated independently of the cartridge 1512; and, so that the interference fit connection provided by interference fit connection 1516 can be easily established and broken, to facilitate servicing.

For the example embodiment depicted in FIG. 69, the first member 1515 of the interference fit connector arrangement 1516, comprises a projection arrangement 1516*p* on end cap 1512*a*. The projection arrangement 1516*p* includes an interference bead 1519 projecting radially outwardly therefrom, and surrounding the projection arrangement 1516*p*. Interference bead 1519 is sized and positioned to be removably received within a receiver 1520 positioned on member 1518 of cover 1504, in an interference fit manner. Receiver 1520 for example, can comprise a groove.

For the particular embodiment depicted, the projection arrangement 1516*p* comprises a plurality of spaced, flexible, projections or cover-gripping members 1521, each projection having a segment of the bead 1519 thereon. At least two of the cover-gripping members 1521 are opposed to each other and are deflectable radially toward and away from each other. The cover-gripping members 1521 are constructed and arranged to mate with a portion of a cover, when the filter cartridge is operably connected to a cover.

Although alternatives are possible, for the example embodiment depicted in FIG. 69, the end cap 1512*a* comprises ring 1513, centerpiece 1514; and, projection arrangement 1516*p* formed integral with one another, for example molded integral.

Attention is now directed to FIGS. 70 and 71, in which the spaced projections or cover-gripping members 1521 can be more readily viewed. Referring to FIG. 71, it can be seen that the example groove 1520 extends completely around the projection arrangement 1516*p*. Thus, cover 1504 can be rotated relative to the cartridge 1512. It can also be seen that the snap-fit connector arrangement 1516, being an interference fit connector using flexible projections or cover-gripping members 1521, can be snapped together or pulled apart as needed, during servicing, without damage to either the access cover 1504 or the cartridge 1512.

In general terms, expect for features as characterized above, the assembly 1500 includes features as generally described previously in connection with the embodiment of FIG. 42, and operates analogously thereto, including for example: the method of filtering; the lockout mechanism; and the drain valve mechanism. The closed endcap 1512*a* allows the elimination of seal member 990 (FIG. 49), which is a cost savings, and which allows for an easier removal of the service cover 1504 from the base 1502 when compared to the embodiment of FIG. 42 since there is less friction. This improves the convenience of servicing.

It is noted that principles analogous to those described for the arrangement of FIGS. 69-71 can be applied in association with alternate specific features.

We claim:

1. A filter cartridge comprising:
   (a) a closed endcap having an inside wall defining a first open volume;
   (b) a tubular construction of filter media secured to the closed endcap;
   (c) an open endcap secured to the filter media at an end opposite of the closed endcap;
   (d) at least a first protrusion and a second protrusions extending from the inside wall into the first open volume;
      (i) the first protrusion being spaced from the second protrusion in a vertical direction along the inside wall; and
      (ii) the first protrusion being circumferentially spaced from the second protrusion along the inside wall.

2. A filter cartridge according to claim 1 further comprising:
   (a) a closed endcap seal member operably held by the closed endcap; and
   (b) a open endcap seal member operably held by the open endcap.

3. A filter cartridge according to claim 2 wherein:
   (a) the closed endcap defines a first neck; the closed endcap seal member being oriented on an outer radial surface of the first neck; and
   (b) the open endcap defines a second neck; the open endcap seal member being oriented on an outer radial surface of the second neck; and (c) a plurality of standoffs extending axially from the closed endcap and being spaced radially outwardly from the first neck.

4. A filter cartridge according to claim 1 further comprising:
(a) at least a third protrusion and a fourth protrusion extending from the tubular wall and into the first open volume;
  (i) the third protrusion being circumferentially-spaced from the first protrusion, the second protrusion, and the fourth protrusion; and
  (ii) the third protrusion being vertically spaced from only two of the first protrusion, the second protrusion, and the fourth protrusion.

5. A filter cartridge according to claim 2 wherein:
(a) the closed endcap defines a first neck, the first neck defining a through-channel arrangement;
  (i) the closed endcap seal member being oriented on an outer radial surface of the first neck on one side of the through-channel arrangement; and
  (ii) the closed endcap second seal member being oriented on an outer radial surface of the first neck on a second side of the through-channel arrangement; and
(b) a second filter media construction operably oriented to cover the through-channel arrangement.

6. A filter cartridge according to claim 1 further including:
(a) first and second cover gripper members with spaced flexible projections each having a bead, projecting from the closed endcap.

7. A method of installing a filter cartridge into a top load filter assembly; the method comprising:
(a) orienting a filter cartridge having a tubular construction of filter media into an open mouth of a filter housing; the filter housing defining a base at an end opposite of the mouth; the base defining an inlet and outlet arrangement;
  (i) the filter housing having an inner filter support mounted therein;
  (ii) the filter housing further having a core piece within the inner filter support; the core piece holding a basket;
(b) while orienting, pushing the filter cartridge against the basket to disengage the core piece and the inner filter support;
(c) after disengaging, axially moving both the filter cartridge and the core piece relative to the inner filter support; and
(d) operably orienting a service cover over the mouth.

* * * * *